(12) United States Patent
Shinkai et al.

(10) Patent No.: US 9,052,520 B2
(45) Date of Patent: Jun. 9, 2015

(54) ILLUMINATION DEVICE AND DISPLAY UNIT

(75) Inventors: Shogo Shinkai, Miyagi (JP); Akira Ebisui, Miyagi (JP); Harumi Sato, Miyagi (JP); Kentaro Okuyama, Miyagi (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/113,648

(22) PCT Filed: May 2, 2012

(86) PCT No.: PCT/JP2012/061595
§ 371 (c)(1),
(2), (4) Date: Oct. 24, 2013

(87) PCT Pub. No.: WO2012/153693
PCT Pub. Date: Nov. 15, 2012

(65) Prior Publication Data
US 2014/0055835 A1    Feb. 27, 2014

(30) Foreign Application Priority Data

May 9, 2011 (JP) .................. 2011-104767
Nov. 22, 2011 (JP) .................. 2011-255214

(51) Int. Cl.
| G02F 1/03 | (2006.01) |
| G02B 27/26 | (2006.01) |
| F21V 7/00 | (2006.01) |
| F21V 7/04 | (2006.01) |
| F21V 8/00 | (2006.01) |

(Continued)

(52) U.S. Cl.
CPC . *G02B 27/26* (2013.01); *F21V 7/00* (2013.01); *F21V 7/043* (2013.01); *G02B 6/0033* (2013.01); *G02B 27/2228* (2013.01); *G02F 1/1334* (2013.01); *G02B 6/0061* (2013.01); *G02B 27/2214* (2013.01);

(Continued)

(58) Field of Classification Search
CPC .. G02B 27/26; G02B 6/0033; G02B 27/2228; G02B 27/2214; G02B 6/0056; G02B 6/0041; G02B 6/0055; G02B 6/0061; F21V 7/00; F21V 7/043; G02F 1/1334
USPC ............. 359/251, 315, 318, 319; 362/296.01, 362/296.05, 296.07, 606
See application file for complete search history.

(56) References Cited

U.S. PATENT DOCUMENTS

| 2004/0109105 A1* | 6/2004 | Nagakubo et al. .............. 349/65 |
| 2010/0085510 A1 | 4/2010 | Okuyama et al. |
| 2010/0171903 A1 | 7/2010 | Okuyama |

FOREIGN PATENT DOCUMENTS

| JP | HEI 03-119889 | 5/1991 |
| JP | 2000-101790 | 4/2000 |

(Continued)

*Primary Examiner* — Tuyen Tra
(74) *Attorney, Agent, or Firm* — Hazuki International, LLC

(57) ABSTRACT

An illumination device capable of suppressing formation of a double image in three-dimensional display, and a display unit including the illumination device are provided. In a light modulation device bonded to a light guide plate, a scattering region that scatters light propagating within the light guide plate, and a transmissive region that allows light propagating within the light guide plate to pass therethrough are formed through control of an electric field. The scattering region scatters light to generate linear illumination light. A reflector is provided directly below the light modulation device. The reflector reflects light, which is part of the scattered light generated in the scattering region and is emitted to a reflector side, to generate reflected light to be focused directly below the scattering region.

19 Claims, 39 Drawing Sheets

(51) Int. Cl.
*G02B 27/22* (2006.01)
*G02F 1/1334* (2006.01)
*G02F 1/1335* (2006.01)

(52) U.S. Cl.
CPC .. *G02F 2001/133626* (2013.01); *G02B 6/0041* (2013.01); *G02B 6/0055* (2013.01); *G02B 6/0056* (2013.01)

(56) References Cited

FOREIGN PATENT DOCUMENTS

| | | |
|---|---|---|
| JP | 2007-514273 | 5/2007 |
| JP | 2010-092682 | 4/2010 |
| JP | 2010-157475 | 7/2010 |

* cited by examiner (A)

(B)

(A) L13

(B) L12

ILLUMINATION DEVICE AND DISPLAY UNIT

CROSS REFERENCES TO RELATED APPLICATIONS

The present application is a national stage of International Application No. PCT/JP2012/061595 filed on May 2, 2012 and claims priority to Japanese Patent Application No. 2011-104767 filed on May 9, 2011, and Japanese Patent Application No. 2011-255214 filed on Nov. 22, 2011, the disclosure of which is incorporated herein by reference.

BACKGROUND

The present technology relates to, for example, an illumination device suitable for an application where a transmissive liquid crystal panel is illuminated from the back thereof, and a display unit including the illumination device. In particular, the technology relates to an illumination device suitable for a backlight of a display unit capable of performing two-dimensional display (planar display) and three-dimensional display (stereoscopic display), and a display unit including the illumination device.

Some of the display units capable of three-dimensional display demand special glasses to be worn, while others do not demand them. In the latter type of display unit, a lenticular lens or a parallax barrier is used to allow a stereoscopic image to be viewed by naked eyes. Image information is split to left and right eyes by such a component, so that different images are viewed by the two individual eyes. As a result, three-dimensional display is achieved.

Use of the parallax barrier gives realistic sensation in three-dimensional display, but impairs resolution in two-dimensional display. Thus, PTL 1 discloses a technique for performing three-dimensional display without impairing resolution in two-dimensional display. In the technique of PTL 1, the parallax barrier is configured of a liquid crystal element. When three-dimensional display is performed, the liquid crystal element is partially made untransmissive and thus acts as the parallax barrier. When two-dimensional display is performed, the liquid crystal element as a whole is made transmissive so as not to act as the parallax barrier, so that the entire image on a display screen equally enters the left and right eyes. In the technique described in PTL 1, however, light is disadvantageously absorbed by the parallax barrier during three-dimensional display, leading to low display luminance.

In contrast, for example, PTL 2 discloses a technique where polymer dispersed liquid crystal (PDLC), which is controllable to be transparent or diffusive through voltage application, is provided in the inside of a waveguide. In this technique, strip-like scattering regions are formed in part of PDLC, so that light propagating within the waveguide is scattered in each scattering region, resulting in formation of linear light sources. In this technique, the PDLC as a whole is made into a scattering region, so that light propagating within the waveguide is scattered in the scattering region, resulting in formation of a planar light source. This allows three-dimensional display and two-dimensional display to be selectively performed without providing the parallax barrier, which prevents a reduction in display luminance due to the parallax barrier.

CITATION LIST

Patent Literature

PTL 1: Japanese Unexamined Patent Application Publication No. 3-119889.
PTL 2: Japanese Unexamined Patent Application Publication (Published Japanese Translation of PCT Application) No. 2007-514273.

SUMMARY

In the waveguide described in PTL 2, when part or all of the PDLC is made into a scattering state, scattered light is emitted not only to a display panel side but also to a waveguide bottom side. Thus, the paragraph 0054 of PTL 2 describes that a reflector is provided on the bottom of the waveguide, and therefore the scattered light emitted to the waveguide bottom side is reflected toward the display panel side to increase display luminance.

When the reflector is simply provided, most reflected light is emitted to the display panel side through a region (i.e., transmissive region) different from the scattering region during three-dimensional display. As a result, light emitted from the scattering region and light emitted from the transmissive region collectively pass through the display panel, causing formation of a double image. Consequently, display quality is disadvantageously degraded.

It is therefore desirable to provide an illumination device capable of suppressing formation of a double image in three-dimensional display, and a display unit including the illumination device.

According to an embodiment of the present technology, there is provided an illumination device including an illumination optical system configured to generate linear illumination light including a plurality of pieces of linear or dot illumination light arranged two-dimensionally, and a reflector reflecting the linear illumination light. The reflector is configured to reflect the linear illumination light onto a plane or the neighborhood of the plane, the plane running through each of sites that generate the linear illumination light and being perpendicular to a plane containing the reflector. According to the present technology, there is provided a display unit including a display panel having a plurality of pixels driven based on image signals, and an illumination device configured to illuminate the display panel. The illumination device included in the display unit includes the same components as those of the above-described illumination device.

In the illumination device and the display unit according to the above-described respective embodiments of the present technology, the reflector reflects the linear illumination light so that the linear illumination light is reflected onto the plane or the neighborhood of the plane, the plane running through the site that generates the linear illumination light, and being perpendicular to a plane containing the reflector. This allows front intensity distribution and angular intensity distribution of the reflected light to be similar to front intensity distribution and angular intensity distribution of light, as part of linear illumination light, emitted to a side opposite to the reflector side.

In the above-described respective embodiments of the present technology, the reflector more preferably has a surface shape allowing the reflected light to be focused directly below the site generating the linear illumination light. Moreover, in the present technology, the reflector preferably includes a reflecting surface as part of an inner surface of a cylinder at a position opposed to the site generating the linear illumination light. In the present technology, in the case where the illumination optical system generates a plurality of pieces of dot illumination light, the reflector may have a reflecting surface as part of a spherical surface at a position opposed to each site generating the dot illumination light.

In the above-described respective embodiments of the present technology, the illumination optical system may have a first transparent substrate and a second transparent substrate disposed oppositely to each other with the sites generating the linear illumination light therebetween, and an electrode provided on a surface of one or both of the first and second transparent substrates. Furthermore, the illumination optical system may have a light source configured to apply light to an end face of the first transparent substrate, a light modulation layer provided in a clearance between the first and second transparent substrates, and a drive section configured to drive the electrode.

The light modulation layer exhibits a scattering or transparent property to light from the light source depending on magnitude of an electric field. For example, the light modulation layer exhibits a transparent property to light from the light source in the case of a relatively low electric field, while exhibiting a scattering property to light from the light source in the case of a relatively high electric field. For example, the light modulation layer may exhibit a scattering property to light from the light source in the case of a relatively low electric field, while exhibiting a transparent property to light from the light source in the case of a relatively high electric field.

When the light modulation layer has the former property, the drive section drives the electrode to allow the light modulation layer to have a plurality of first regions each exhibiting a scattering property, so that the linear illumination light is emitted from each of the first regions. On the other hand, when the light modulation layer has the latter property, the drive section does not drive the electrode to allow the light modulation layer to have a plurality of first regions each exhibiting a scattering property, so that the linear illumination light is emitted from each of the first regions.

When the light modulation layer has the former property, the drive section may be configured to drive the electrode to allow the entire light modulation layer to have the first region to allow planar illumination light to be emitted from the entire light modulation layer. On the other hand, when the light modulation layer has the latter property, the drive section may be configured not to drive the electrode to make the entire light modulation layer into a first region, so that planar illumination light is emitted from the entire light modulation layer.

According to the illumination device and the display unit of the above-described respective embodiments of the present technology, front intensity distribution and angular intensity distribution of the reflected light are allowed to be similar to front intensity distribution and angular intensity distribution of light, as part of linear illumination light, emitted to a side opposite to the reflector side. This makes it possible to reduce a proportion of illumination light emitted at a position unnecessary for three-dimensional display or in an angular direction unnecessary for three-dimensional display as compared with the case where a top of the reflector is configured of a flat surface or a paraboloid generating parallel light. Consequently, in the case where such an illumination device is used as a backlight of a display unit for three-dimensional display, it is possible to suppress formation of a double image in three-dimensional display. As a result, display quality is improved in three-dimensional display.

Additional features and advantages are described herein, and will be apparent from the following Detailed Description and the figures.

DETAILED DESCRIPTION

Hereinafter, modes for carrying out the invention are described in detail with reference to the accompanying drawings.

It is to be noted that description is made in the following order.

1. First Embodiment (Illumination device).

An example of an illumination device of an edge light type.

An example of an illumination device having a light modulation device.

2. Modifications of First Embodiment (Illumination device).

3. Second Embodiment (Illumination device).

An example of an illumination device of a directly-below type.

4. Modification of Second Embodiment (Illumination device).
5. Third Embodiment (Illumination device).
An example of an illumination device of an edge light type.
An example of an illumination device including a light guide plate having a scattering region.
6. Modifications of Third Embodiment (Illumination device).
7. Fourth Embodiment (Display unit).
An example of a display unit including the illumination device of any one of the first to third embodiments as a backlight.
8. Examples (Display unit).

1. FIRST EMBODIMENT

Figure 1:
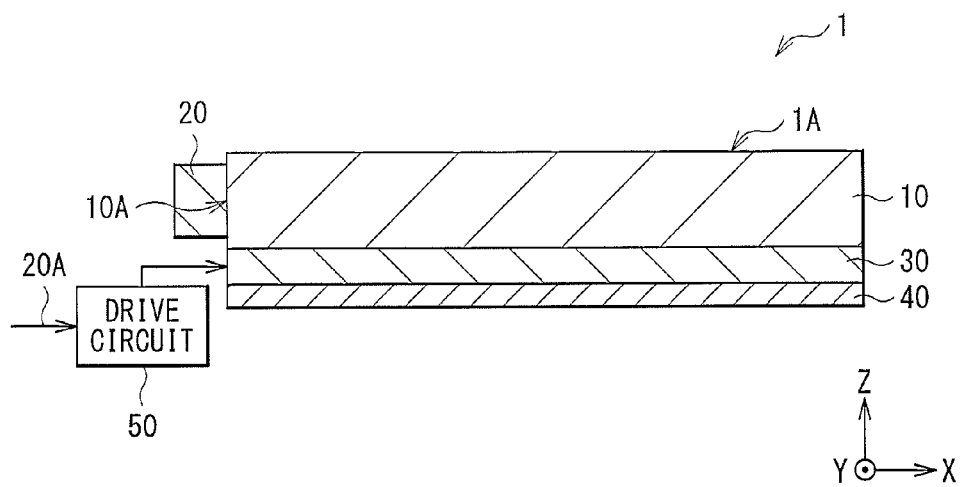
FIG. 1 is a cross-sectional view illustrating an exemplary configuration of an illumination device according to a first embodiment of the present technology.

FIG. 1 illustrates a sectional configuration of an illumination device 1 according to a first embodiment of the present technology. The illumination device 1 is applicable as a backlight of a display unit, and, for example, as illustrated in FIG. 1, includes a light guide plate 10, a light source 20 disposed on a side face of the light guide plate 10, a light modulation device 30 and a reflector 40 disposed behind the light guide plate 10, and a drive circuit 50 configured to drive the light modulation device 30.

The light guide plate 10 corresponds to a specific but not limitative example of "first transparent substrate" or "second transparent substrate". The light source 20 corresponds to a specific but not limitative example of "light source". The reflector 40 corresponds to a specific but not limitative example of "reflector". The drive circuit 50 corresponds to a specific but not limitative example of "drive section". An optical system including the light source 20 and the light modulation device 30 corresponds to a specific but not limitative example of "illumination optical system".

The light guide plate 10 guides light from the light source 20 disposed on the side face of the light guide plate 10 to a top side of the light guide plate 10 (specifically, to a light emission surface 1A of the illumination device 1). For example, the light guide plate 10 has a shape corresponding to an irradiation object (for example, a display panel 210 described later) disposed on the top of the light guide plate 10, and, for example, has a rectangular solid shape enclosed by the top, the bottom, and the side faces. Hereinafter, among the side faces of the light guide plate 10, a particular side face receiving light from the light source 20, is referred to as a light-incident surface 10A.

For example, the light guide plate 10 has a predetermined patterned shape on one or both of the top and the bottom, and has a function of scattering and equalizing light entering through the light-incident surface 10A. In the case where luminance is equalized by modulating a voltage to be applied to the light modulation device 30, it is possible to use an unpatterned flat light guide plate as the light guide plate 10. For example, the light guide plate 10 mainly includes transparent thermoplastic resin such as polycarbonate resin (PC) and acrylic resin (such as polymethyl methacrylate (PMMA)).

The light source 20 is a linear light source, examples of which include a hot cathode fluorescent lamp (HCFL), a cold cathode fluorescent lamp (CCFL), and a plurality of light emitting diodes (LEDs) arranged in a line. In the case where the light source 20 includes a plurality of LEDs, all the LEDs are each preferably a white LED from the viewpoint of efficiency, thickness reduction, and uniformity. For example, the light source 20 may include red LEDs, green LEDs, and blue LEDs. The light source 20 may be provided on only one side face of the light guide plate 10 (see FIG. 1). Alternatively, the light sources 20 may be provided on two, three, or all of the side faces of the light guide plate 10.

Figure 2:
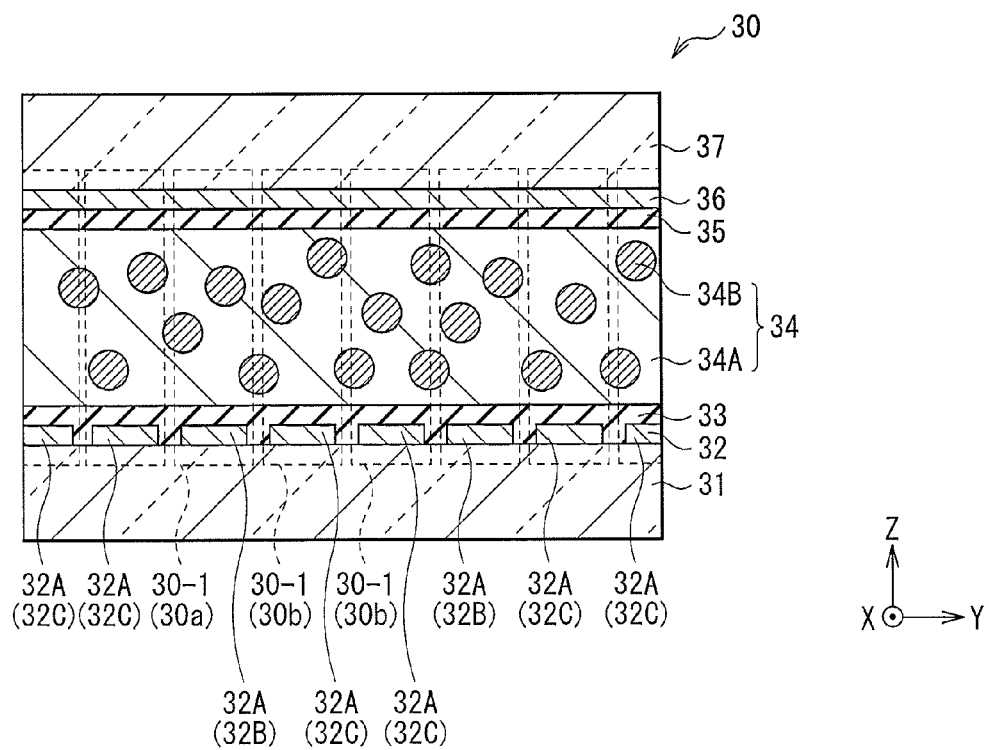
FIG. 2 is a cross-sectional view illustrating an exemplary configuration of a light modulation device in FIG. 1.

In the present embodiment, the light modulation device 30 is in tight contact with the back (bottom) of the light guide plate 10 with no air layer therebetween, and, for example, is configured to adhere to the back of the light guide plate 10 with an adhesive agent (not shown) therebetween. For example, as illustrated in FIG. 2, the light modulation device 30 includes a transparent substrate 31, a lower electrode 32, an alignment film 33, a light modulation layer 34, an alignment film 35, an upper electrode 36, and a transparent substrate 37 in order of closeness to the reflector 40. The lower electrode 32 and the upper electrode 36 each correspond to a specific but not limitative example of "electrode".

The transparent substrates 31 and 37 support the light modulation layer 34, and are each typically configured of a substrate transparent to visible light, for example, a glass plate or a plastic film. The upper electrode 36 is provided on a surface of the transparent substrate 37, the surface being opposed to the transparent substrate 31, and, for example, includes one solid film formed over the entire surface. On the other hand, the lower electrode 32 is provided on a surface of the transparent substrate 31, the surface being opposed to the transparent substrate 37, and, for example, includes a plurality of partial electrodes 32A as illustrated in FIG. 3.

Figure 3:
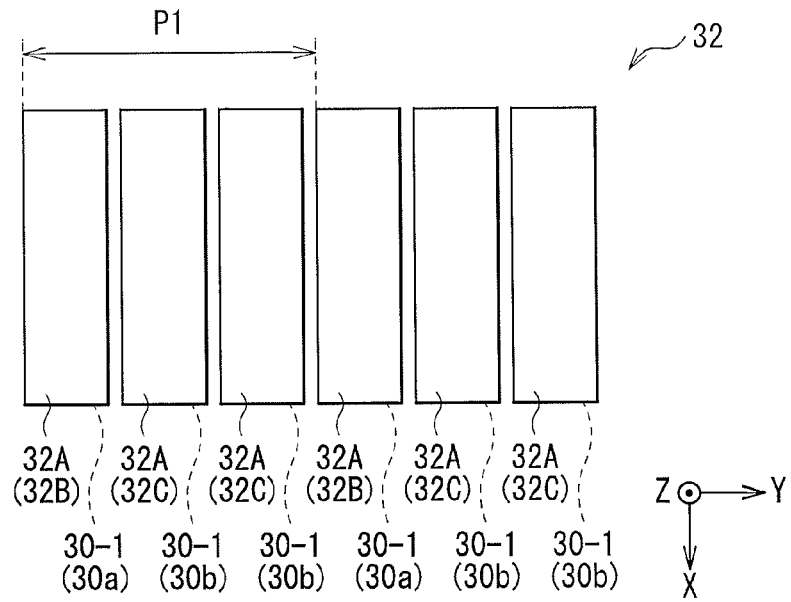
FIG. 3 is a top view illustrating an example of an electrode structure in FIG. 2.

For example, as illustrated in FIG. 3, the plurality of partial electrodes 32A each have a strip-like shape extending in one direction in a plane (for example, a direction parallel to the light-incident surface 10A). A plurality of particular partial electrodes 32A (hereinafter, referred to as "partial electrodes 32B") among the plurality of partial electrodes 32A are used for generation of linear illumination light during three-dimensional display performed by the display unit. The plurality of partial electrodes 32B are arranged at a pitch P1 corresponding to a pixel pitch P3 (see FIG. 70) (i.e., at a pitch equal or similar to the pixel pitch P3) during three-dimensional display performed by the display unit.

Among the plurality of partial electrodes 32A, a plurality of partial electrodes 32A (hereinafter, referred to as "partial electrodes 32C") other than the partial electrodes 32B are used for generation of planar illumination light together with the partial electrodes 32A during two-dimensional display performed by the display unit. Specifically, when the display unit performs two-dimensional display, all the partial electrodes 32A are used for generation of planar illumination light. The plurality of partial electrodes 32B and the plurality of partial electrodes 32C are regularly arranged in a direction orthogonal to the light-incident surface 10A. For example, as illustrated in FIGS. 2 and 3, a plurality of sets of partial electrode groups, each set including one partial electrode 32B and two partial electrodes 32C, are arranged in the direction orthogonal to the light-incident surface 10A. For example, the width of the partial electrode 32B is narrower than that of each pixel of the display unit.

Figure 4:
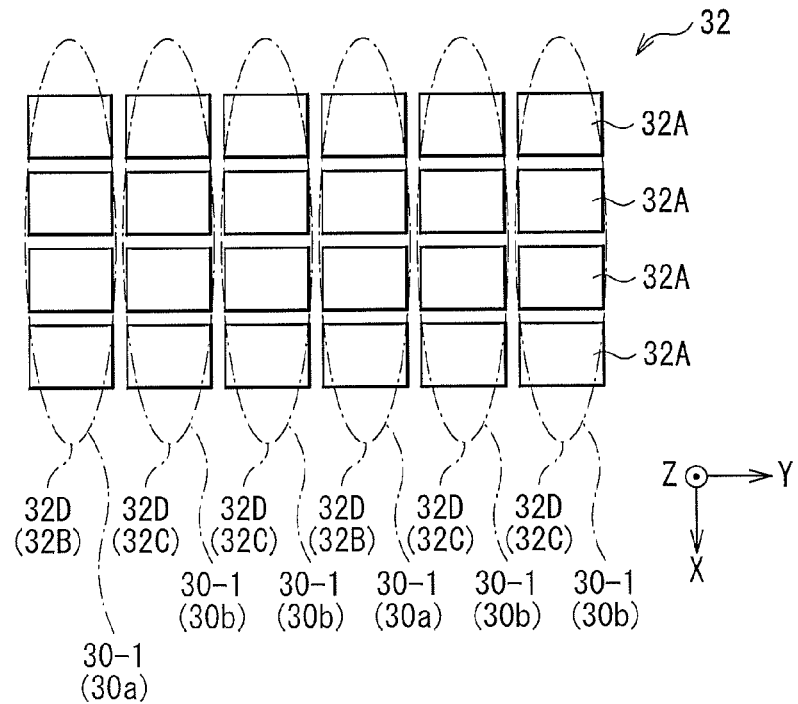
FIG. 4 is a top view illustrating a first Modification of the electrode structure in FIG. 2.

For example, as illustrated in FIG. 4, the partial electrodes 32A may be configured such that each partial electrode 32A has a block shape, and the plurality of partial electrodes 32A are arranged two-dimensionally. In such a case, when the plurality of partial electrodes 32A are considered as one linear electrode 32D, each linear electrode 32D may be used as the partial electrode 32B or 32C described above. For example, among the plurality of linear electrode 32D, a plurality of particular linear electrodes 32D are used as the partial electrodes 32B. Among the plurality of linear electrodes 32D, a plurality of linear electrodes 32D, excluding the linear electrodes 32D used as the partial electrodes 32B, are used as the partial electrodes 32C.

In the case where each partial electrode 32A has a block shape, and the plurality of partial electrodes 32A are arranged two-dimensionally, the individual partial electrodes 32A may be used for generation of dot illumination light during three-dimensional display performed by the display unit. Moreover, in the case where each partial electrode 32A has a block shape and the plurality of partial electrodes 32A are arranged two-dimensionally, and when the display unit performs two-dimensional display that allows different two-dimensional images to be viewed from two perspectives, the individual partial electrodes 32A may also be used for generation of dot illumination light.

Figure 5:
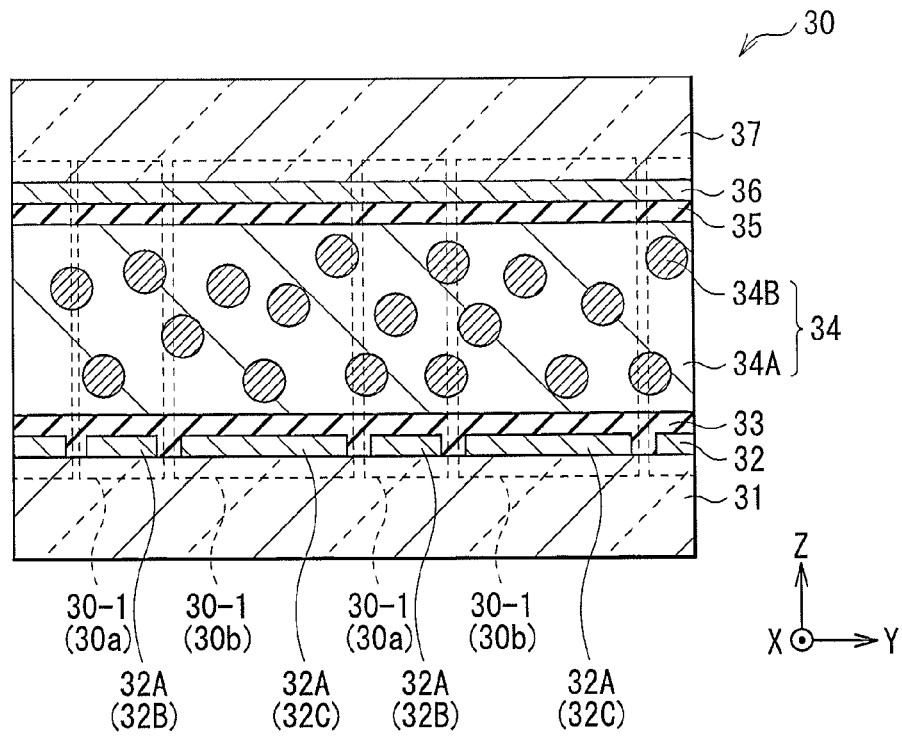
FIG. 5 is a top view illustrating a second Modification of the electrode structure in FIG. 2.
Figure 6:
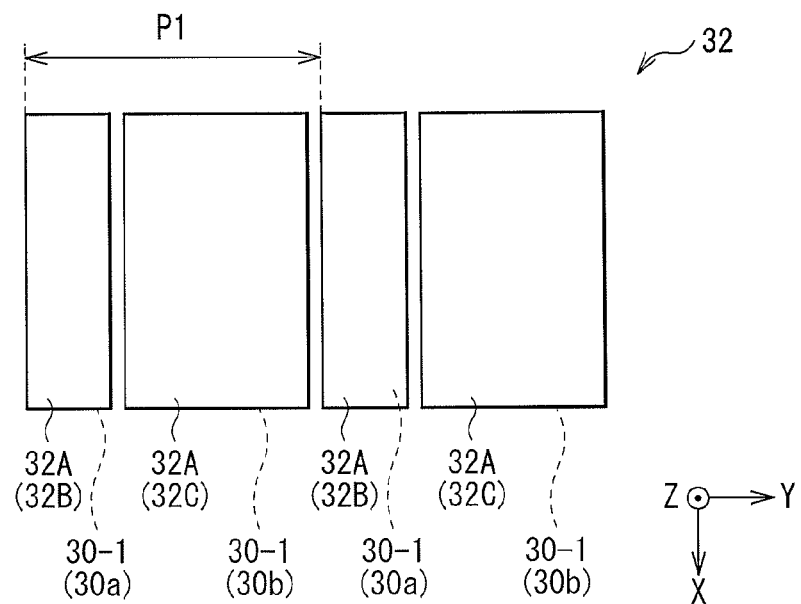
FIG. 6 is a top view illustrating an example of the electrode structure in FIG. 5.
Figure 7:
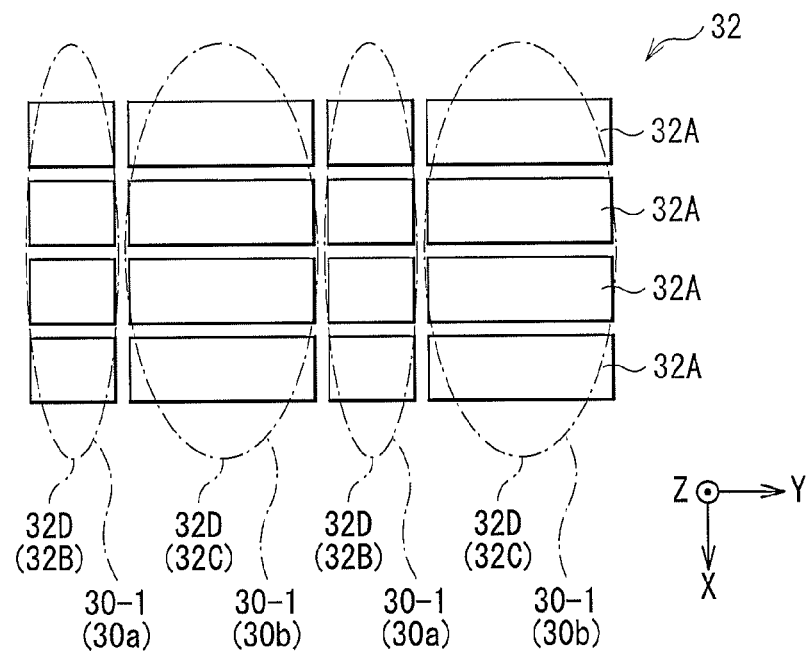
FIG. 7 is a top view illustrating another example of the electrode structure in FIG. 5.

In addition, for example, as illustrated in FIGS. 5 and 6, a partial electrode 32C having a width larger than that of the partial electrode 32B may be provided between partial electrodes 32B adjacent to each other. In this case, for example, as illustrated in FIG. 7, each partial electrode 32B may be configured of a plurality of partial electrodes 32A, and each partial electrode 32C may also be configured of a plurality of partial electrodes 32A.

Figure 8:
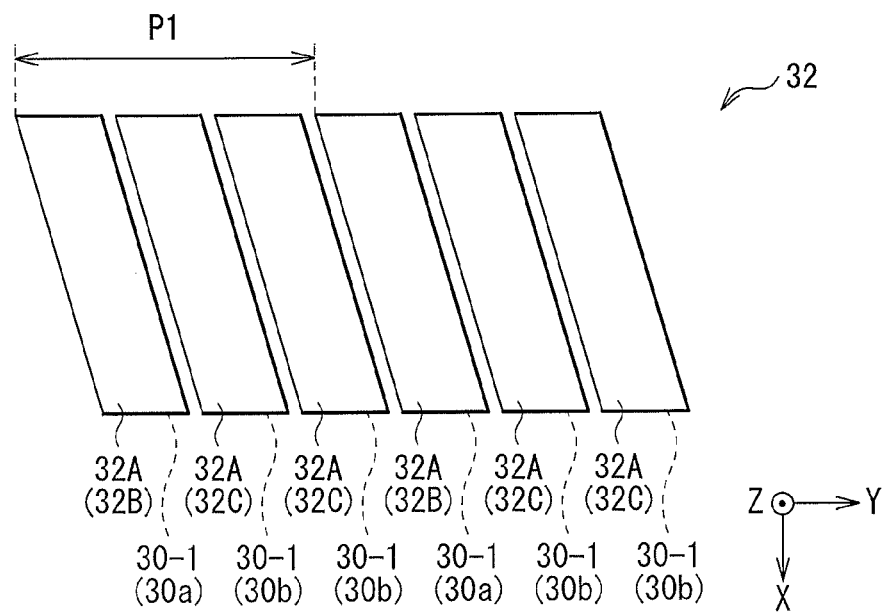
FIG. 8 is a top view illustrating a third Modification of the electrode structure in FIG. 2.
Figure 9:
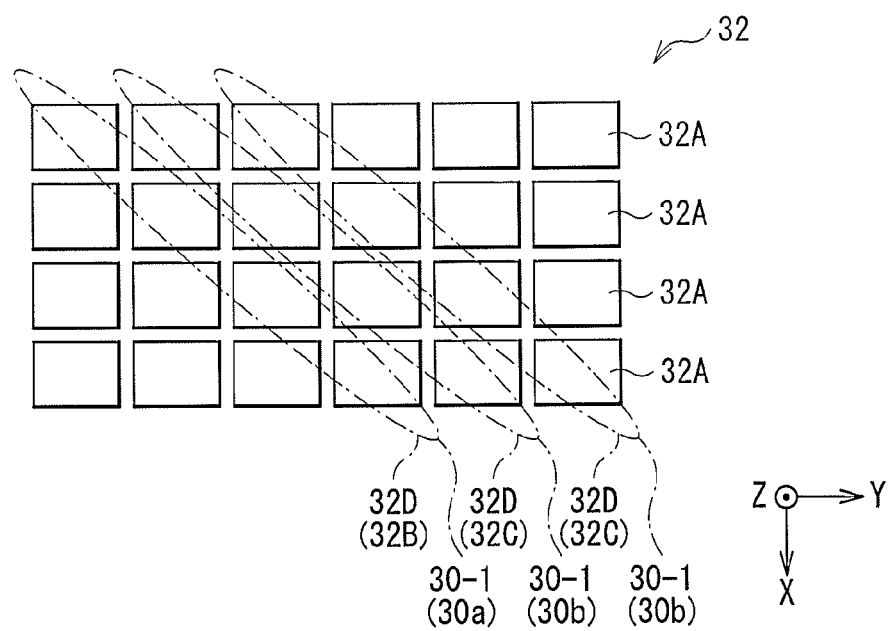
FIG. 9 is a top view illustrating a fourth Modification of the electrode structure in FIG. 2.

Moreover, for example, as illustrated in FIG. 8, each partial electrode 32A may extend in a direction obliquely crossing the light-incident surface 10A at an angle other than the right angle. Moreover, in the case where each partial electrode 32A has a block shape and a plurality of partial electrodes 32A are arranged two-dimensionally, each linear electrode 32D may extend in a direction obliquely crossing the light-incident surface 10A at an angle other than the right angle, for example, as illustrated in FIG. 9. In the case where each partial electrode 32A extends in a direction obliquely crossing the normal to the light-incident surface 10A, the extending direction of the partial electrode 32A is preferably a direction crossing an arrangement direction of pixels of the display panel 210 described later. In the case of such a configuration, it is possible to reduce a difference between resolution in a direction parallel to the normal to the light-incident surface 10A and resolution in a direction parallel to the light-incident surface 10A during three-dimensional display.

Each of the lower electrode 32 and the upper electrode 36 is configured of a transparent conductive film. For example, the transparent conductive film preferably has properties as represented by the following expression (see (A) of FIG. 10). For example, the transparent conductive film is configured of an ITO-containing film (hereinafter, referred to as "ITO film"). It is to be noted that each of the lower electrode 32 and the upper electrode 36 may be configured of indium zinc oxide (IZO), metal nanowire, carbon nanotube, graphene, etc.

$$|A1-A2| \leq 2.00$$

A1: maximum optical absorptance (%) in 450 nm to 650 nm both inclusive.

A2: minimum optical absorptance (%) in 450 nm to 650 nm both inclusive.

Visible light is used as the illuminating light; hence, differences in optical absorbance of the transparent conductive film are preferably small within a range of 380 nm to 780 nm both inclusive. A difference between the maximum value and the minimum value of optical absorptance is preferably 10.00 or less, and more preferably 7.00 or less within the range of 380 nm to 780 nm both inclusive. In particular, in the case where the transparent conductive film is used for the backlight, the difference between the maximum value and the minimum value of optical absorptance is preferably 2.00 or less, and more preferably 1.00 or less within a wavelength range of a light source to be used. For example, in the case where typical LED is used as the light source, the difference between the maximum value and the minimum value of optical absorptance is preferably 2.00 or less, and more preferably 1.00 or less within a range of 450 nm to 650 nm both inclusive. The optical absorptance is measured by V-550 from Jasco Corporation in such a manner that reflectance and transmittance are measured at an incidence angle of 5° from a normal direction to a substrate, and the optical absorptance is determined as a value obtained by subtracting the values of the reflectance and the transmittance from 100%.

Figure 10:
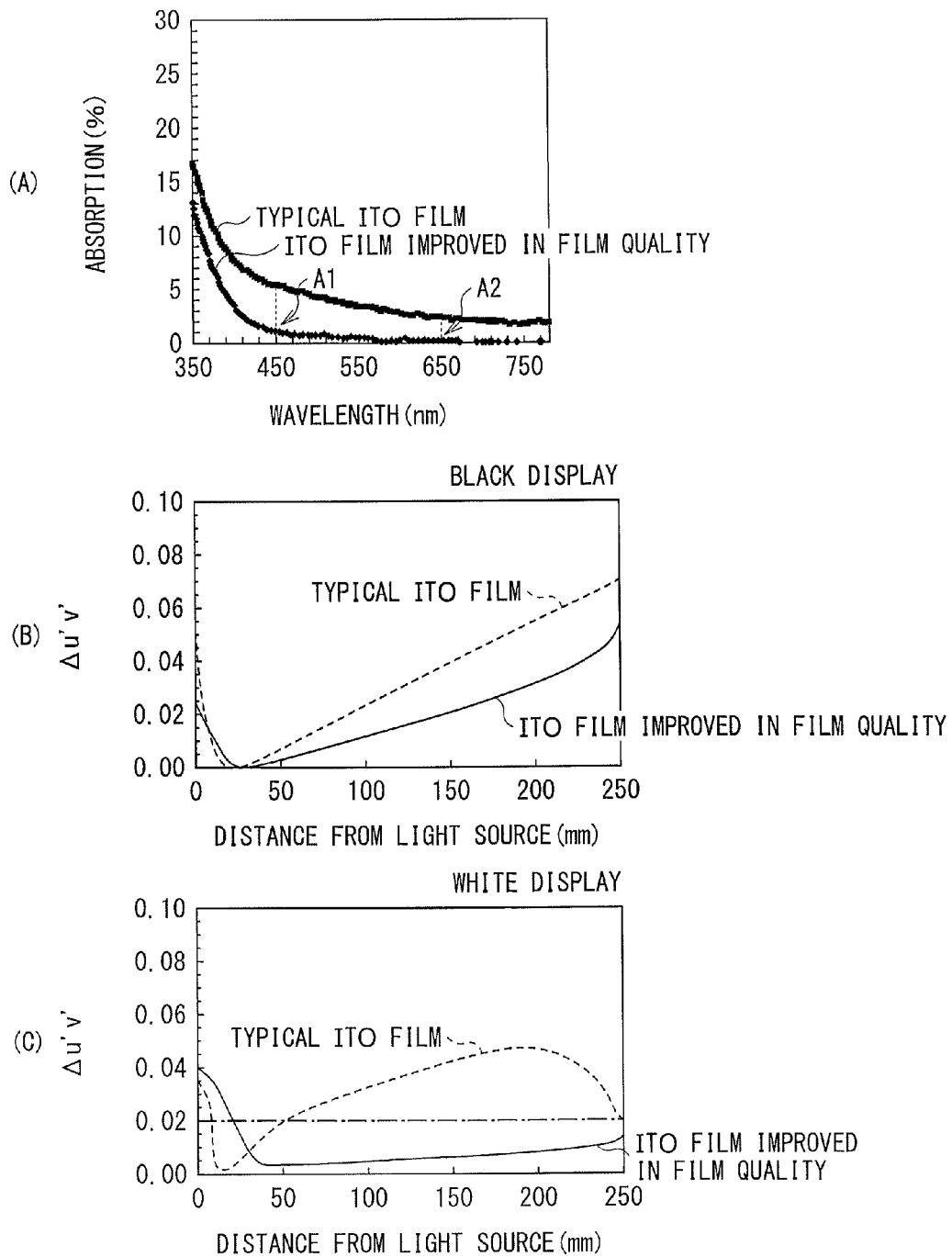
FIGS. 10A, 10B, and 10C is a diagram illustrating exemplary optical characteristics of an ITO film and exemplary place dependence of variation in chromaticity of a backlight.
Figure 11:
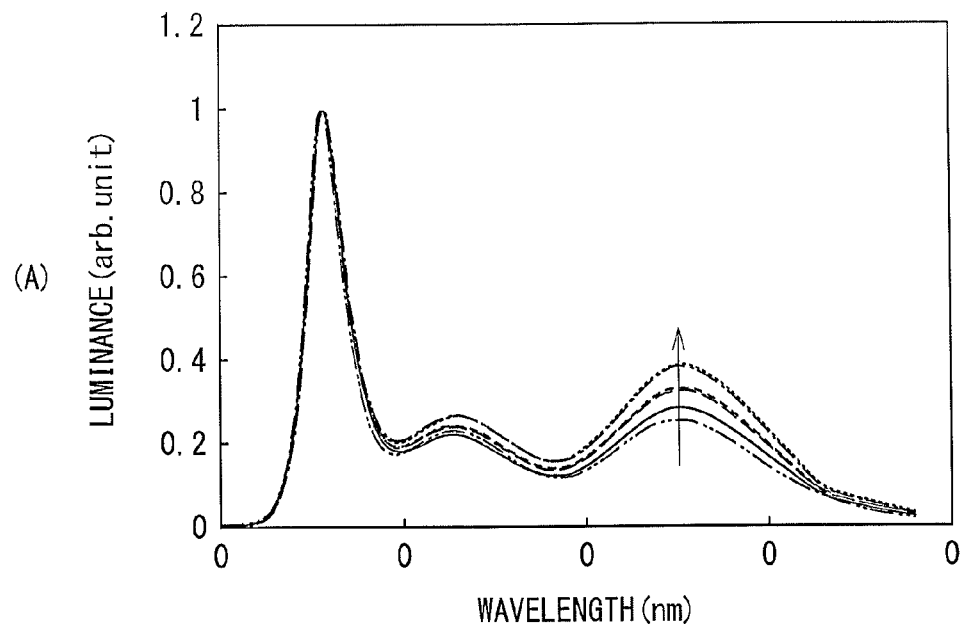
FIGS. 11A and 11B is a diagram illustrating exemplary positional dependence of a light guide spectrum.
Figure 11:
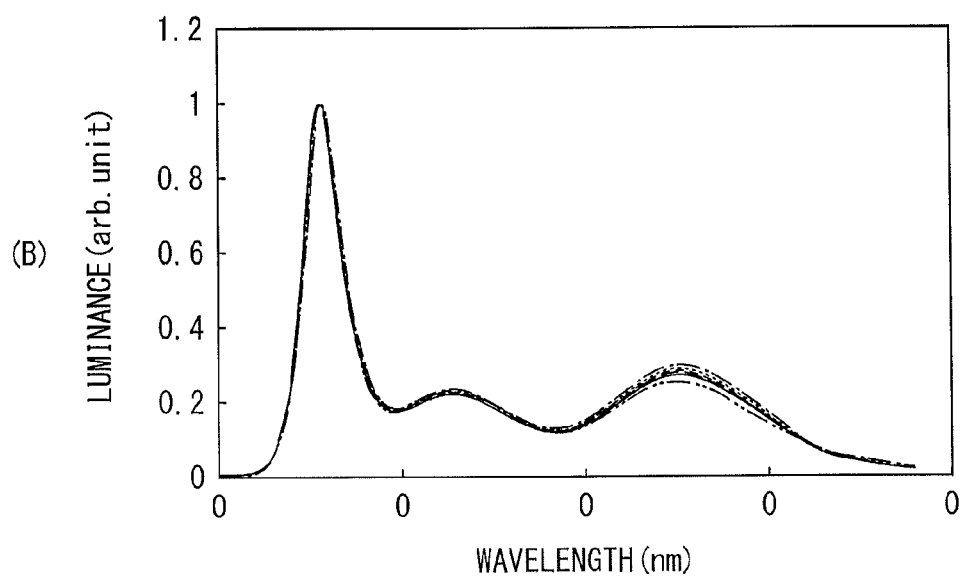

In this way, in the case where the transparent conductive film has the properties as represented by the above expression, and when light emitted from the light source 20 repeatedly passes through the transparent conductive film in the light modulation device 30 during propagation of the light within the light guide plate 10, wavelength dependence of light absorption is suppressed. In the case where the transparent conductive film includes a typical ITO film, a longer wavelength component increases with an increase in distance from the light source 20, for example, as illustrated by broken lines in (B) and (C) of FIG. 10 and by an arrow in (A) of FIG. 11. On the other hand, in the case where the transparent conductive film includes an ITO film improved in film quality, the ITO film having the properties as represented by the above expression, a longer wavelength component increases with an increase in distance from the light source 20 at a reduced rate, for example, as illustrated by solid lines in (B) and (C) of FIG. 10 and in (B) of FIG. 11. It is to be noted that $\Delta u'v'$ shown as the vertical scale of each of (B) and (C) of FIG. 10 is an index that correspondingly indicates an increase in longer wavelength component with an increase in value of the index.

For example, in the case where each of the lower electrode 32 and the upper electrode 36 is configured of an ITO film, a certain portion of an optical path along which light is being guided (for example, one or both of the light guide plate 10 and the light modulation device 30) preferably contains a dye or pigment that more absorbs light in a long wavelength range than light in a short wavelength range. Known dye or pigment materials may be used as the dye or pigment. In particular, in the case where an ultraviolet irradiation process is used for formation of the light modulation layer 34, for example, after formation of the light modulation device 30, the light guide plate 10 containing the dye or pigment is preferably bonded to the light modulation device 30, or the portion containing the dye or pigment is preferably protected from ultraviolet rays by an ultraviolet absorbing layer. In this way, a certain portion of an optical path, along which light is being guided, contains the dye or pigment, and thus when light emitted from the light source 20 repeatedly passes through the light modulation device 30 during propagation of the light within the light guide plate 10, light is absorbed by the light modulation device 30 including the ITO film while wavelength dependence of light absorption is suppressed.

When the lower electrode 32 and the upper electrode 36 are viewed from the normal direction to the light modulation device 30, a portion of the light modulation device 30, the portion corresponding to a region where the lower electrode 32 is opposed to the upper electrode 36, configures a light modulation cell 30-1 (see FIGS. 2 and 5).

The light modulation cell 30-1 corresponds to a portion of the light modulation device 30, the portion corresponding to a region where each partial electrode 32A is opposed to the upper electrode 36. Among the plurality of light modulation cells 30-1, cells 30a each including the partial electrode 32B (see FIGS. 2 to 9) are used for generation of linear illuminating light during three-dimensional display performed by the display unit. Among the plurality of light modulation cells 30-1, cells 30b each including the partial electrode 32C (see FIGS. 2 to 9) are used for generation of planar illumination light together with the plurality of cells 30a during two-dimensional display performed by the display unit. Specifically, when the display unit performs two-dimensional display, all the light modulation cells 30-1 are used for generation of planar illumination light.

The light modulation cells 30-1 are individually drivable by applying a predetermined voltage between each partial electrode 32A and the upper electrode 36, and each exhibit a transparent or scattering property to light from the light source 20 depending on the magnitude of a voltage value applied between the partial electrode 32A and the upper electrode 36. It is to be noted that the transparent property and the scattering property are described in detail in description of the light modulation layer 34.

For example, the alignment films 33 and 35 are provided to align the liquid crystal or monomer used for the light modulation layer 34. Examples of types of the alignment film include a vertical alignment film and a horizontal alignment film, and the horizontal alignment film is used as each of the alignment films 33 and 35 in the present embodiment. Examples of the horizontal alignment film include an alignment film formed through rubbing of polyimide, polyamide-imide, polyvinyl alcohol, etc., and an alignment film having a groove pattern provided thereon by transfer, etching, etc. Examples of the horizontal alignment film include an alignment film formed by obliquely evaporating an inorganic material such as silicon oxide, a diamond-like carbon alignment film formed by ion beam irradiation, and an alignment film having electrode pattern slits. In the case where a plastic film is used for each of the transparent substrates 31 and 37, baking temperature is preferably as low as possible after the alignment films 33 and 35 are applied onto the respective surfaces of the transparent substrates 31 and 37 in a manufacturing process: hence, polyamide-imide, which allows film formation at a temperature of 100° C. or less, is preferably used for the alignment films 33 and 35.

Each of the vertical and horizontal alignment films may have only the function of aligning the liquid crystal or the monomer, i.e., may not have reliability for repeated voltage application demanded for a typical liquid crystal display. The reason for this is that the reliability for voltage application after device fabrication is determined by an interface between a polymerization product of the monomer and the liquid crystal. Even if the alignment film is not used, the liquid crystal or the monomer used for the light modulation layer 34 may also be aligned by, for example, applying an electric or magnetic field between the lower electrode 32 and the upper electrode 36. Specifically, the light modulation cell is irradiated with ultraviolet rays while the electric or magnetic field is applied between the lower electrode 32 and the upper electrode 36, and thus it is possible to fix an alignment state of the liquid crystal or the monomer while no voltage is applied. When voltage is used for formation of the alignment film, electrodes are separately provided for alignment and drive. Alternatively, dual-frequency liquid crystal, of which the sign of dielectric constant anisotropy is inverted depending on frequencies, may be used as a liquid crystal material. When the magnetic field is used for formation of the alignment film, a material having large susceptibility anisotropy is preferably used for the alignment film. For example, a material having many benzene rings is preferably used.

The light modulation layer 34 exhibits a scattering or transparent property to light from the light source 20 depending on magnitude of an electric field. When the electric field is relatively small, the light modulation layer 34 exhibits a transparent property to the light from the light source 20. When the electric field is relatively large, the light modulation layer 34 exhibits a scattering property to the light from the light source 20. For example, as illustrated in FIG. 2, the light modulation layer 34 is configured of a composite layer containing a bulk 34A and a plurality of fine particles 34B dispersed in the bulk 34A. The bulk 34A and the fine particle 34B each have optical anisotropy.

Figure 12:
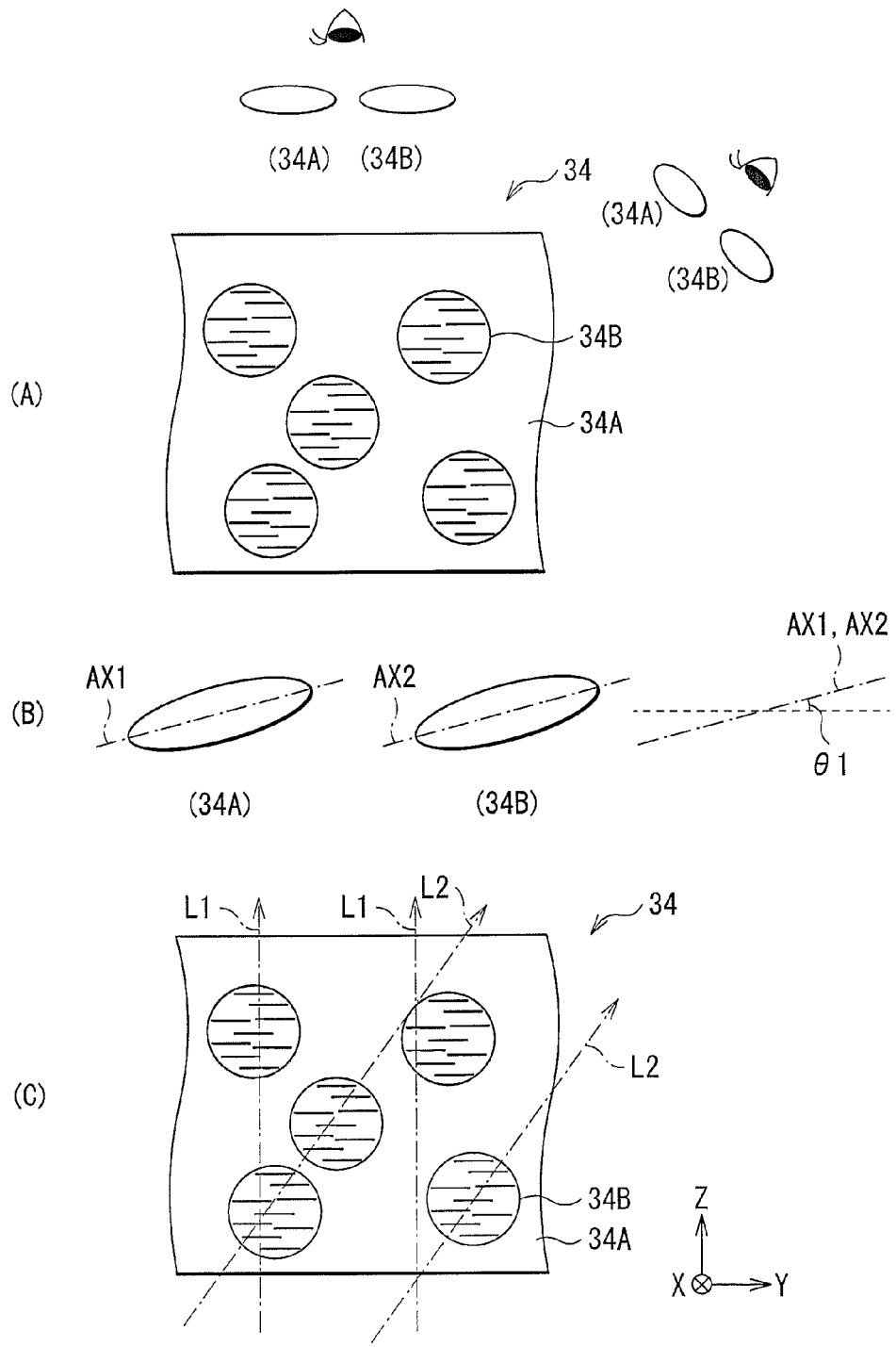
FIGS. 12A, 12B, and 12C is a schematic diagram for explaining an exemplary function of the light modulation layer in FIG. 2.

(A) of FIG. 12 schematically illustrates an exemplary alignment state within each fine particle 34B during no voltage application between the lower electrode 32 and the upper electrode 36. In (A) of FIG. 12, an alignment state within the bulk 34A is not illustrated. (B) of FIG. 12 illustrates exemplary optical indicatrices showing refractive index anisotropy of each of the bulk 34A and the fine particle 34B during no voltage application between the lower electrode 32 and the upper electrode 36. The optical indicatrices each include a tensor ellipsoid showing a refractive index of linear polarization incident from any of various directions, and allow the refractive index to be geometrically known through viewing a section of the ellipsoid in a light incidence direction. (C) of FIG. 12 schematically illustrates an exemplary state where light L1 traveling in the front direction and light L2 traveling in an oblique direction pass through the light modulation layer 34 during no voltage application between the lower electrode 32 and the upper electrode 36.

Figure 13:
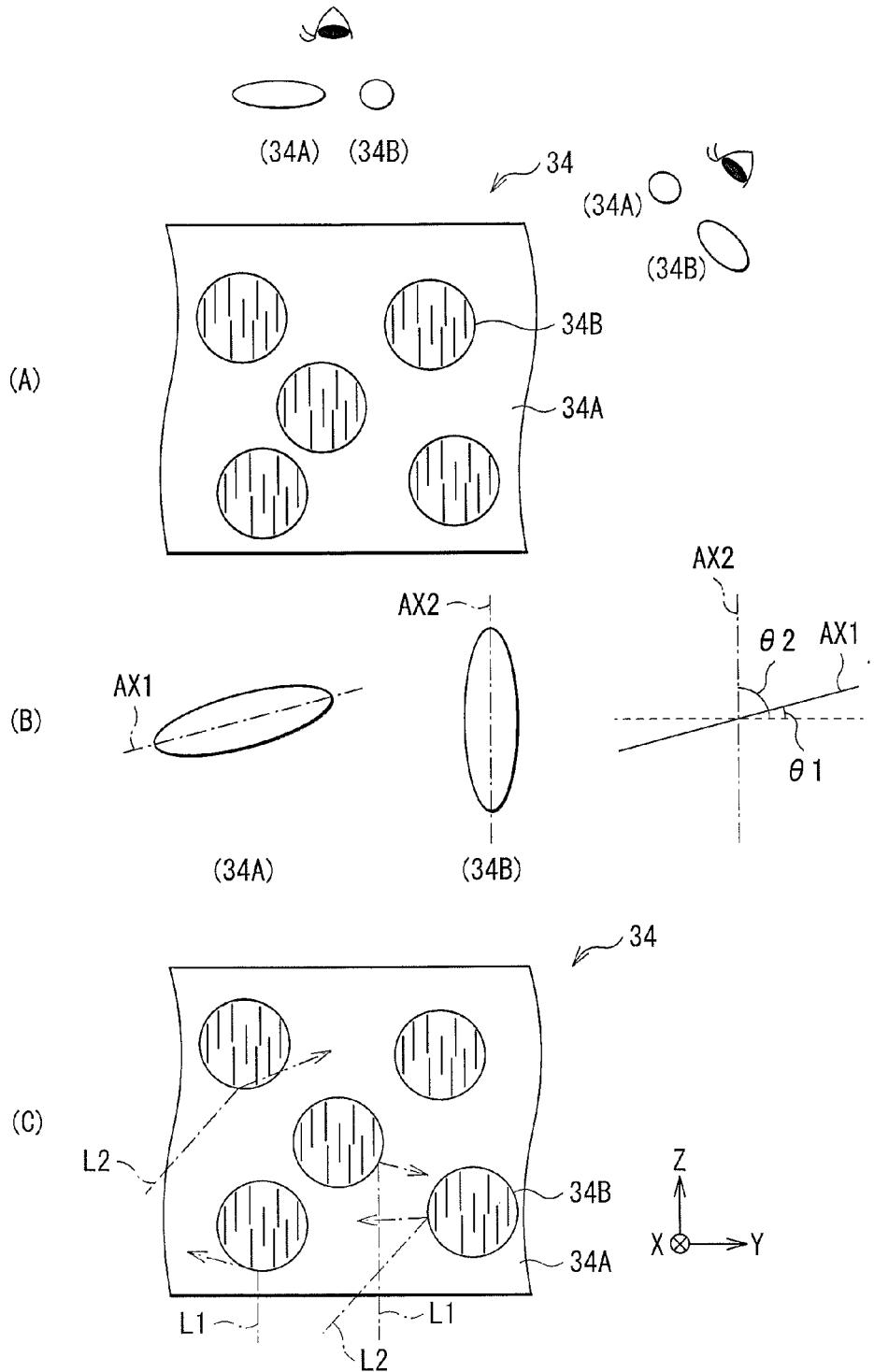
FIGS. 13A, 13B, and 13C is a schematic diagram for explaining another exemplary function of the light modulation layer in FIG. 2.

(A) of FIG. 13 schematically illustrates an exemplary alignment state within each fine particle 34B during voltage application between the lower electrode 32 and the upper electrode 36. In (A) of FIG. 13, an alignment state of the bulk 34A is not illustrated. (B) of FIG. 13 illustrates exemplary optical indicatrices showing refractive index anisotropy of each of the bulk 34A and the fine particle 34B during voltage application between the lower electrode 32 and the upper electrode 36. (C) of FIG. 13 schematically illustrates an exemplary state where light L1 traveling in the front direction and light L2 traveling in the oblique direction are scattered by the light modulation layer 34 during voltage application between the lower electrode 32 and the upper electrode 36.

For example, as illustrated in (A) and (B) of FIG. 12, the bulk 34A and the fine particles 34B are configured such that while no voltage is applied between the lower electrode 32 and the upper electrode 36, a direction of the optical axis AX1 of the bulk 34A is equal (parallel) to a direction of the optical axis AX2 of the fine particle 34B. It is to be noted that the optical axes AX1 and AX2 each refer to a line parallel to a beam traveling direction along which a refractive index has one value regardless of polarization directions. The direction of the optical axis AX1 and the direction of the optical axis AX2 may not constantly be equal to each other, i.e., may be somewhat different from each other due to manufacturing error, for example.

Moreover, for example, the fine particle 34B is configured such that while no voltage is applied between the lower electrode 32 and the upper electrode 36, the optical axis AX2 is parallel to the light-incident surface 10A of the light guide plate 10. Furthermore, for example, the fine particle 34B is configured such that while no voltage is applied between the lower electrode 32 and the upper electrode 36, the optical axis AX2 intersects with each of the surfaces of the transparent substrates 31 and 37 at a small angle θ1 (see (B) of FIG. 12). The angle θ1 is described in detail in description of materials configuring the fine particle 34B.

On the other hand, for example, the bulk 34A is configured such that the optical axis AX1 of the bulk 34A is fixed regardless of presence or absence of voltage application between the lower electrode 32 and the upper electrode 36. Specifically, for example, as illustrated in (A) and (B) of FIG. 12 and (A) and (B) of FIG. 13, the bulk 34A is configured such that the optical axis AX1 of the bulk 34A is parallel to the light-incident surface 10A of the light guide plate 10, and intersects with each of the surfaces of the transparent substrates 31 and 37 at the predetermined angle θ1. Specifically, the optical axis AX1 of the bulk 34A is parallel to the optical axis AX2 of the fine particle 34B during no voltage application between the lower electrode 32 and the upper electrode 36.

The optical axis AX2 may not constantly be parallel to the light-incident surface 10A while intersecting with each of the surfaces of the transparent substrates 31 and 37 at the angle θ1, i.e., may intersect with each of the surfaces of the transparent substrates 31 and 37 at an angle slightly different from the angle θ1 due to manufacturing error, for example. In addition, each of the optical axes AX1 and AX2 may not constantly be parallel to the light-incident surface 10A. i.e., may intersect with the light-incident surface 10A at a small angle due to manufacturing error, for example.

Figure 14:
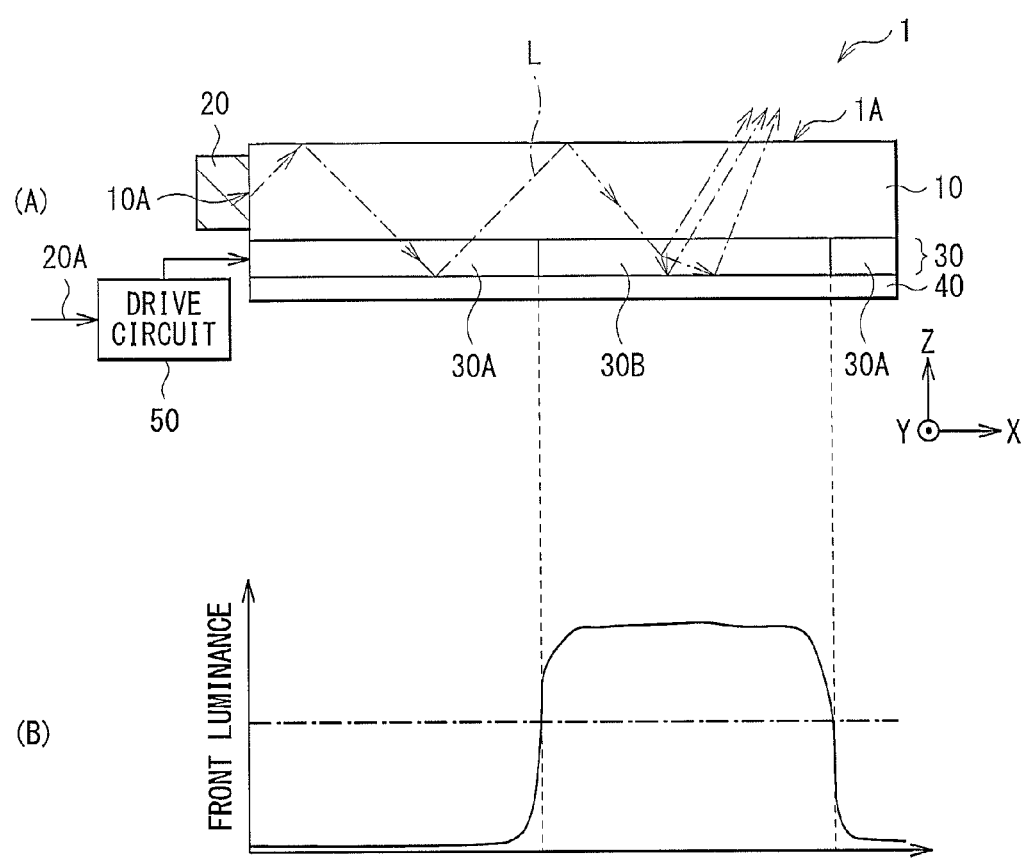
FIGS. 14A and 14B is a schematic diagram for explaining an exemplary function of the illumination device of FIG. 1.

It is preferable that the ordinary refractive index of the bulk 34A is equal to that of the fine particle 34B, and the extraordinary refractive index of the bulk 34A is equal to that of the fine particle 34B. In such a case, for example, while no voltage is applied between the lower electrode 32 and the upper electrode 36, as illustrated in (A) of FIG. 12, almost no difference in refractive index exists between all directions including the front direction and the oblique direction, leading to high transparency. Consequently, for example, as illustrated in (C) of FIG. 12, the light L1 traveling in the front direction and the light L2 traveling in the oblique direction pass through the light modulation layer 34 without being scattered in the light modulation layer 34. As a result, for example, as illustrated in (A) and (B) of FIG. 14, light L (light in the oblique direction) from the light source 20 is totally reflected by any of interfaces (the bottom of the transparent substrate 31 and the top of the light guide plate 10) of a transparent region (transmissive region 30A) in the light modulation layer 34, and thus luminance of the transmissive region 30A (luminance in black display) is lowered compared with a case where light is uniformly emitted over the entire area (a dashed-dotted line in (B) of FIG. 14). The profile of the front luminance in (B) of FIG. 14 is obtained by measuring front luminance through a diffuser sheet (not shown) provided on the light guide plate 10.

When the illumination device 1 is used as the backlight of the display unit, the top of the light guide plate 10 (light emission surface 1A in FIG. 14), which is one of the interfaces of the transmissive region 30A, is preferably in contact with a material having a refractive index lower than that of the top of the light guide plate 10. Such a material having the low refractive index typically includes air. When the illumination device 1 is used as the backlight of the display unit, and in the case where the top of the light guide plate 10 is bonded to another optical component (for example, a display panel) within the display unit, the material having the low refractive index, which is to be in contact with the top of the light guide plate 10, may be a bonding agent or an adhesive agent.

For example, as illustrated in (A) and (B) of FIG. 13, the bulk 34A and the fine particles 34B are configured such that while voltage is applied between the lower electrode 32 and the upper electrode 36, the direction of the optical axis AX1 is different from (intersect with or is substantially orthogonal to) the direction of the optical axis AX2. Furthermore, for example, the fine particle 34B is configured such that while voltage is applied between the lower electrode 32 and the upper electrode 36, the optical axis AX2 of the fine particle 34B is parallel to the light-incident surface 10A of the light guide plate 10, and intersects with each of the surfaces of the transparent substrates 31 and 37 at an angle θ2 (for example, 90°) larger than the angle θ1. The angle θ2 is described in detail in description of the materials configuring the fine particle 34B.

As a result, while voltage is applied between the lower electrode 32 and the upper electrode 36, a difference in refractive index increases in all directions including the front direction and the oblique direction in the light modulation layer 34, leading to a high scattering property of the light modulation layer 34. Consequently, for example, as illustrated in (C) of FIG. 13, the light L1 traveling in the front direction and the light L2 traveling in the oblique direction are scattered in the light modulation layer 34. As a result, for example, as illustrated in (A) of FIG. 14, the light L (light in the oblique direction) from the light source 20 passes through an interface (an interface between the transparent substrate 31 or the light guide plate 10 and air) of a scattering region 30B, and light transmitted to the reflector 40 side is reflected by the reflector 40 and passes through the light modulation device 30. Consequently, luminance of the scattering region 30B is extremely high compared with the case where light is uniformly emitted over the entire area (the dashed-dotted line in (B) of FIG. 14), and luminance in partial white display (luminance enhancement) increases in correspondence to a reduction in luminance of the transmissive region 30A. The scattering region 30B corresponds to a specific but not limitative example of "first region" of the present technology.

The ordinary refractive index of the bulk 34A and the ordinary refractive index of the fine particle 34B may be somewhat different from each other due to manufacturing error, for example. For example, such a difference is preferably 0.1 or less, and more preferably 0.05 or less. The extraordinary refractive index of the bulk 34A and the extraordinary refractive index of the fine particle 34B may also be somewhat different from each other due to manufacturing error, for example. For example, such a difference is preferably 0.1 or less, and more preferably 0.05 or less.

The refractive index difference of the bulk 34A ($\Delta n_p$=extraordinary refractive index $ne_p$–ordinary refractive index $no_p$) and the refractive index difference of the fine particle 34B ($\Delta n_L$=extraordinary refractive index $ne_L$–ordinary refractive index $no_L$) are each preferably as large as possible, and are each preferably 0.05 or more, more preferably 0.1 or more, and still more preferably 0.15 or more. The reason for this is that when the refractive index difference of each of the bulk 34A and the fine particle 34B is large, the light modulation layer 34 exhibits higher scattering performance, and thus a light guiding condition is allowed to be easily broken, and consequently light is easily extracted from the light guide plate 10.

Figure 15:
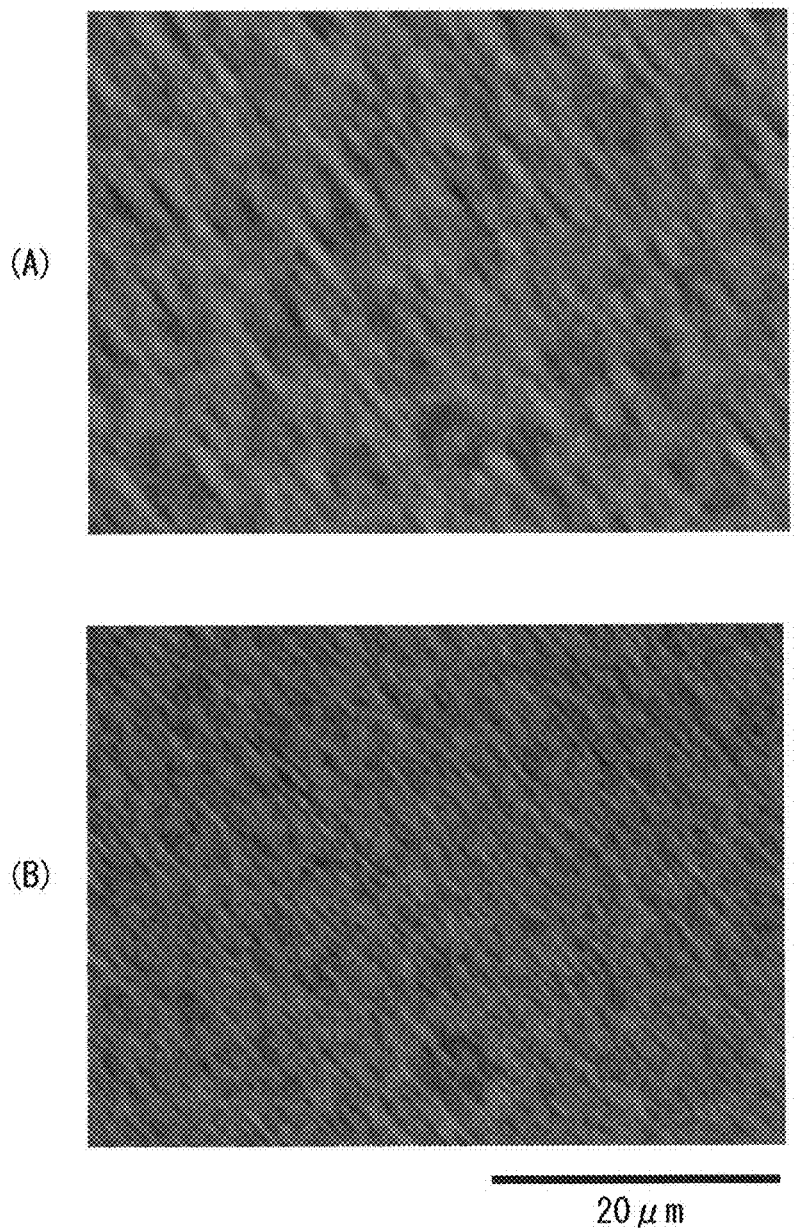
FIGS. 15A and 15B is a diagram illustrating an exemplary streaky structure of a bulk in FIG. 2.

The response speed to an electric field of the bulk 34A is different from that of the fine particle 34B. For example, the bulk 34A has a streaky structure (see (A) and (B) of FIG. 15), a porous structure, or a rod-like structure having a response speed slower than that of the fine particle 34B. (A) and (B) of FIG. 15 show polarization microscope photographs during application of an electric field to the light modulation device 30, where each of streaky and bright portions corresponds to the streaky structure. (A) of FIG. 15 illustrates the streaky structure of the bulk 34A at a weight ratio of liquid crystal to monomer of 95:5. (B) of FIG. 15 illustrates the streaky structure of the bulk 34A at a weight ratio of liquid crystal to monomer of 90:10. For example, the bulk 34A is formed of a polymer material produced through polymerization of low-molecular monomer. For example, the bulk 34A is formed by polymerizing a material having alignable and polymerizable properties (for example, monomer) by one or both of heat and light, the material having been aligned along an alignment direction of the fine particle 34B or of the alignment film 33 or 35.

For example, the streaky structure, the porous structure, or the rod-like structure of the bulk 34A has the major axis in a direction that is parallel to the light-incident surface 10A of the light guide plate 10, and intersects with each of the surfaces of the transparent substrates 31 and 37 at a small angle θ1. In the case where the bulk 34A has the streaky structure, average streaky structure size in a minor axis direction is preferably 0.1 µm to 10 µm both inclusive, and is more preferably in a range of 0.2 µm to 2.0 µm both inclusive, from the viewpoint of enhancing scattering of guided light. In the case where the average streaky structure size in the minor axis direction is 0.1 µm to 10 µm both inclusive, the scattering performance in the light modulation device 30 is substantially even in a visible range of 380 nm to 780 nm both inclusive. This prevents only light having a particular wavelength component from increasing or decreasing in a plane, making it possible to achieve good light balance in a plane within the visible range. If the average streaky structure size in the minor axis direction is less than 0.1 µm or exceeds 10 µm, the light modulation device 30 exhibits low scattering performance regardless of wavelengths, and is thus less likely to function as a light modulation device.

From the viewpoint of reducing wavelength dependence of light scattering, the average streaky structure size in the minor axis direction is preferably 0.5 µm to 5 µm both inclusive, and is more preferably within a range of 1 µm to 3 µm both inclusive. In the case of such a configuration, when light emitted from the light source 20 repeatedly passes through the bulk 34A in the light modulation device 30 during propagation of the light within the light guide plate 10, wavelength dependence of light scattering in the bulk 34A is suppressed. The size of the streaky structure is observed by a polarization microscope, a confocal microscope, an electron microscope, etc.

On the other hand, for example, the fine particle 34B mainly includes a liquid crystal material, and has a sufficiently fast response speed compared with the response speed of the bulk 34A. Examples of the liquid crystal material (liquid crystal molecules) contained in the fine particle 34B include rod-like molecules. A liquid crystal molecule having positive dielectric constant anisotropy (so-called positive liquid crystal) is preferably used as the liquid crystal molecule contained in the fine particle 34B.

While no voltage is applied between the lower electrode 32 and the upper electrode 36, the major axis direction of each liquid crystal molecule is parallel to the optical axis AX1 in the fine particle 34B. Here, the major axis of each liquid crystal molecule in the fine particle 34B is parallel to the light-incident surface 10A of the light guide plate 10, and intersects with each of the surfaces of the transparent substrates 31 and 37 at a small angle θ1. Specifically, while no voltage is applied between the lower electrode 32 and the upper electrode 36, the liquid crystal molecules in the fine particle 34B are aligned while being tilted by the angle θ1 in a plane parallel to the light-incident surface 10A of the light guide plate 10. The angle θ1, which is referred to as pretilt angle, is preferably within a range of 0.1° to 30° both inclusive, for example. The angle θ1 is more preferably within a range of 0.5° to 10° both inclusive, and still more preferably within a range of 0.7° to 2° both inclusive. When the angle θ1 is increased, scattering efficiency tends to be reduced due to the reason as described later. In addition, an excessively decreased angle θ1 causes a variation in azimuth angle at which liquid crystal rises upon voltage application. For example, rising of liquid crystal may occur in 180 degrees opposite orientation (i.e., reverse tilt may occur). This prevents effective use of the difference in refractive index between the fine particle 34B and the bulk 34A, leading to a reduction in scattering efficiency, and consequently luminance tends to be reduced.

While voltage is applied between the lower electrode 32 and the upper electrode 36, the major axis direction of each liquid crystal molecule intersects with (or is orthogonal to) the optical axis AX1 in the fine particle 34B. Here, the major axis of each liquid crystal molecule in the fine particle 34B is parallel to the light-incident surface 10A of the light guide plate 10, and intersects with each of the surfaces of the transparent substrates 31 and 37 at an angle θ2 (for example, 90°) larger than the angle θ1. Specifically, while voltage is applied between the lower electrode 32 and the upper electrode 36, each liquid crystal molecule in the fine particle 34B is aligned while being tilted by the angle θ2 in a plane parallel to the light-incident surface 10A of the light guide plate 10 or while straightly standing at the angle θ2 (=90°).

Although any material, which is optically anisotropic and compoundable with liquid crystal, may be used as the above-described monomer having alignable and polymerizable properties, low-molecular monomer, which is curable with ultraviolet rays, is preferably used in the present embodiment. During no voltage application, the direction of optical anisotropy of the liquid crystal is preferably equal to that of a polymerization product of the low-molecular monomer (a polymer material). Hence, the liquid crystal and the low-molecular monomer are preferably aligned in the same direction before ultraviolet curing. In the case where liquid crystal is used as the fine particle 34B, and when the liquid crystal includes rod-like molecules, the monomer material to be used also preferably has a rod-like shape. Consequently, a material having both polymerizable and liquid-crystalline properties is preferably used as the monomer material. Preferred examples of the monomer material include a material having, as a polymerizable functional group, one or more functional group selected from a group configured of an acrylate group, a methacrylate group, an acryloyloxy group, a methacryloyloxy group, a vinyl ether group, and an epoxy group. Such functional groups are each polymerizable through irradiation of ultraviolet rays, infrared rays, or electron beams, or through heating. A polyfunctionalized liquid-crystalline material may be added in order to suppress a reduction in degree of alignment during ultraviolet irradiation. In the case where the bulk 34A has the above-described streaky structure, a bifunctional liquid-crystalline monomer is preferably used as a material for the bulk 34A. A monofunctional monomer may be added to the material for the bulk 34A in order to adjust the temperature indicating a liquid crystallinity, or tri or more functional monomer may be added thereto in order to increase crosslink density.

For example, the drive circuit 50 controls the magnitude of a voltage applied to the pair of electrodes (the partial electrode 32A and the upper electrode 36) of each light modulation cell 30-1 such that the optical axis AX2 of the fine particle 34B is parallel or substantially parallel to the optical axis AX1 of the bulk 34A in one light modulation cell 30-1, while the optical axis AX2 of the fine particle 34B intersects with or is orthogonal to the optical axis AX1 of the bulk 34A in another light modulation cell 30-2. Specifically, the drive circuit 50 allows, through control of an electric field, the respective optical axes AX1 and AX2 of the bulk 34A and the fine particle 34B to be equal (or substantially equal) to each other, or to be different from (or orthogonal to) each other.

When the drive circuit 50 receives a signal designating three-dimensional display as a control signal 20A, the drive circuit 50 allows the light modulation device 30 to output a plurality of pieces of linear illumination light. Specifically, the drive circuit 50 applies a voltage causing the light modulation layer 34 to exhibit a scattering property to a plurality of particular partial electrodes 32B among the plurality of partial electrodes 32A, while applying a voltage causing the light modulation layer 34 to exhibit a transparent property to a plurality of partial electrodes 32C other than the plurality of partial electrodes 32B among the plurality of partial electrodes 32A. In other words, the drive circuit 50 controls the magnitude of a voltage applied to the pair of electrodes (the partial electrode 32A and the upper electrode 36) of each light modulation cell 30-1 such that the optical axis AX2 of the fine particle 34B intersects with the optical axis AX1 of the bulk 34A in each cell 30a in the light modulation device 30, while the optical axis AX2 of the fine particle 34B is parallel to the optical axis AX1 of the bulk 34A in the cell 30b in the light modulation device 30. Consequently, the drive circuit 50 allows the scattering region 30B to be formed in the cell 30a including the partial electrode 32B while allowing the transmissive region 30A to be formed in the cell 30b including the partial electrode 32C so that linear illumination light is output from the scattering region 30B.

When the drive circuit 50 receives a signal designating two-dimensional display as the control signal 20A, the drive circuit 50 allows the light modulation device 30 to output planar illumination light. Specifically, the drive circuit 50 applies a voltage causing the light modulation layer 34 to exhibit a scattering property to each partial electrode 32A. In other words, the drive circuit 50 controls the magnitude of a voltage applied to the pair of electrodes (the partial electrode 32A and the upper electrode 36) of each light modulation cell 30-1 such that the optical axis AX2 of the fine particle 34B intersects with or is orthogonal (or substantially orthogonal) to the optical axis AX of the bulk 34A in any of the light modulation cells 30-1 contained in the light modulation device 30. Consequently, the drive circuit 50 allows the scattering regions 30B to be formed in each light modulation cell 30-1 so that planar illumination light is output from the scattering region 30B.

When the drive circuit 50 receives a signal on image data in addition to a signal designating two-dimensional display as the control signal 20A, the drive circuit 50 may allow the light modulation device 30 to output planar illumination light having luminance distribution corresponding to the image data (for example, planar illumination light partially having a dark portion in a plane). In such a case, however, the lower electrodes 32 are preferably in a layout corresponding to the pixel layout of the display panel. In the case where the lower electrodes 32 are in a layout corresponding to the layout of display pixels, the drive circuit 50, depending on the image data, applies a voltage causing the light modulation layer 34 to exhibit a scattering property to part of the plurality of partial electrodes 32A, and applies a voltage causing the light modulation layer 34 to exhibit a transparent property to one or a plurality of partial electrodes 32A, to which the voltage causing the light modulation layer 34 to exhibit a scattering property is not applied, among the plurality of partial electrodes 32A.

The reflector 40 returns leakage light, which comes from the back of the light guide plate 10 through the light modulation device 30, to a light guide plate 10 side. For example, the reflector 40 has functions of reflection, diffusion, and scattering of light. This allows light emitted from the light source 20 to be efficiently used, and helps to increase front luminance. The fine pattern surface of the reflector 40 is preferably a mirror surface. In such a case, light emitted from the light modulation layer 40 is allowed to be regularly reflected (mirror-reflected), and is thus allowed to be efficiently reflected to a focal point C (described later). For example, the reflector 40 is configured of foamed PET (polyethylene terephthalate), a silver-evaporated film, a multilayer reflection film, white PET, etc. In the case where the reflector 40 is allowed to have a function of regular reflection (mirror reflection), the reflector 40 is preferably configured of the silver-evaporated film, the multilayer reflection film, and an aluminum-evaporated film, for example. In the case where the reflector 40 has a fine pattern thereon, the reflector 40 may be formed integrally with the fine pattern by a process such as heat press molding or melt extrusion molding using thermoplastic resin, or may be formed in the following way: energy-ray (for example, ultraviolet-ray) curable resin is applied onto a substrate including PET, etc., and then the pattern is transferred onto the energy-ray curable resin to complete the reflector 40. Examples of the thermoplastic resin include polycarbonate resin, acrylic resin such as PMMA (polymethylmethacrylate), polyester resin such as polyethylene terephthalate, amorphous copolymeric polyester resin such as MS (copolymer of methylmethacrylate and styrene), polystyrene resin, and polyvinyl chloride resin. In the case where the pattern is transferred onto the energy-ray (for example, ultraviolet-ray) curable resin, the substrate may include glass. In the case where the reflector 40 is importantly aligned with the light modulation device 30, the reflector 40, the light guide plate 10, the transparent substrate 31, and the transparent substrate 37 preferably include the same material, or preferably have linear expansion coefficients similar to one another. The reason for this is to prevent displacement therebetween due to variation in outside temperature or heat.

Figure 16:
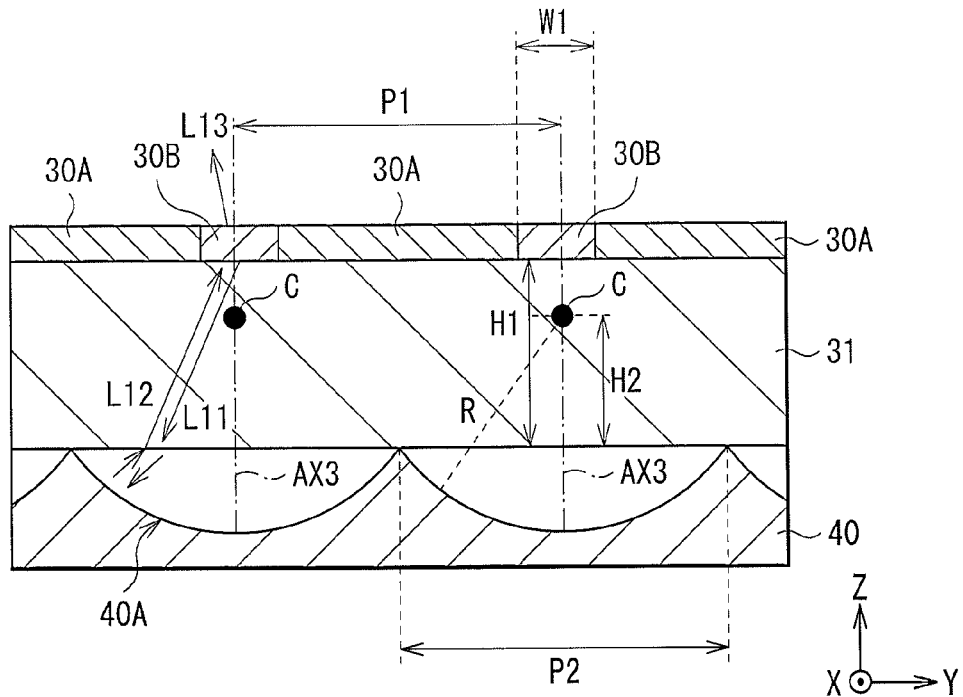
FIG. 16 is a cross-sectional view illustrating an exemplary configuration of each of the light modulation layer and a reflector in FIG. 1.

For example, as illustrated in FIG. 16, the reflector 40 is disposed at a distance H1 from the bottom of the light modulation layer 34, and has a reflecting surface 40A on a side close to the light modulation layer 34. The reflecting surface 40A reflects part of light emitted from the light source 20 toward the light emission surface 1A. Specifically, when the display unit performs three-dimensional display, the reflector 40 reflects linear illumination light generated in the scattering region 30B to generate reflected light to be focused.

When the display unit performs three-dimensional display, the reflector 40 may reflect linear illumination light, as an aggregation of a plurality of pieces of dot illumination light generated in the scattering region 30B, to generate reflected light to be focused. Moreover, when the display unit performs two-dimensional display that allows different two-dimensional images to be viewed from two perspectives, the reflector 40 may reflect dot illumination light generated in the scattering region 30B to generate reflected light to be focused.

The reflector 40 reflects light toward a plane or the neighborhood of the plane, the plane running through each of sites (the scattering regions 30B) that generate the linear illumination light, and being perpendicular to a plane containing the reflector 40. Specifically, when the linear illumination light is assumed to have a light component that is parallel to a plane perpendicular to the site (the scattering regions 30B) generating the linear illumination light, the reflector 40 has a concave-convex shape causing generation of reflected light to be focused on a segment or the neighborhood of the segment, the segment running through the site (the scattering region 30B) that generates the linear illumination light and being parallel to the normal to a plane containing the reflector 40. Furthermore, when the linear illumination light is assumed to have a light component that intersects with the plane perpendicular to the site (the scattering regions 30B) generating the linear illumination light, the reflector 40 has a concave-convex shape so as to reflect light from the linear illumination light to the site (the scattering regions 30B) generating the linear illumination light or to the neighborhood of the site. When the reflecting surface 40A is configured to reflect generated light to a generation site of the light, such light reflection is represented by the following expressions, for example. Specifically, the reflector 40 has a property of two-dimensionally recursive reflection.

Vector V of light before reflection=$(Vx,Vy,Vz)$

Vector V of light after reflection=$(Vx,-Vy,-Vz)$

For example, as illustrated in FIG. 16, when a light component is assumed to exist, the light component being parallel to the plane perpendicular to the site (the scattering regions 30B) generating the linear illumination light, the reflector 40 has a concave-convex shape that allows reflected light to be concentrated on a focal point C on a segment AX3 or the neighborhood of the segment AX3 and directly below the scattering region 30B. At this time, a distance H2 between the position of the focal point C and the top of the reflector 40 is shorter than the distance H1, and is preferably equal to or more than (H1/n1−W1) and less than H1. The top of the reflector 40 refers to a plane containing a plurality of apexes provided in the top of the reflector 40. It is to be noted that W1 denotes a width of the site (the scattering regions 30B) generating the linear illumination light. In addition, n1 denotes the refractive index of a region between the top of the reflector 40 and the position of the focal point C, and corresponds to the refractive index of the transparent substrate 31 in the present embodiment. The segment AX3 is a segment that runs through the site (the scattering regions 30B) generating the linear illumination light and is parallel to the normal to the plane containing the reflector 40.

Figure 17:
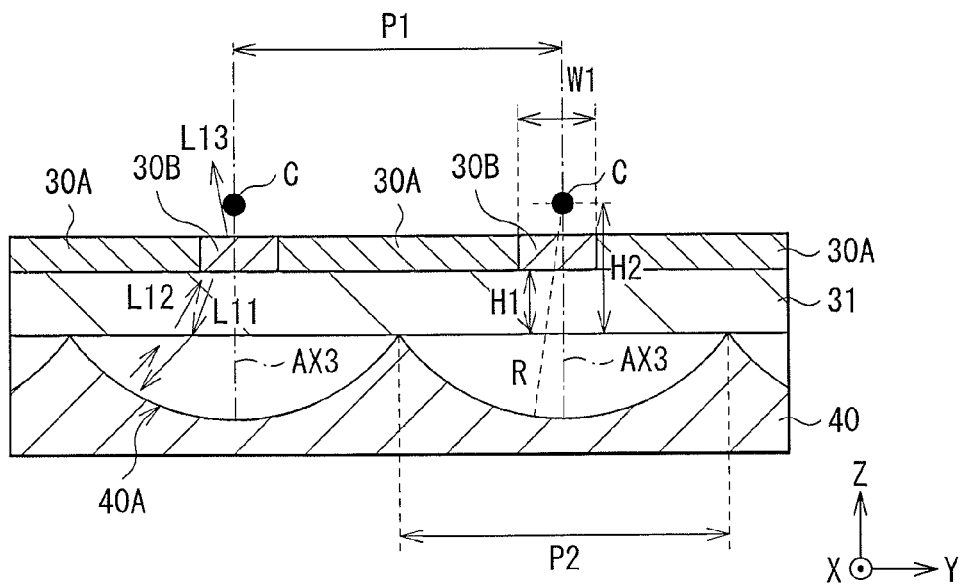
FIG. 17 is a cross-sectional view illustrating a Modification of the configuration of each of the light modulation layer and the reflector in FIG. 1.
Figure 18:
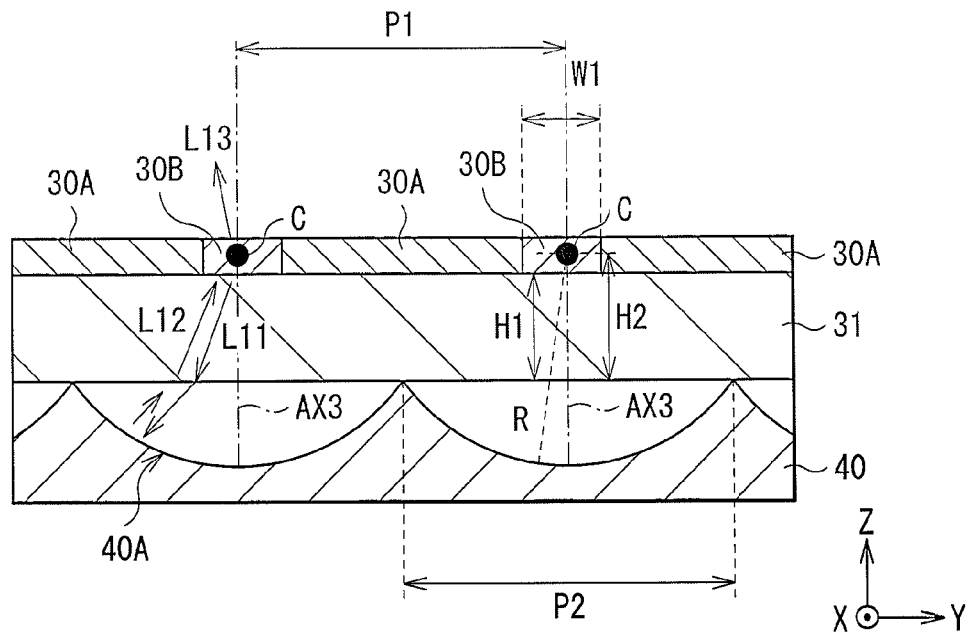
FIG. 18 is a cross-sectional view illustrating another Modification of the configuration of each of the light modulation layer and the reflector in FIG. 1.

For example, as illustrated in FIG. 17, when a light component is assumed to exist, the light component being parallel to the plane perpendicular to the site (the scattering regions 30B) generating the linear illumination light, the reflector 40 may have a concave-convex shape that allows reflected light to be concentrated on the focal point C on the segment AX3 or the neighborhood of the segment AX3 and directly above the scattering region 30B. In this case, the distance H2 is longer than the distance H1, and is preferably larger than H1 and equal to or less than (H1/n1+W1). For example, as illustrated in FIG. 18, the reflector 40 may have a concave-convex shape that allows reflected light to be concentrated on the focal point C on the segment AX3 or the neighborhood of the segment AX3 and within the scattering region 30B. In this case, the distance H2 is roughly equal to the distance H1.

The reflector 40 has the reflecting surface 40A as part of an inner surface of a cylinder, having a central axis running through the focal point C, at a position opposed to each of the sites (the scattering regions 30B) generating the linear illumination light. The reflecting surface 40A preferably has a maximum depth at the position opposed to the scattering region 30B.

When positions of the focal point C in FIGS. 16, 17, and 18 are compared with one another, the position shown in FIG. 16 (a position directly below the scattering region 30B) is most preferable. Here, the position of the focal point C most preferably satisfies H2=H1/n1. A pitch P2 of a three-dimensional shape of the reflecting surface 40A of the reflector 40 is most preferably equal or substantially equal to a pitch P1 between the scattering regions 30B (the sites generating the linear illumination light) in the light modulation layer 34. Furthermore, in this case, a portion, which corresponds to the part of the inner surface of the cylinder, of the reflecting surface 40A most preferably has a radius of $(H2^2+(P1/2)^2)^{1/2}$. In the case of such a configuration, light reflected by the reflecting surface 40A travels toward the focal point C, and is refracted by the bottom of the transparent substrate 31, and recursively arrives at the scattering region 30B.

Figure 19:
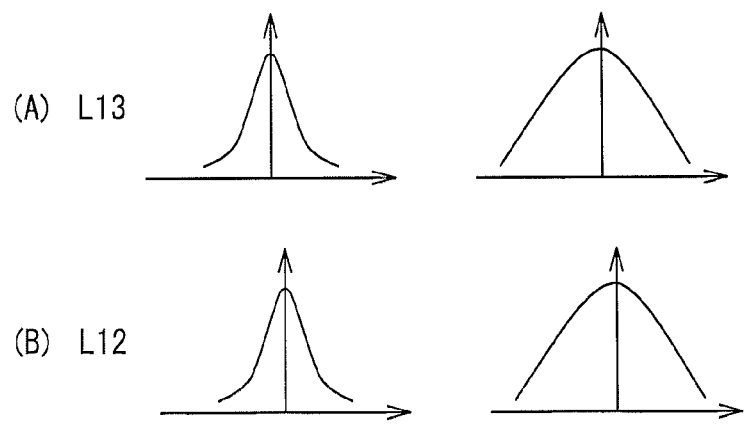
FIG. 19 is a distribution chart illustrating exemplary front luminance distribution and angular luminance distribution of light directly emitted to a top from a light source and of light reflected by the reflector.

Description is now made on front luminance distribution and angular luminance distribution of reflected light generated by the reflector 40. (A) of FIG. 19 illustrates exemplary front luminance distribution and angular luminance distribution of light L13, which is emitted to a light emission surface 1A side, as a part of light output from the scattering regions 30B of the light modulation layer 34. (B) of FIG. 19 illustrates exemplary front luminance distribution and angular luminance distribution of light L12, which is emitted to a side opposite to the light emission surface 1A side and is reflected by the reflector 40, as another part of the light output from the scattering regions 30B of the light modulation layer 34. (A) and (B) of FIG. 19 illustrate results obtained assuming that the refractive index n of the transparent substrate 41 is 1.515, H1 is 700 μm, H2 is 462 μm (=H1/n), the distance (radius R) between the focal point C and the reflecting surface 40A is 526 μm, P1 and P2 are each 504 μm, W1 is 63 μm, and the focal point C is directly below the scattering region 30B.

In each of (A) and (B) of FIG. 19, the left graph illustrates the front luminance distribution, and the right graph illustrates the angular luminance distribution. The front luminance distribution refers to in-plane luminance distribution of light emitted in the normal direction to the light modulation layer 34, in which an origin on the horizontal scale corresponds to a position directly above the scattering region 30B. The angular luminance distribution refers to angular distribution of luminance distribution of light, which is diverged in the normal direction to the light modulation layer 34, as part of light passing through an in-plane central point in the scattering regions 30B, in which the origin in the horizontal scale corresponds to the normal direction to the light modulation layer 34.

(A) and (B) of FIG. 19 teach that the front luminance distribution and the angular luminance distribution of the light L12 are equal or substantially equal to the front luminance distribution and the angular luminance distribution of the light L13. Specifically, the reflector 40 returns the light L13 to the scattering regions 30B with almost no variation in front luminance distribution and in angular luminance distribution of light output from the scattering regions 30B to the light emission surface 1A side. This means that the reflector 40 has not only an effect of reducing a proportion of the reflected light that enters the transmissive region 30A of the light modulation device 34, but also an effect of preventing increase of light emitted in an angular direction unnecessary for three-dimensional display.

Figure 20:
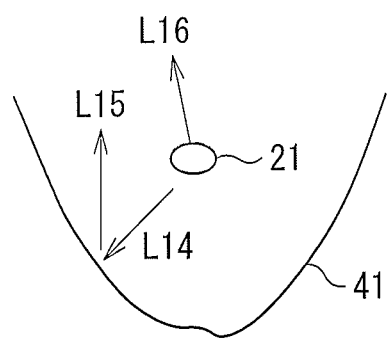
FIG. 20 is a cross-sectional view illustrating an exemplary configuration of a reflector according to a comparative example.
Figure 21:
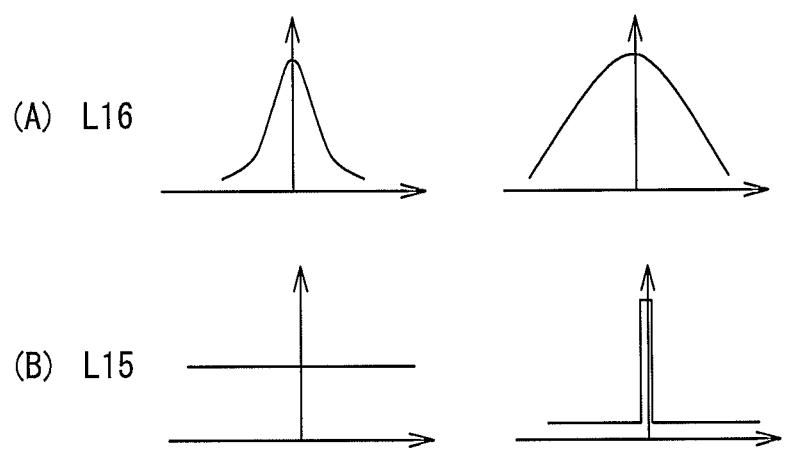
FIGS. 21A and 21B is a distribution chart illustrating exemplary front luminance distribution and angular luminance distribution of light directly emitted to a top from the light source in FIG. 20 and of light reflected by the reflector in FIG. 20.

FIG. 20 schematically illustrates a reflector 41 according to a comparative example together with a light source 21. The reflector 41 has a paraboloid that reflects light from the light source 21 to generate parallel light. In FIG. 20, light L16 is directly emitted upward from the light source 21, light L14 is emitted to the reflector 41 from the light source 21, and part of the light L14, i.e. light L15, is reflected by the reflector 41. (A) of FIG. 21 illustrates exemplary front luminance distribution and angular luminance distribution of the light L16. (B) of FIG. 21 illustrates exemplary front luminance distribution and angular luminance distribution of the light L15. In each of (A) and (B) of FIG. 21, the left graph illustrates the front luminance distribution, and the right graph illustrates the angular luminance distribution.

(A) and (B) of FIG. 21 teach that the front luminance distribution and the angular luminance distribution of the light L15 are significantly different from the front luminance distribution and the angular luminance distribution of the light L16. The front luminance distribution of the light L15 is roughly uniform regardless of places in a plane, and a considerable proportion of light L15 enters the transmissive region 30A of the light modulation device 34. Moreover, the angular luminance distribution of the light L15 is extremely dense in the front direction, which may disadvantageously reduce display quality in three-dimensional display.

Figure 22:
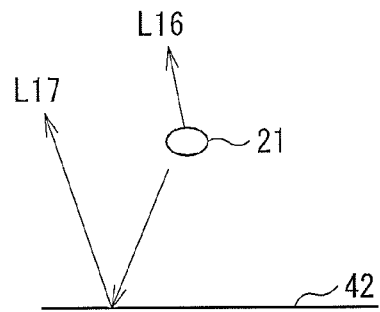
FIG. 22 is a cross-sectional view illustrating an exemplary configuration of a reflector according to another comparative example.
Figure 23:
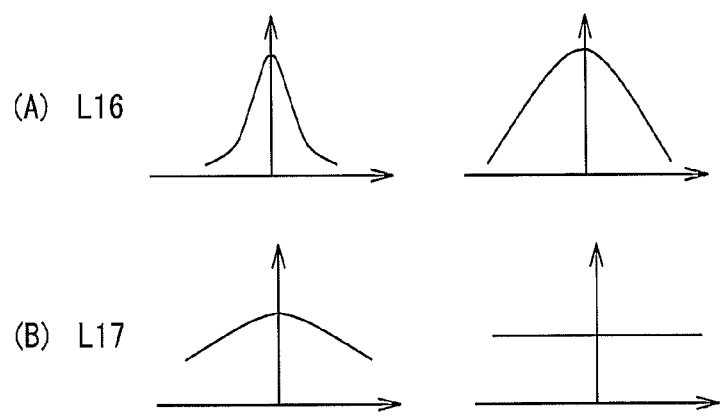
FIGS. 23A and 23B is a distribution chart illustrating exemplary front luminance distribution and angular luminance distribution of light directly emitted to a top from the light source in FIG. 22 and of light reflected by the reflector in FIG. 22.

FIG. 22 schematically illustrates a reflector 42 according to another comparative example together with a light source 21. The reflector 42 has a flat surface that regularly reflects light from the light source 21. In FIG. 22, light L16 is directly emitted upward from the light source 21, and part of light emitted to the reflector 42 from the light source 21, i.e., light L17, is regularly reflected by the reflector 42. (A) of FIG. 23 illustrates exemplary front luminance distribution and angular luminance distribution of the light L16. (B) of FIG. 23 illustrates exemplary front luminance distribution and angular luminance distribution of the light L17. In each of (A) and (B) of FIG. 23, the left graph illustrates the front luminance distribution, and the right graph illustrates the angular luminance distribution.

(A) and (B) of FIG. 23 teach that the front luminance distribution and the angular luminance distribution of the light L17 are significantly different from the front luminance distribution and the angular luminance distribution of the light L16. The front luminance distribution of the light L17 has a peak in the front direction, but also has large components in other directions, showing that a considerable proportion of light L17 enters the transmissive region 30A of the light modulation device 34. Moreover, the angular luminance distribution of the light L17 is uniform regardless of angles, which may disadvantageously reduce display quality in three-dimensional display.

In the present embodiment, the reflector 40 may be bonded to the transparent substrate 31. Possible types of bonding of the reflector 40 to the transparent substrate 31 include whole-surface bonding, peripheral bonding (bonding over the annular portion other than the display region), and point bonding (bonding at points in the portion other than the display region). In the case of the whole-surface bonding of the reflector 40 to the transparent substrate 31, the apex portions of the reflector 40 are possibly bonded to the transparent substrate 31. In such a case, each of the apex portions of the reflector 40 may be formed as a slightly flat surface.

Figure 24:
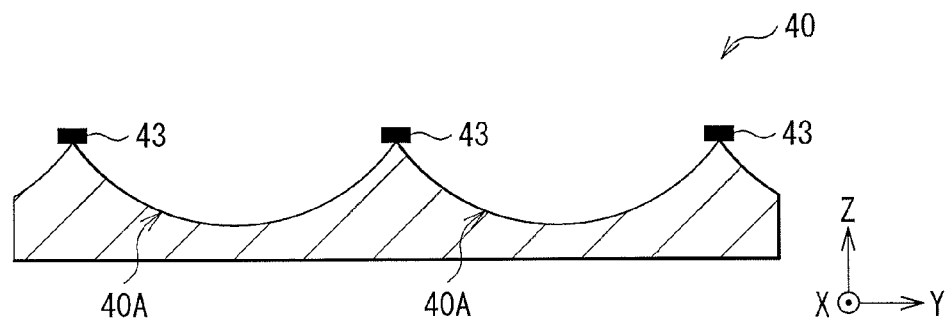
FIG. 24 is a cross-sectional view illustrating another exemplary configuration of the reflector in FIG. 1.

In the present embodiment, for example, as illustrated in FIG. 24, the reflector 40 may have a black 43 on each of sites to be in contact with the transparent substrate 31. For example, the black 43 may be a mixture of a black pigment with an adhesive agent for fixation of the reflector 40 to the back of the transparent substrate 31.

A method of manufacturing the illumination device 1 of the present embodiment is now described with reference to (A) to (C) of FIG. 25 to (A) to (C) of FIG. 27.

Figure 25:
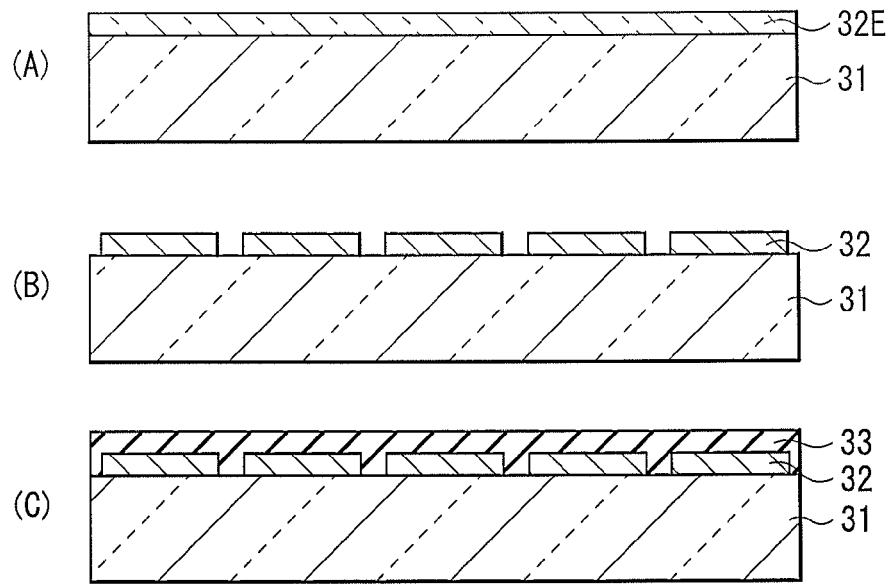
FIGS. 25A, 25B, and 25C is a cross-sectional view for explaining manufacturing steps of the light modulation device of FIG. 2.

First, a transparent conductive film 32E such as an ITO film is formed on the transparent substrate 31 including a glass substrate or a plastic film substrate ((A) of FIG. 25). Subsequently, a resist layer is formed over the entire surface, and an electrode pattern is then formed in the resist layer by patterning. Subsequently, the lower electrode 32 is formed through exposure and development, and then the resist layer is removed ((B) of FIG. 25).

Examples of usable patterning processes include a photolithography process, laser processing, a pattern printing process, and a screen printing process. In addition, for example, the resist layer may be patterned by screen printing using a "Hyper-Etch" material from Merck Ltd. followed by predetermined heating and rinsing. The electrode pattern is determined based on a drive method and a division number of partial drive. For example, the electrode pattern is formed at a pitch equal or similar to a pixel pitch of a display unit to be used. The width of the formed electrode, which is also determined depending on formation processes, is preferably as narrow as possible from the viewpoint of extraction efficiency of light. For example, the width of the formed electrode is 50 µm or less, preferably 20 µm or less, and more preferably 5 µm or less. In addition, the electrode pattern may be formed by pattern printing of ITO nanoparticles followed by baking of the printed pattern.

Subsequently, the alignment film 33 is applied onto the entire surface, and then the alignment film 33 is dried and baked ((C) of FIG. 25). In the case where a polyimide series material is used for the alignment film 33, NMP (N-methyl-2-pyrolidone) is often used as a solvent. In such a case, a temperature of about 200° C. is necessary in the air. In such a case, when a plastic substrate is used as the transparent substrate 31, the alignment film 33 may be vacuum-dried and baked at 100° C. Subsequently, the alignment film 33 is subjected to rubbing treatment. This allows the alignment film 33 to serve as an alignment film for horizontal alignment, and allows pretilt to be formed in the rubbing direction of the alignment film 33.

Similarly, a transparent conductive film such as an ITO film is formed on the transparent substrate 37 including a glass substrate or a plastic film substrate. Subsequently, a resist layer is formed over the entire surface, and an electrode pattern is formed in the resist layer by patterning. Subsequently, the upper electrode 36 is formed through exposure and development, and then the resist layer is removed. Subsequently, the alignment film 35 is applied onto the entire surface, and is then dried and baked. Subsequently, the alignment film 35 is subjected to rubbing treatment. This allows the alignment film 35 to serve as an alignment film for horizontal alignment, and allows pretilt to be formed in the rubbing direction of the alignment film 35.

Figure 26:
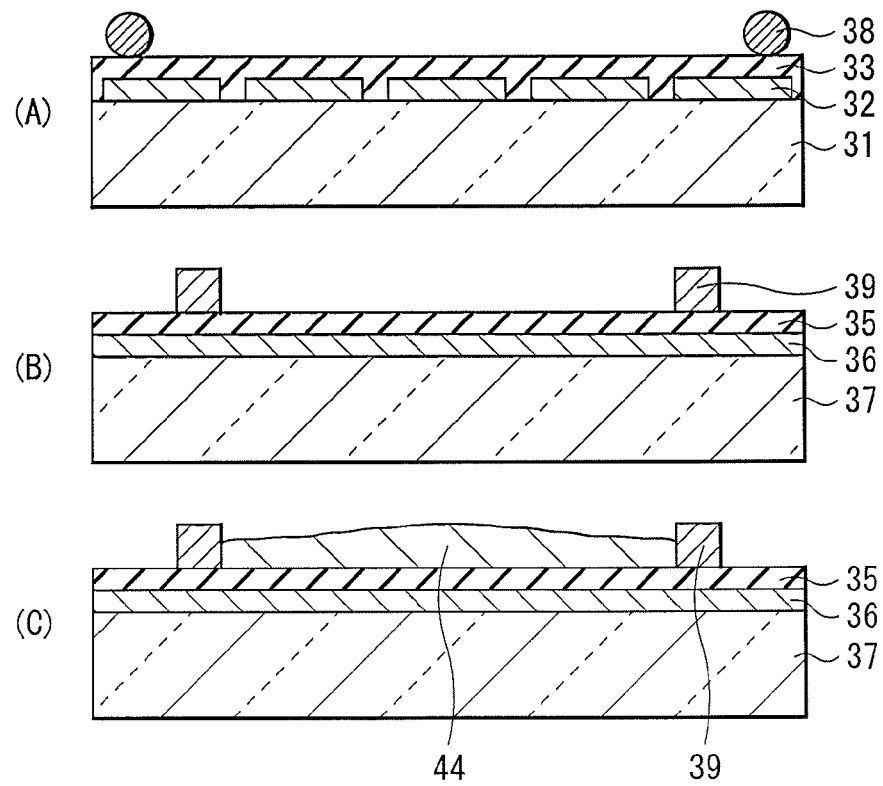
FIGS. 26A, 26B, and 26C is a cross-sectional view for explaining manufacturing steps following the steps of FIG. 25.

Subsequently, spacers 38 for forming a cell gap are dispersed on the alignment film 33 by a dry or wet process ((A) of FIG. 26). In the case where the light modulation cell 30-1 is formed by a one drop fill process, the spacers 38 may be beforehand mixed in a mixture to be dropped. Columnar spacers may be formed by a photolithography process in place of the spacers 38. Substantially, a seal agent pattern 39 for bonding and prevention of leakage of liquid crystal is applied onto the alignment film 35 in, for example, a frame pattern ((B) of FIG. 26). The seal agent pattern 39 is formed by a dispenser process or a screen printing process.

Although the one drop fill process (ODF process) is described below, the light modulation cell 30-1 may be formed by a vacuum injection process or a roll bonding process.

First, a mixture 44 of liquid crystal and monomer is uniformly dropped in a plane in amount corresponding to a volume determined based on a cell gap, a cell area, etc. ((C) of FIG. 26). The mixture 44 is preferably dropped using a precision dispenser of a linear guide type, but may be dropped by a die coater using the seal agent pattern 39 as a bank.

While the liquid crystal and the monomer may each include the above-described materials, the weight ratio of the liquid crystal to the monomer is 98:2 to 50:50 both inclusive, preferably 95:5 to 75:25 both inclusive, and more preferably 92:8 to 85:15 both inclusive. Drive voltage may be reduced by increasing a proportion of the liquid crystal. When the liquid crystal is excessively increased, however, whiteness is reduced during voltage application, or response speed is reduced after turning off the voltage, and thus the cell is less likely to return to a transparent state.

A polymerization initiator is added to the mixture 44 in addition to the liquid crystal and the monomer. A ratio of the polymerization initiator to be added to the monomer is adjusted within a range of 0.1 to 10 wt % both inclusive depending on wavelengths of ultraviolet rays to be used. In addition, a polymerization inhibitor, a plasticizer, and a viscosity modifier may be added to the mixture 44 as necessary. In the case where the monomer is a solid or gelatinous material at room temperature, a cap, a syringe, and a substrate are preferably warmed.

Figure 27:
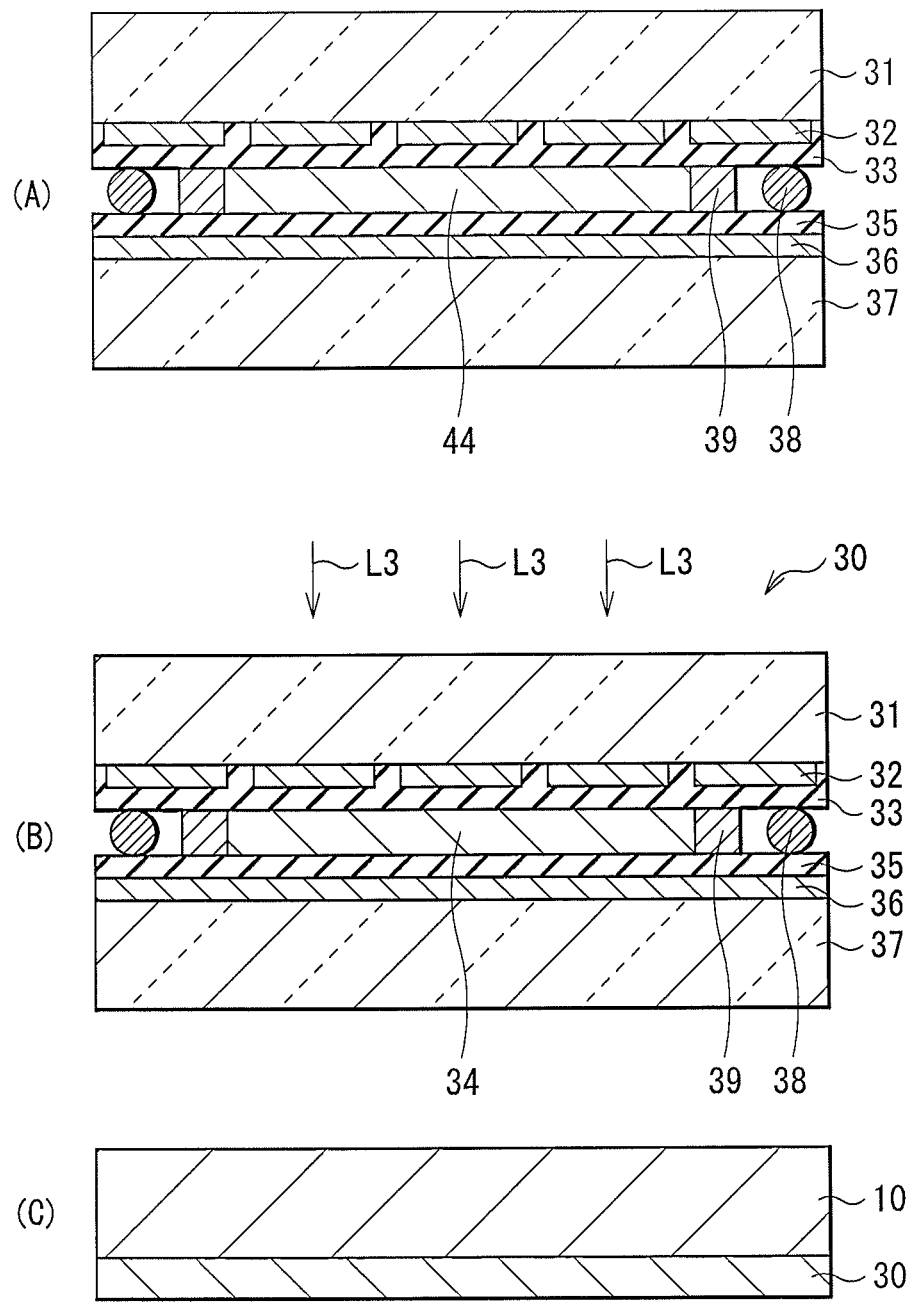
FIGS. 27A, 27B, and 27C is a cross-sectional view for explaining manufacturing steps following the steps of FIG. 26.

The transparent substrate 31 and the transparent substrate 37 are placed in one drop fill equipment (not shown), and are then subjected to evacuation for bonding ((A) of FIG. 27). Subsequently, the bonded substrates are released to the air, and the cell gaps are made even by uniform pressurization under atmospheric pressure. While the cell gap is appropriately selected based on a relationship between white luminance (whiteness) and drive voltage, the cell gap is 5 to 40 μm both inclusive, preferably 6 to 20 μm both inclusive, and more preferably 7 to 10 μm both inclusive.

After the bonding, alignment treatment (not shown) is preferably performed as necessary. When the resultant cells are inserted between crossed-Nicol polarizing plates, and if light leakage occurs, the cell is heated or left at room temperature for certain time for alignment. Subsequently, the cell is irradiated with ultraviolet rays L3 so that the monomer is polymerized into polymer ((B) of FIG. 27). In this way, the light modulation device 30 is manufactured.

The temperature of the cell is preferably not varied during ultraviolet irradiation. Thus, an infrared cut filter or UV-LED as a light source is preferably used. The illuminance of the ultraviolet rays affects a structure of a composite material. It is therefore preferable that the illuminance is appropriately adjusted based on a liquid crystal material and a monomer material to be used, and compositions thereof. The illuminance is preferably within a range of 0.1 to 500 mW/cm$^2$ both inclusive, and more preferably within a range of 0.5 to 30 mW/cm$^2$ both inclusive. The drive voltage tends to be lowered with a decrease in illuminance of the ultraviolet rays. Illuminance of the ultraviolet rays is therefore preferably selected in light of both productivity and properties.

Subsequently, the light modulation device 30 is bonded to the light guide plate 10 ((C) of FIG. 27). While the bonding may be performed by either of gluing and adhesion, the gluing or adhesion is preferably performed using a material having a refractive index that is as close as possible to the refractive index of the light guide plate 10 and to the refractive index of the substrate material for the light modulation device 30. Finally, a lead (not shown) is attached to each of the lower electrode 32 and the upper electrode 36. In this way, the illumination device 1 of the present embodiment is manufactured.

In this way, description has been made on a process where the light modulation device 30 is first fabricated, and finally the light modulation device 30 is bonded to the light guide plate 10. However, the transparent substrate 37 having the alignment film 35 thereon may be beforehand bonded to the surface of the light guide plate 10 before fabrication of the illumination device 1. The illumination device 1 may be fabricated in either of a sheet-feeding manner and a roll-to-roll manner.

Functions and effects of the illumination device 1 of the present embodiment are now described.

In the illumination device 1 of the present embodiment, during three-dimensional display, a voltage is applied to the pair of electrodes (the partial electrode 32A and the upper electrode 36) of each light modulation cell 30-1 such that the optical axis AX2 of the fine particle 34B intersects with or is orthogonal to the optical axis AX1 of the bulk 34A in each cell 30a, while the optical axis AX2 of the fine particle 34B is parallel or substantially parallel to the optical axis AX1 of the bulk 34A in each cell 30b. Consequently, in the light modulation device 30, each cell 30a becomes the scattering region 30B, while each cell 30b becomes the transmissive region 30A. As a result, light, which is emitted from the light source 20 and enters the light guide plate 10, passes through each transmissive region 30A in the light modulation device 30, and is scattered in each scattering region 30B in the light modulation device 30 (FIG. 14). A part of the scattered light passes through the bottom of the scattering regions 30B, and is reflected by the reflector 40 so as to be returned into the light guide plate 10, and is then emitted from the top of the illumination device 1. Another part of the scattered light travels toward the top of the scattering region 30B and passes through the light guide plate 10, and is then emitted from the top of the illumination device 1. In this way, during three-dimensional display, light is substantially not emitted from the top of the transmissive region 30A, but is emitted from the top of the scattering region 30B. In this way, for example, as illustrated in FIG. 14, linear illumination light is output in the front direction.

In the illumination device 1 of the present embodiment, during two-dimensional display, for example, a voltage is applied to the pair of electrodes (the partial electrode 32A and the upper electrode 36) of each light modulation cell 30-1 such that the optical axis AX2 of the fine particle 34B intersects with or is orthogonal to the optical axis AX1 of the bulk 34A in each light modulation cell 30-1. Consequently, light is emitted from the light source 20, enters the light guide plate 10, and is scattered by the scattering region 30B formed in the entire light modulation device 30. A part of the scattered light passes through the bottom of the scattering regions 30B, and is reflected by the reflector 40 so as to be returned into the light guide plate 10, and is then emitted from the top of the illumination device 1. Another part of the scattered light travels toward the top of the scattering region 30B and passes through the light guide plate 10, and is then emitted from the top of the illumination device 1. In this way, during two-dimensional display, for example, light is emitted from the entire area of the top of the light modulation device 30, and planar illumination light is emitted in the front direction.

In the present embodiment, no parallax barrier is necessary for three-dimensional display. Even if a parallax barrier is provided on a light emission side of the illumination device 1, part of the light modulation layer 34 is formed to be the scattering regions 30B such that the scattering regions 30B correspond to light-transmissive regions of the parallax barrier, making it possible to extremely reduce a proportion of light that is output from the light modulation layer 34 and absorbed by the parallax barrier. Moreover, in the present embodiment, no cylindrical lens is necessary for three-dimensional display; hence, disadvantageous aberration due to the cylindrical lens does not occur.

In the present embodiment, a part of linear illumination light is emitted to the reflector 40 side and is reflected by the reflector 40, and therefore reflected light L12 to be focused is generated. This allows front intensity distribution and angular intensity distribution of the reflected light L12 to be similar to front intensity distribution and angular intensity distribution of the light L13, as another part of linear illumination light, emitted to a side opposite to the reflector 40 side. As a result, it is possible to reduce a proportion of the reflected light L13 emitted from the top of the reflector through a region (i.e., the transmissive region 30A) different from the scattering region 30B during three-dimensional display compared with a case where the top of the reflector is configured of a flat surface (see FIG. 22) or is configured of a paraboloid generating parallel light (see FIG. 20). Furthermore, it is possible to reduce a proportion of the reflected light L12 emitted in an angular direction unnecessary for three-dimensional display. As a result, in the case where such an illumination device 1 is used as the backlight of the display unit for three-dimensional display, it is possible to suppress formation of a double image in three-dimensional display. Consequently, display quality is improved in three-dimensional display.

Other effects of the illumination device 1 of the present embodiment are now described.

In general, PDLC is formed by a process where the liquid crystal material is mixed with an isotropic low-molecular material, and then phase separation is induced in such a mixture through ultraviolet irradiation or drying of a solvent, and thus includes a composite layer in which fine particles of the liquid crystal material are dispersed in the polymer material. During no voltage application, the liquid crystal material in the composite layer is randomly oriented; hence, the PDLC exhibits a scattering property. During voltage application, the liquid crystal material is aligned in an electric field direction: hence, when the ordinary refractive index of the liquid crystal material is equal to the refractive index of the polymer material, the PDLC exhibits a highly transparent property in a front direction (the normal direction to the PDLC). In the case of such a liquid crystal material, however, the extraordinary refractive index of the liquid crystal material is significantly different from the refractive index of the polymer material in an oblique direction, and therefore the PDLC exhibits a scattering property in the oblique direction though the PDLC is transparent in the front direction.

In general, a light modulation device using PDLC often has a structure where the PDLC is sandwiched between two glass plates each having a transparent conductive film on its surface. In the case where light obliquely enters, from air, the light modulation device having the structure as described above, such obliquely incident light is refracted due to a difference in refractive index between air and the glass plate, and thus enters the PDLC at a smaller angle. As a result, significant scattering does not occur in such a light modulation device. For example, when light enters the light modulation device from air at an angle of 80°, the incidence angle of the light on the PDLC is decreased to about 40° due to refraction at an interface of glass.

In an edge-light-type illumination device using a light guide plate, however, since light is incident through the light guide plate, the light crosses the PDLC at a large angle of about 80°. As a result, the extraordinary refractive index of the liquid crystal material greatly differs from the refractive index of the polymer material. Furthermore, light crosses the PDLC at a further large angle, and thus an optical path along which the light is scattered is lengthened. For example, in the case where fine particles of a liquid crystal material having an ordinary refractive index of 1.5 and an extraordinary refractive index of 1.65 are dispersed in a polymer material having a refractive index of 1.5, no difference in refractive index exists in a front direction (the normal direction to PDLC), but a large difference in refractive index exists in an oblique direction. This prevents a reduction in scattering in the oblique direction, leading to bad viewing angle characteristics. Furthermore, in the case where an optical film such as a diffuser film is provided on the light guide plate, oblique leakage light is also diffused in the front direction by the diffuser film, resulting in an increase in light leakage in the front direction and in turn a reduction in modulation ratio in the front direction.

In contrast, in the present embodiment, the bulk 34A and the fine particle 34B each mainly include an optically anisotropic material; hence, scattering performance is reduced in the oblique direction, making it possible to improve transparency. For example, when the bulk 34A and the fine particle 34B mainly include the optically anisotropic materials, of which the ordinary refractive indexes are equal to each other and the extraordinary refractive indexes are also equal to each other, the optical axis directions of them are equal or substantially equal to each other in a region where no voltage is applied between the lower electrode 32 and the upper electrode 36. Consequently, a difference in refractive index is reduced or eliminated in any of directions including the front direction (normal direction to the light modulation device 30) and the oblique direction, leading to high transparency. As a result, light leakage is reduced or almost eliminated in a wide viewing angle range, making it possible to improve viewing angle characteristics.

For example, when a liquid crystal having an ordinary refractive index of 1.5 and an extraordinary refractive index of 1.65 is mixed with a liquid crystalline monomer having an ordinary refractive index of 1.5 and an extraordinary refractive index of 1.65, and when the liquid crystalline monomer is polymerized while the liquid crystal and the liquid crystalline monomer are aligned by an alignment film or an electric filed, the optical axis of the liquid crystal corresponds to the optical axis of the polymer formed through polymerization of the liquid crystalline monomer. This allows the refractive indexes of them to be equal to each other in any of various directions. In the case of such a configuration, a high transparent state is thus achieved, leading to further improvement in viewing angle characteristics.

In the present embodiment, for example, as illustrated in (A) and (B) of FIG. 14, luminance of the transmissive region 30A (luminance in black display) is lower than that in the case where light is uniformly emitted over the entire area (the dashed-dotted line in (B) of FIG. 14). On the other hand, luminance of the scattering region 30B is extremely high compared with the case where light is uniformly emitted over the entire area (the dashed-dotted line in (B) of FIG. 14), and luminance in partial white display (luminance enhancement) increases in correspondence to a reduction in luminance of the transmissive region 30A.

The luminance enhancement refers to a technique that increases luminance in partial white display compared with luminance in the case where white display is performed over the entire area. This is a common technique used in CRT, PDP, etc. In the liquid crystal display, however, the backlight uniformly emits light over the entire area regardless of images; hence, partial increase in luminance is not allowed. In the case where the backlight is configured of an LED backlight in which a plurality of LEDs are two-dimensionally arranged, the LEDs may be partially turned off. In the case of such a configuration, however, no diffused light is supplied from a dark region in which each LED is turned off, leading to a reduction in luminance compared with a case where all the LEDs are turned on. It is possible to increase luminance by increasing a current flowing through each of LEDs being partially turned on. In the case of such a configuration, however, a large amount of current flows in an extremely short time, thereby leading to problems in circuit load and reliability.

In contrast, in the present embodiment, since the bulk 34A and the fine particle 34B each mainly include an optically anisotropic material, scattering is suppressed in the oblique direction, and thus small quantity of leakage light comes from the light guide plate in a dark state. Consequently, light is guided from a partially dark portion to a partially light portion; hence, luminance enhancement is achievable without increasing input power to the illumination device 1.

In the present embodiment, in a region where no voltage is applied between the lower electrode 32 and the upper electrode 36, the optical axis AX2 of the fine particle 34B is parallel to the light-incident surface 10A of the light guide plate 10, and intersects with each of the surfaces of the transparent substrates 31 and 37 at a small angle $\theta 1$. Specifically, the liquid crystal molecules contained in the fine particle 34B are aligned while being tilted by the angle $\theta 1$ in a plane parallel to the light-incident surface 10A (aligned with a pretilt angle). As a result, when voltage is applied between the lower electrode 32 and the upper electrode 36, the liquid crystal material contained in the fine particle 34B does not rise in random orientation, but rises in a plane parallel to the light-incident surface 10A. At this time, the optical axis AX1 of the bulk 34A intersects with or is orthogonal to the optical axis AX2 of the fine particle 34B in the plane parallel to the light-incident surface 10A. Here, light enters the light guide plate 10 from the light-incident surface 10A, and part of the light, which oscillates perpendicularly to the transparent substrate 31, is influenced by a difference between the extraordinary refractive index of the fine particle 34B and the ordinary refractive index of the bulk 34A. In this case, a large difference exists between the extraordinary refractive index of the fine particle 34B and the ordinary refractive index of the bulk 34A, thereby leading to high scattering efficiency for light oscillating perpendicularly to the transparent substrate 31. On the other hand, another part of the light, which oscillates parallel to the transparent substrate 31, is influenced by a difference between the ordinary refractive index of the fine particle 34B and the extraordinary refractive index of the bulk 34A. In this case, a large difference also exists between the ordinary refractive index of the fine particle 34B and the extraordinary refractive index of the bulk 34A, thereby leading to high scattering efficiency for light oscillating parallel to the transparent substrate 31. Hence, light propagating through a region where a voltage is applied between the lower electrode 32 and the upper electrode 36 contains a large amount of oblique components. For example, in the case where an acryl light guide plate is used as the light guide plate 10, light propagates at an angle of 41.80 or more within the region where a voltage is applied between the lower electrode 32 and the upper electrode 36. This results in an increase in difference in refractive index in any of various directions including the oblique direction, and thus high scattering performance is achieved, thereby making it possible to increase display luminance. Moreover, it is possible to further increase display luminance by the effect of the above-described luminance enhancement.

For example, in the case where the optical axis AX1 of the bulk 34A and the optical axis AX2 of each fine particle 34B are disposed perpendicularly to the light-incident surface 10A of the light guide plate 10 during no voltage application, and when the liquid crystal material contained in the fine particle 34B rises in a plane perpendicular to the light-incident surface 10A upon application of a voltage between the lower electrode 32 and the upper electrode 36, light oscillating perpendicularly to the transparent substrate 31 is influenced by the difference between the extraordinary refractive index of the fine particle 34B and the ordinary refractive index of the bulk 34A as with the case described above, but light oscillating parallel to the transparent substrate 31 is influenced by the difference between the ordinary refractive index of the fine particle 34B and the ordinary refractive index of the bulk 34A. Here, no difference or almost no difference exists between the ordinary refractive index of the fine particle 34B and the ordinary refractive index of the bulk 34A. Hence, in the light entering from the light-incident surface 10A, the light oscillating perpendicularly to the transparent substrate 31 is influenced by the large difference in refractive index as with the case described above, but the light oscillating parallel to the transparent substrate 31 is not influenced or almost not influenced by a difference in refractive index. As a result, although scattering efficiency is high for the light oscillating perpendicularly to the transparent substrate 31, the scattering efficiency is low or zero for the light oscillating parallel to the transparent substrate 31. Consequently, in the case where the optical axis AX1 and the optical axis AX2 are disposed perpendicularly to the light-incident surface 10A, the scattering efficiency is low compared with a case where the optical axis AX1 and the optical axis AX2 are disposed parallel to the light-incident surface 10A; hence, lower luminance is extracted from the light guide plate 10 than that in the case of the light modulation device 30 in the present embodiment.

As described above, the present embodiment achieves an increase in display luminance while light leakage is reduced or almost eliminated in a wide viewing angle range. As a result, it is possible to increase a modulation ratio in the front direction.

2. MODIFICATIONS OF FIRST EMBODIMENT

Modifications of the first embodiment are now described. Any of combinations of the following Modifications may be applied to the display unit 1 according to the first embodiment within the scope without any inconsistency therebetween.
(First Modification)

Figure 28:
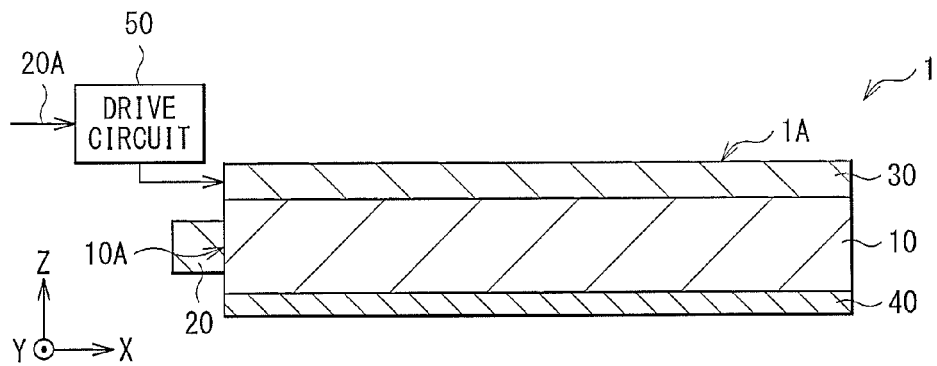
FIG. 28 is a cross-sectional view illustrating a first Modification of the configuration of the illumination device of FIG. 1.
Figure 29:
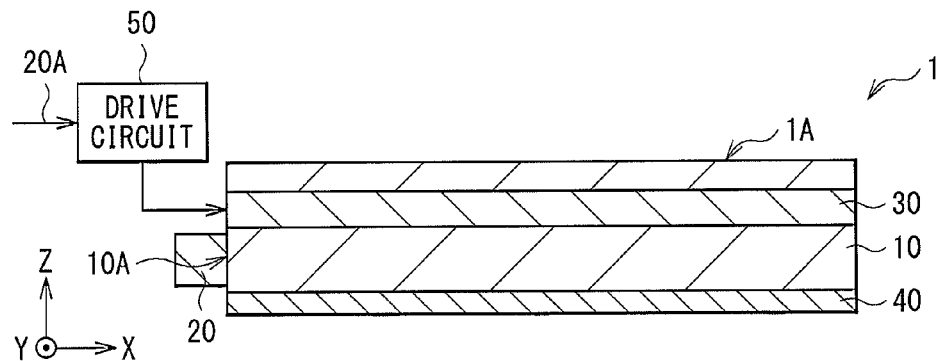
FIG. 29 is a cross-sectional view illustrating a second Modification of the configuration of the illumination device of FIG. 1.

In the above-described embodiment, the light modulation device 30 has been bonded to the back (bottom) of the light guide plate 10 in a tight contact manner with no air layer therebetween, but, for example, as illustrated in FIG. 28, the light modulation device 30 may be bonded to the top of the light guide plate 10 in a tight contact manner with no air layer therebetween. For example, as illustrated in FIG. 29, the light modulation device 30 may be provided within the light guide plate 10. In such a case, it is also necessary for the light modulation device 30 to be bonded to the light guide plate 10 in a tight contact manner with no air layer therebetween.
(Second Modification)

Figure 30:
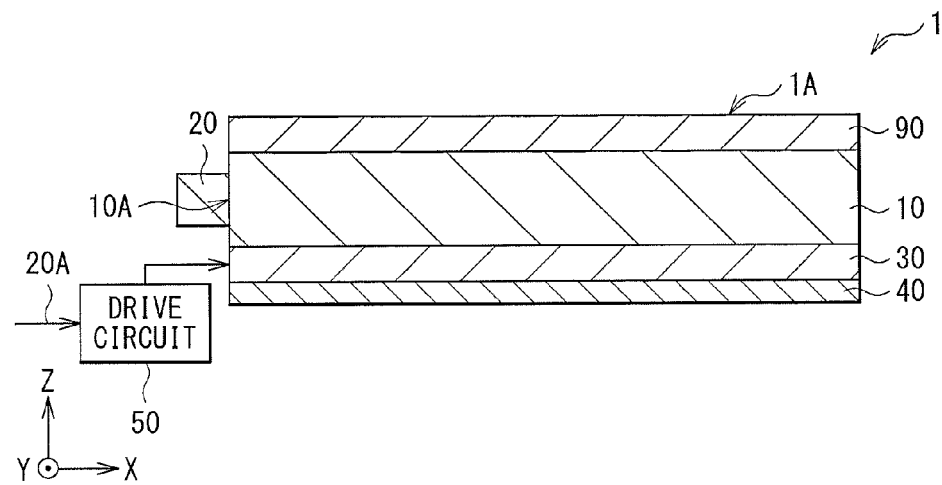
FIG. 30 is a cross-sectional view illustrating a third Modification of the configuration of the illumination device of FIG. 1.

Although no component has been provided on the light guide plate 10 in the above-described embodiment and the above-described Modification thereof, an optical sheet 90 (for example, a diffuser plate, a diffuser sheet, a lens film, and a polarization separation sheet) may be provided thereon, for example, as illustrated in FIG. 30. In the case of such a configuration, part of light, which is obliquely emitted from the light guide plate 10, rises in the front direction, thereby allowing an effective increase in front luminance.
(Third Modification)

Although the upper electrode 36 has been a solid film formed over the entire surface, and the lower electrode 32 has been configured of a plurality of strip-like partial electrodes 32A in the above-described embodiment and the above-described Modifications thereof, for example, the upper electrode 36 may be configured of a plurality of strip-like partial electrodes 32A, and the lower electrode 32 may be a solid film formed over the entire surface. Alternatively, for example, the lower electrode 32 may be configured of a plurality of strip-like partial electrodes 32A, and the upper electrode 36 may be also configured of a plurality of strip-like partial electrodes 32A.

(Fourth Modification)

In the case where the lower electrode 32 is configured of a plurality of block-like partial electrodes 32A arranged in a matrix in the above-described embodiment and the above-described Modifications thereof, one of a source and a drain of TFT may be connected to each partial electrode 32A, a scan line may be connected to a gate of the TFT, and the other of the source and the drain of the TFT, which is not connected to the partial electrode 32A, may be connected to a data line. In this case, the drive circuit 50 may be configured to sequentially select a plurality of scan lines, and apply a signal voltage corresponding to an image signal to each data line. In other words, the drive circuit 50 may be configured to perform active matrix drive on each partial electrode 32A.

(Fifth Modification)

In the above-described embodiment and the above-described Modifications thereof, the drive circuit 50 may apply the same voltage to the individual partial electrodes 32A regardless of distances from the light source 20, or may apply voltages corresponding to the distances from the light source 20 to the individual partial electrodes 32A. In the case of such a configuration, when illumination light is output such that only a particular portion of the top of the illumination device 1 shows white luminance, it is possible to reduce possibility of occurrence of a difference in white luminance level between a case where the portion showing white luminance is close to the light source 20 and a case where the portion is far from the light source 20.

(Sixth Modification)

In the above-described embodiment and the above-described Modifications thereof, one or both of the transparent substrates 31 and 37 may be formed integrally with the light guide plate 10. For example, in the above-described embodiment and the above-described Modifications thereof, in the case where the transparent substrate 37 is in contact with the light guide plate 10, the transparent substrate 37 may be formed integrally with the light guide plate 10. Here, the transparent substrate 37 corresponds to a specific but not limitative example of "first transparent substrate" or "second transparent substrate". For example, in the above-described embodiment and the above-described Modifications thereof, in the case where the transparent substrate 31 is in contact with the light guide plate 10, the transparent substrate 31 may be formed integrally with the light guide plate 10. Here, the transparent substrate 31 corresponds to a specific but not limitative example of "first transparent substrate" or "second transparent substrate". For example, in the above-described embodiment and the above-described Modifications thereof, in the case where both the transparent substrates 31 and 37 are in contact with the light guide plate 10, each of the transparent substrates 31 and 37 may be formed integrally with the light guide plate 10. Here, the transparent substrate 31 or 37 corresponds to a specific but not limitative example of "first transparent substrate" or "second transparent substrate".

(Seventh Modification)

Figure 31:
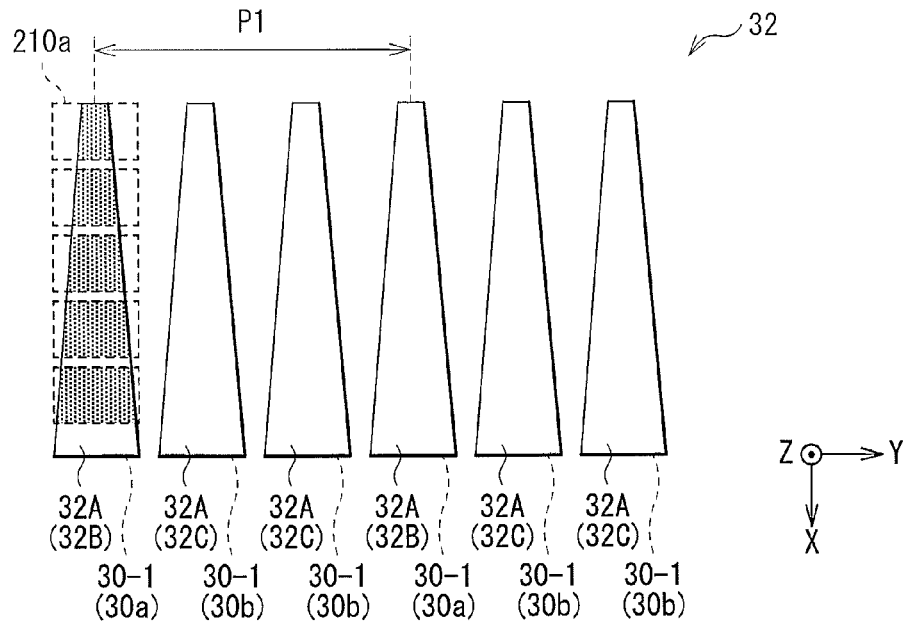
FIG. 31 is a top view illustrating a fifth Modification of the electrode structure in FIG. 2.

In the above-described embodiment and the above-described Modifications thereof, in the case where each partial electrode 32A has a strip-like shape extending in one in-plane direction that intersects with or is orthogonal (or almost orthogonal) to the light-incident surface 10A, area of a portion of each partial electrode 32A (area of a gray portion in the drawing), the portion being used for one pixel 210a in the display panel 210, may be varied depending on distances from the light source 20, for example, as illustrated in FIG. 31. In this case, emission area per unit area of the strip-like illumination light generated by the partial electrode 32A is also varied depending on distances from the light source 20.

Specifically, the width of each partial electrode 32A is varied depending on distances from the light source 20 so as to be relatively narrow at a place near the light source 20 and relatively wide at a place away from the light source 20. For example, as illustrated in FIG. 31, the width of each partial electrode 32A is wider in proportion to a distance from the light source 20. At this time, the width of the strip-like illumination light generated by the partial electrode 32A is also relatively narrow at a place near the light source 20 and relatively wide at a place away from the light source 20.

Figure 32:
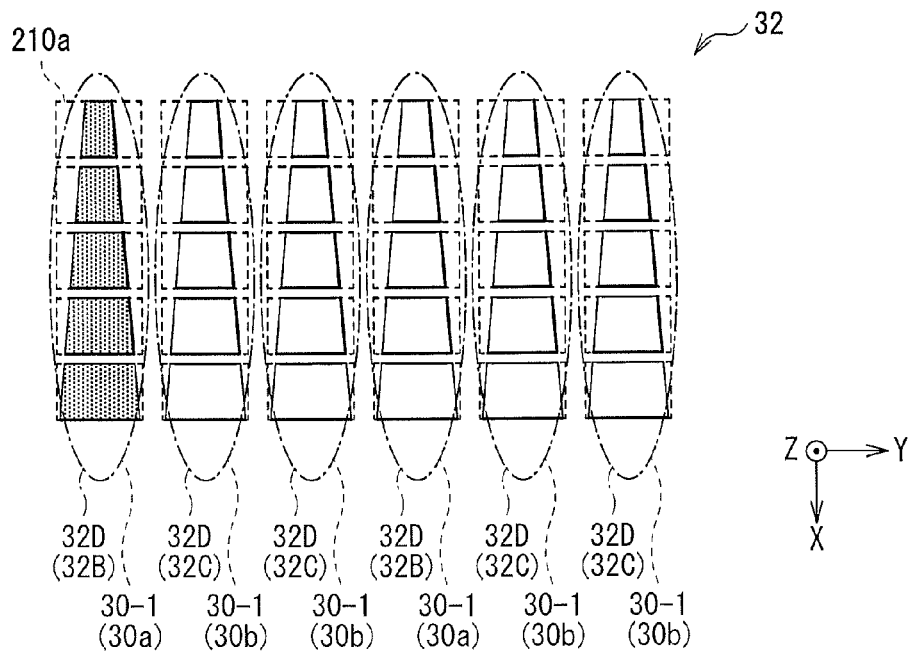
FIG. 32 is a top view illustrating a sixth Modification of the electrode structure in FIG. 2.

For example, when each partial electrode 32A has a block shape, and when the plurality of partial electrodes 32A are two-dimensionally arranged, area of a portion of each linear electrode 32D (area of a gray portion in the drawing), the portion being used for one pixel 210a in the display panel, may be varied depending on distances from the light source 20, for example, as illustrated in FIG. 32.

(Eighth Modification)

Figure 33:
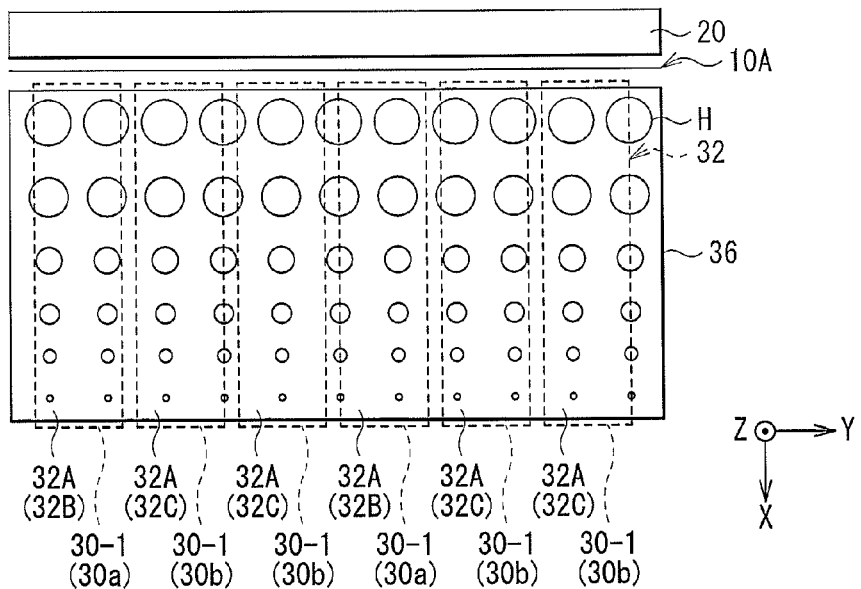
FIG. 33 is a top view illustrating a seventh Modification of the electrode structure in FIG. 2.
Figure 34:
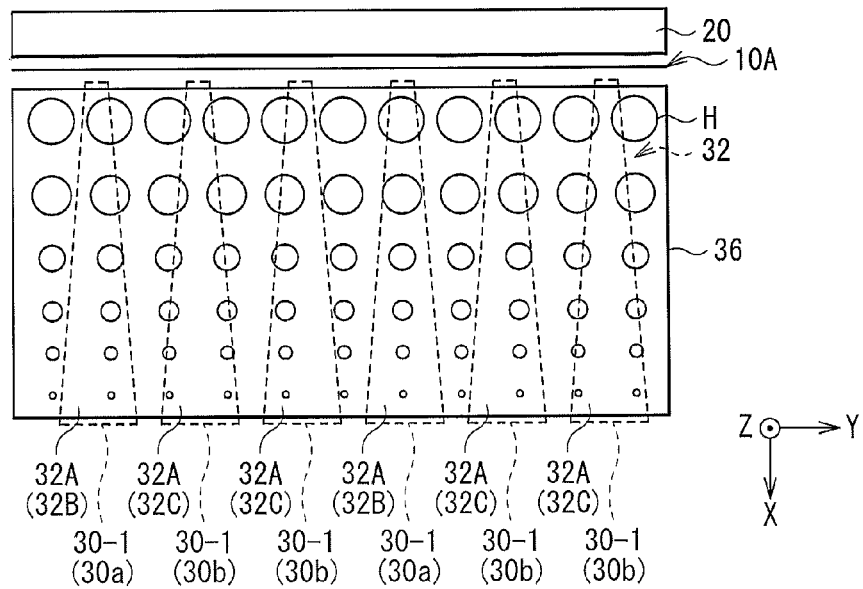
FIG. 34 is a top view illustrating an eighth Modification of the electrode structure in FIG. 2.

In the above-described embodiment and the above-described Modifications thereof, in the case where the upper electrode 36 includes a single solid film (planar electrode) formed over the entire area in a plane, the planar electrode may have a pattern therein. For example, as illustrated in FIGS. 33 and 34, the upper electrode 36 may have a plurality of openings H. For example, the opening H may have various shapes such as a circular shape, an elliptic shape, a square shape, and a polygonal shape.

The radius of the opening H may be varied depending on distances from the light source 20. For example, as illustrated in FIGS. 33 and 34, it is preferable that the radius of the opening H is relatively large at a place near the light source 20 while being relatively small at a place away from the light source 20 in a direction orthogonal to the light-incident surface 10A. In the case of such a configuration, in the direction orthogonal to the light-incident surface 10A, it is possible to control luminance to be low at a place near the light source 20 compared with a case where no opening H is provided, and to control luminance to be high at a place away from the light source 20 compared with a case where no opening H is provided. As a result, for example, in the case where the entire light emission region of the illumination device 1 is made into a light state, uniform in-plane luminance is achievable. For example, in the direction orthogonal to the light-incident surface 10A, when white display is performed in both a region close to the light source 20 and a region far from the light source 20, it is possible to make white luminance to be even between the two regions.

Furthermore, in the case where the light source 20 is configured of a plurality of light source blocks 21 (or a plurality of light sources 21), and when a distance between two light source blocks 21 adjacent to each other (or two light sources 21 adjacent to each other) is longer than a distance between two partial electrodes 32A adjacent to each other, it is preferable that the radius of the opening H is relatively large at a place near each light source block 25 (or each light source 21) while being relatively small at a place away from the light source block 25 (or the light source 21) in a direction parallel to the light-incident surface 10A. In the case of such a configuration, in the direction parallel to the light-incident surface 10A, it is possible to control luminance to be low at a place near the light source block 25 (or the light source 21) compared with a case where no opening H is provided, and to control luminance to be high at a place away from the light source block 25 (or the light source 21) compared with the case where no opening H is provided. As a result, for example, in the case where the entire light emission region of the illumination device 1 is made into a light state, uniform in-plane luminance is achievable. For example, in the direction parallel to the light-incident surface 10A, in the case where white display is performed in both a region close to the light source block 25 (or the light source 21) and a region far from the light source block 25 (or the light source 21), it is possible to make white luminance to be even between the two regions.

(Ninth Modification)

In the above-described embodiment and the above-described Modifications thereof, in the case where the scattering region 30B generates dot illumination light, the reflector 40 may have a reflecting surface 40A as part of a spherical surface. In this case, the reflector 40 preferably has a maximum depth at the position opposed to each scattering region 30B. In the case where the reflector 40 has such a reflecting surface 40A, and in the case where the illumination device 1 is used as the backlight of the display unit for three-dimensional display, it is also possible to suppress formation of a double image in three-dimensional display. Consequently, display quality is improved in three-dimensional display.

(Tenth Modification)

Although a horizontal alignment film has been used as each of the alignment films 33 and 35 in the above-described embodiment and the above-described Modifications thereof, a vertical alignment film may be used. In such a case, a liquid crystal molecule having negative dielectric constant anisotropy (so-called negative-type liquid crystal) is preferably used as the liquid crystal molecule contained in the fine particle 34B.

(Eleventh Modification)

Figure 35:
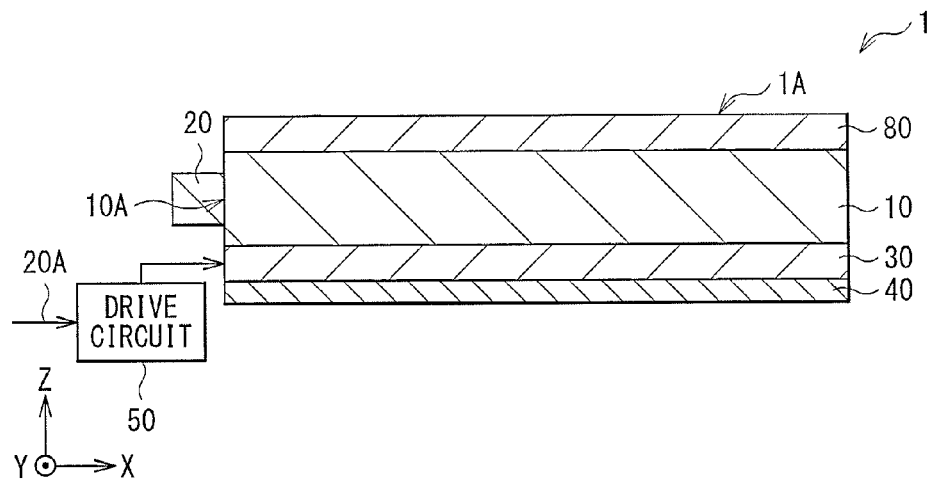
FIG. 35 is a cross-sectional view illustrating a fourth Modification of the configuration of the illumination device of FIG. 1.

In the above-described embodiment and the above-described Modifications thereof, a barrier layer 80 may be provided on the top of the light guide plate 10, for example, as illustrated in FIG. 35.

In three-dimensional display, the barrier layer 80 limits a light output region of the illumination device 1 to a region opposed to each scattering region 30B or a region corresponding to such an opposed region, and blocks noise light that may be output from a region adjacent to each scattering region 30B (i.e., from the transmissive region 30A). In two-dimensional display, the barrier layer 80 expands the light output region of the illumination device 1 to regions opposed to all the scattering regions 30B or regions corresponding to such opposed regions so as to allow light output from all the scattering regions 30B to pass therethrough.

Figure 36:
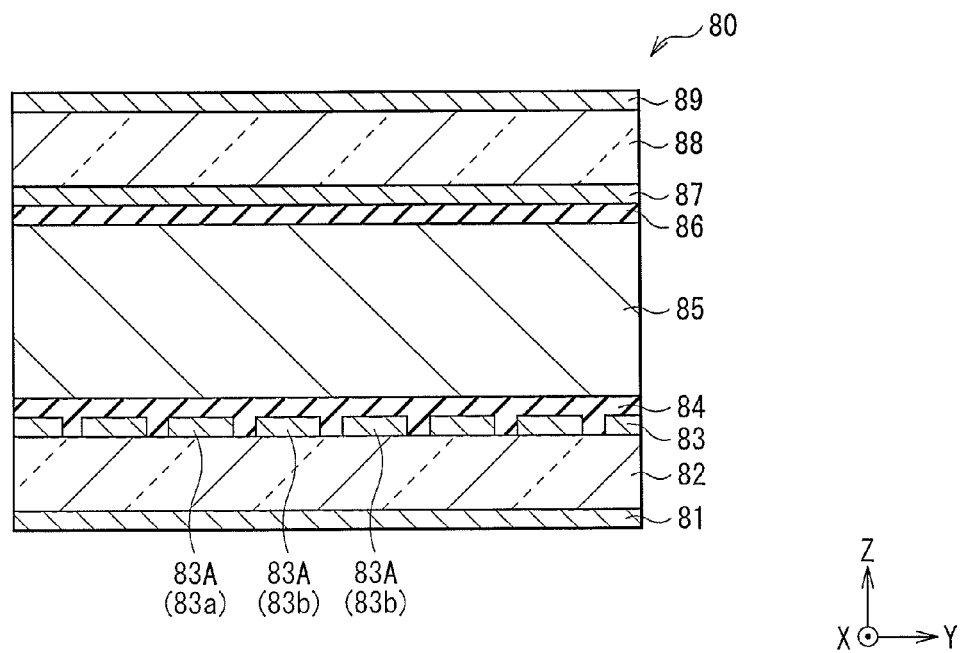
FIG. 36 is a cross-sectional view illustrating an example of a barrier layer in FIG. 35.

For example, as illustrated in FIGS. 35 and 36, the barrier layer 80 includes a polarizing plate 81, a transparent substrate 82, a lower electrode 83, an alignment film 84, a liquid crystal layer 85, an alignment film 86, an upper electrode 87, a transparent substrate 88, and a polarizing plate 89 in order of closeness to the reflector 40.

The transparent substrates 82 and 88 each include a substrate transparent to visible light, for example, a sheet glass substrate. For example, although not shown, an active drive circuit, which includes TFT and wirings electrically connected to the lower electrode 83, is provided on the transparent substrate 82 on a side close to the reflector 40. Each of the lower electrode 83 and the upper electrode 87 includes ITO, for example. For example, as illustrated in FIG. 36, the lower electrode 83 is configured of a plurality of partial electrodes 83A. The plurality of partial electrodes 83A are provided on the transparent substrate 82.

Figure 37:
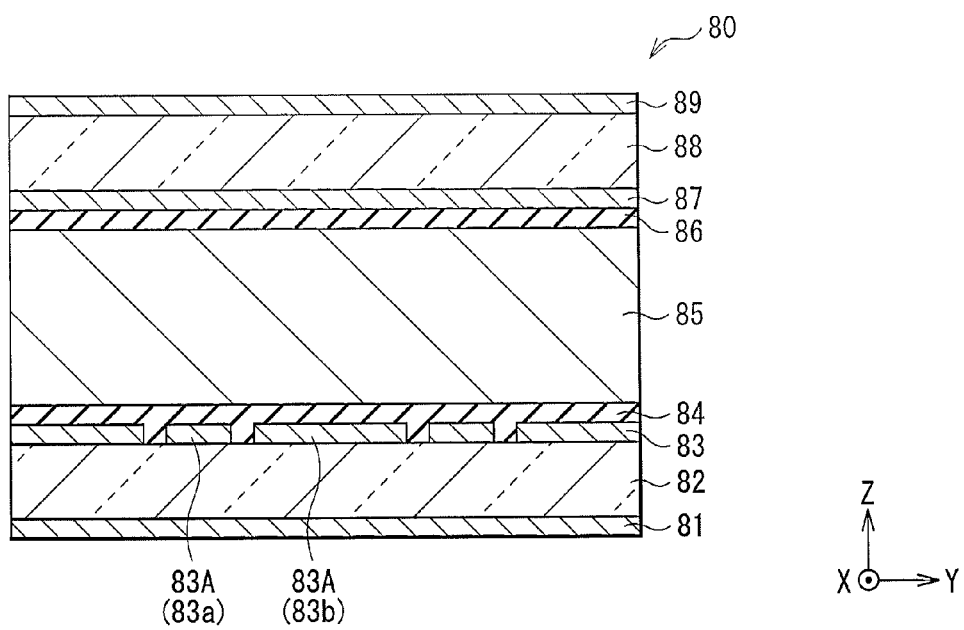
FIG. 37 is a cross-sectional view illustrating another example of the barrier layer in FIG. 35.

The plurality of partial electrodes 83A each have a strip-like shape extending in one direction in a plane (a direction parallel to a light-incident surface 70A). Among the plurality of partial electrodes 83A, a plurality of particular partial electrodes 83a each have a width that is equal or almost equal to width of each of a plurality of partial electrodes 83b other than the partial electrodes 83a among the plurality of partial electrodes 83A. As illustrated in FIG. 37, the width of the partial electrode 83a may be narrower than that of the partial electrode 83b.

When the display unit performs three-dimensional display, the plurality of partial electrodes 83a are used to transmit or block linear illumination light. The plurality of partial electrodes 83a are arranged at a pitch P1 corresponding to a pixel pitch P3 (see FIG. 70) during three-dimensional display performed by the display unit (i.e., at a pitch equal or similar to the pitch P3). The plurality of partial electrodes 83a and the plurality of partial electrodes 83b are regularly arranged in an arrangement direction (a direction orthogonal to the light-incident surface 10A). For example, a plurality of sets of partial electrode groups, each set including one partial electrode 83a and two partial electrodes 83b, are arranged in the direction orthogonal to the light-incident surface 10A. When the display unit performs two-dimensional display, all the partial electrodes 83A are used for generation of planar illumination light.

The upper electrode 87 is provided over the entire area on the transparent substrate 88, and serves as a common electrode opposed to the individual partial electrodes 83A. The alignment films 84 and 86 each include a polymer material such as, for example, polyimide, and are each used for alignment treatment on liquid crystal. For example, the liquid crystal layer 85 includes liquid crystal of a VA, TN, or STN mode, and has a function of varying a direction of a polarizing axis of light from a light guide plate 10 side for each of the portions opposed to the partial electrodes 83A in response to a voltage applied from a drive circuit 50. Each of the polarizing plates 81 and 89 is a type of optical shutters, and exclusively transmits light (polarized light) in a certain oscillation direction. Each of the polarizing plates 81 and 89 may be an absorption-type polarizing plate that absorbs light (polarized light) in an oscillation direction other than the transmission axis direction, but may be a reflection-type polarizing plate that reflects light to the light guide plate 10 side. The polarizing plates 81 and 89 are disposed such that their respective polarizing axes differ by 90 degrees from each other, or are parallel to each other. Thus, light from the light guide plate 10 is allowed to be transmitted or blocked by the liquid crystal layer 85.

When the drive circuit 50 receives a signal designating three-dimensional display as a control signal 204A, the drive circuit 50 allows the barrier layer 80 to serve as a slit-like light-transmissive section. Specifically, the drive circuit 50 applies a voltage causing the barrier layer 80 to exhibit a light-transmissive effect to a plurality of particular partial electrodes 83a among the plurality of partial electrodes 83A, while applying a voltage causing the barrier layer 80 to exhibit a light-blocking effect to a plurality of partial electrodes 83b other than the plurality of partial electrodes 83a among the plurality of partial electrodes 83A.

When the drive circuit 50 receives a signal designating two-dimensional display as the control signal 204A, the drive circuit 50 allows the entire barrier layer 80 to serve as a light-transmissive section. Specifically, the drive circuit 50 applies a voltage causing the barrier layer 80 to exhibit a light-transmissive effect to each partial electrode 83A.

In the present Modification, the barrier layer 80 is provided on a light emission side of the illumination device 1. Hence, when the light guide plate 10 outputs a plurality of pieces of linear illumination light, it is possible to block noise light that may be output from a region adjacent to each scattering region 30B. This enables a reduction in light that is incident on a predetermined pixel at an angle different from the incident angle of each piece of linear illumination light. As a result, a clear three-dimensional image is achieved.

2. SECOND EMBODIMENT

Figure 38:
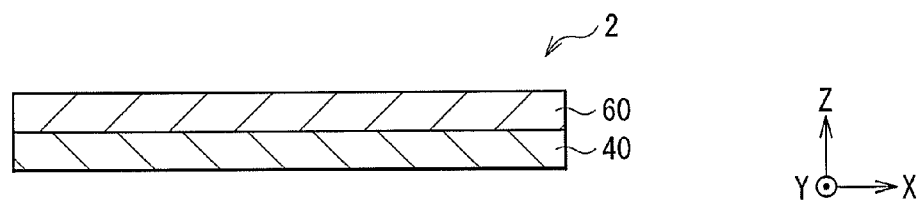
FIG. 38 is a cross-sectional view illustrating an exemplary configuration of an illumination device according to a second embodiment of the present technology.

FIG. 38 illustrates a sectional configuration of an illumination device 2 according to a second embodiment. The illumination device 2 is applicable as a backlight of a display unit, and, for example, as illustrated in FIG. 38, includes a reflector 40 and a light source 60 disposed on the reflector 40. The light source 60 corresponds to a specific but not limitative example of "illumination optical system".

Figure 39:
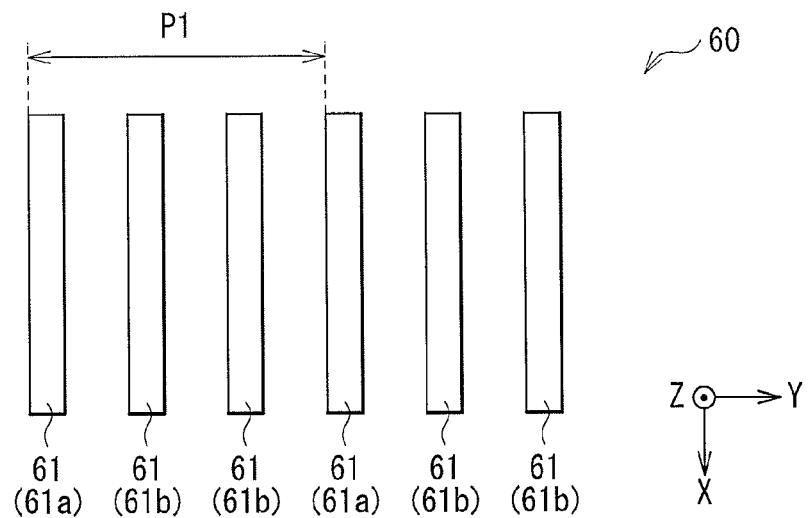
FIG. 39 is a top view illustrating an example of a light source in FIG. 38.

For example, as illustrated in FIG. 39, the light source 60 is configured of a plurality of light sources 61. For example, as illustrated in FIG. 39, each light source 61 is a linear light source extending in one direction in a plane (for example, a direction parallel to the light-incident surface 10A). A plurality of particular light sources 61 (hereinafter, referred to as "light sources 61a") among the plurality of light sources 61 are used for generation of linear illumination light during three-dimensional display performed by the display unit. The plurality of light sources 61a are arranged at a pitch P1 corresponding to a pixel pitch P3 (see FIG. 70) (i.e., at a pitch equal or similar to the pixel pitch P3) during three-dimensional display performed by the display unit.

Among the plurality of light sources 61, a plurality of light sources 61 (hereinafter, referred to as "light sources 61b") other than the light sources 61a are used for generation of planar illumination light together with the light sources 61a during two-dimensional display performed by the display unit. Specifically, when the display unit performs two-dimensional display, all the light sources 61 are used for generation of planar illumination light. The plurality of light sources 61a and the plurality of light sources 61b are regularly arranged in a direction orthogonal to the light-incident surface 10A. For example, as illustrated in FIG. 39, a plurality of sets of partial electrode groups, each set including one light source 61a and two light sources 61b, are arranged in a direction orthogonal to the light-incident surface 10A. For example, the width of the light source 61 is narrower than that of each pixel of the display unit.

Figure 40:
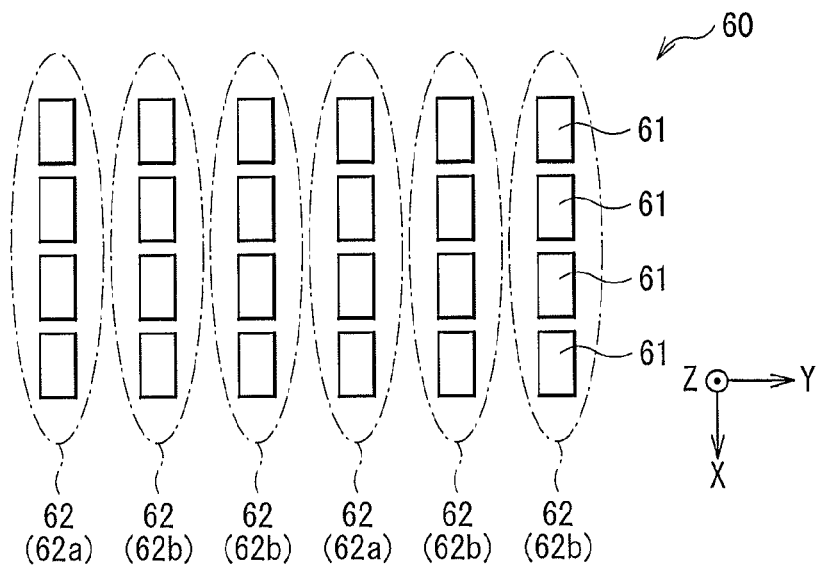
FIG. 40 is a top view illustrating a first Modification of the light source in FIG. 38.

For example, as illustrated in FIG. 40, the light sources 61 may be configured such that each light source 61 has a block shape, and a plurality of light sources 61 are arranged two-dimensionally. In such a case, when a plurality of light sources 61 are considered as one linear light source 62, each linear light source 62 may be used as the light source 61a or 61b. For example, among the plurality of linear light sources 62, a plurality of particular linear light sources 62 (linear light sources 62a) are used as the light sources 61a. Furthermore, for example, among the plurality of linear light sources 62, a plurality of linear light sources 62 (linear light sources 62b), excluding the linear light sources 62 used as the linear light sources 61a, are used as the light sources 61b.

In the case where each light source 61 has a block shape, and the plurality of light sources 61 are arranged two-dimensionally, the individual light sources 61 may be used for generation of dot illumination light during three-dimensional display performed by the display unit. Moreover, in the case where each light source 61 has a block shape and the plurality of light sources 61 are arranged two-dimensionally, and when the display unit performs two-dimensional display that allows different two-dimensional images to be viewed from two perspectives, the individual light sources 61 may also be used for generation of dot illumination light.

Figure 41:
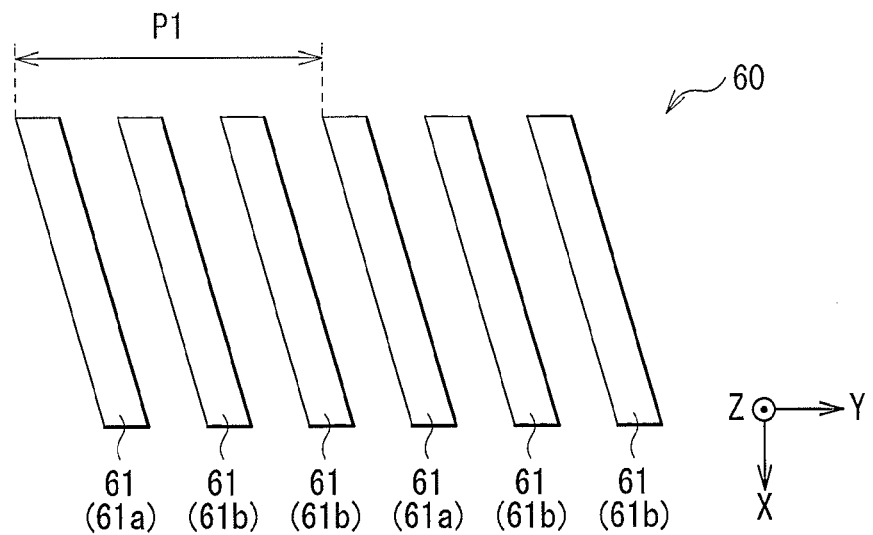
FIG. 41 is a top view illustrating a second Modification of the light source in FIG. 38.
Figure 42:
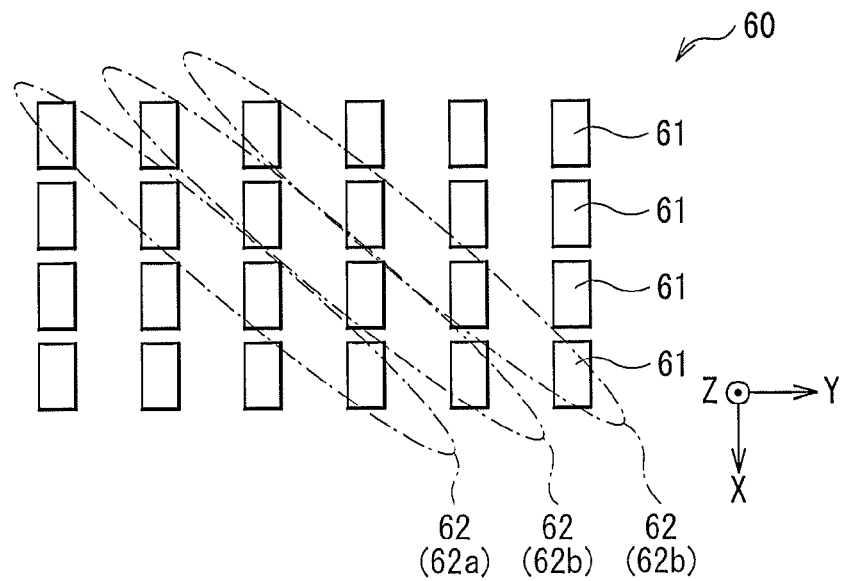
FIG. 42 is a top view illustrating a third Modification of the light source in FIG. 38.

In addition, for example, as illustrated in FIG. 41, each light source 61 may extend in a direction obliquely crossing the light-incident surface 10A at an angle other than the right angle. Moreover, in the case where each light source 61 has a block shape and a plurality of light sources 61 are arranged two-dimensionally, each linear light source 62 may extend in a direction obliquely crossing the light-incident surface 10A at an angle other than the right angle, for example, as illustrated in FIG. 42.

In the present embodiment, the reflector 40 returns light from the light source 60 to a light source 60 side. For example, the reflector 40 has functions of reflection, diffusion, and scattering of light. This allows light emitted from the light source 20 to be efficiently used, and helps to increase front luminance. The fine pattern surface of the reflector 40 is preferably a mirror surface. In such a case, light emitted from the light source 60 is allowed to be regularly reflected (mirror-reflected), and is thus allowed to be efficiently reflected to a focal point C. Materials for the reflector 40 are similar to those described in the first embodiment.

Figure 43:
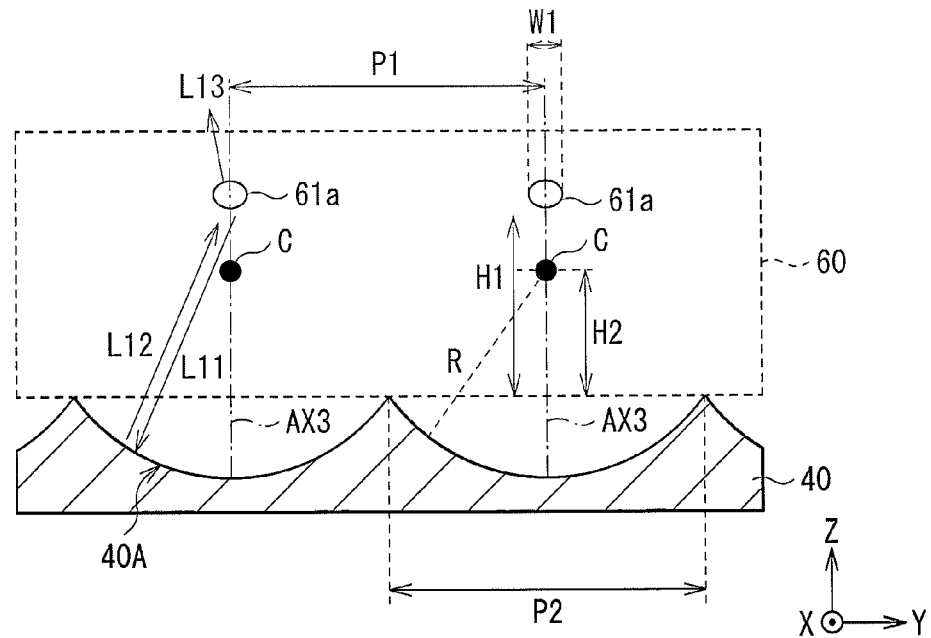
FIG. 43 is a cross-sectional view illustrating an exemplary configuration of each of the light source and a reflector in FIG. 38.

For example, as illustrated in FIG. 43, the reflector 40 is disposed at a distance H1 from the light source 61, and has a reflecting surface 40A on a side close to the light source 61. The reflecting surface 40A reflects part of light emitted from the light source 60 toward the top of the illumination device 2. Specifically, when the display unit performs three-dimensional display, the reflector 40 reflects linear illumination light generated by the light source 61a to generate reflected light to be focused.

When each light source 61 generates dot illumination light, and when the display unit performs three-dimensional display, the reflector 40 may reflect each piece of dot illumination light to generate linear reflected light to be focused. Moreover, when each light source 61 generates dot illumination light, and when the display unit performs two-dimensional display that allows different two-dimensional images to be viewed from two perspectives, the reflector 40 may reflect each piece of dot illumination light to generate linear reflected light to be focused.

The reflector 40 reflects light toward a plane or the neighborhood of the plane, the plane running through each of sites (the light sources 61a) that generate linear illumination light, and being perpendicular to a plane containing the reflector 40. Specifically, when the linear illumination light is assumed to have a light component that is parallel to a plane perpendicular to the site (the light source 61a) generating the linear illumination light, the reflector 40 has a concave-convex shape causing generation of reflected light to be focused on a segment or the neighborhood of the segment, the segment running through the site (the light source 61a) that generates the linear illumination light and being parallel to the normal to a plane containing the reflector 40. Furthermore, when the linear illumination light is assumed to have a light component that intersects with the plane perpendicular to the site (the light source 61a) generating the linear illumination light, the reflector 40 has a concave-convex shape so as to reflect light from the linear illumination light to the site (the light source 61a) generating the linear illumination light or to the neighborhood of the site. When the reflecting surface 40A is configured to reflect generated light to a generation site of the light, such light reflection is represented by the following expressions, for example. In other words, the reflector 40 has a property of two-dimensionally recursive reflection.

Vector $V$ of light before reflection=$(Vx, Vy, Vz)$

Vector $V$ of light after reflection=$(Vx, -Vy, -Vz)$

For example, as illustrated in FIG. 43, when a light component is assumed to exist, the light component being parallel to the plane perpendicular to the site (the light source 61a) generating the linear illumination light, the reflector 40 has a concave-convex shape that allows reflected light to be concentrated on a focal point C on a segment AX3 or the neighborhood of the segment AX3 and directly below the light source 61a. Here, a distance H2 between the position of the focal point C and the top of the reflector 40 is shorter than the distance H1, and is preferably equal to or more than (H1/n1−W1) and less than H1. It is to be noted that n1 denotes the refractive index of a region between the top of the reflector 40 and the position of the focal point C, and corresponds to the refractive index of the air in the present embodiment.

Figure 44:
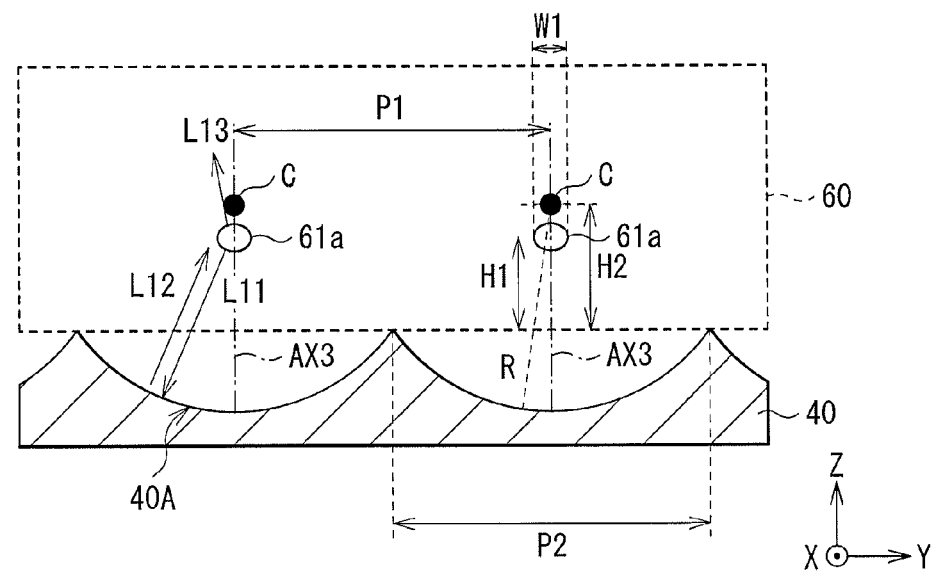
FIG. 44 is a cross-sectional view illustrating a Modification of the configuration of each of the light source and the reflector in FIG. 38.
Figure 45:
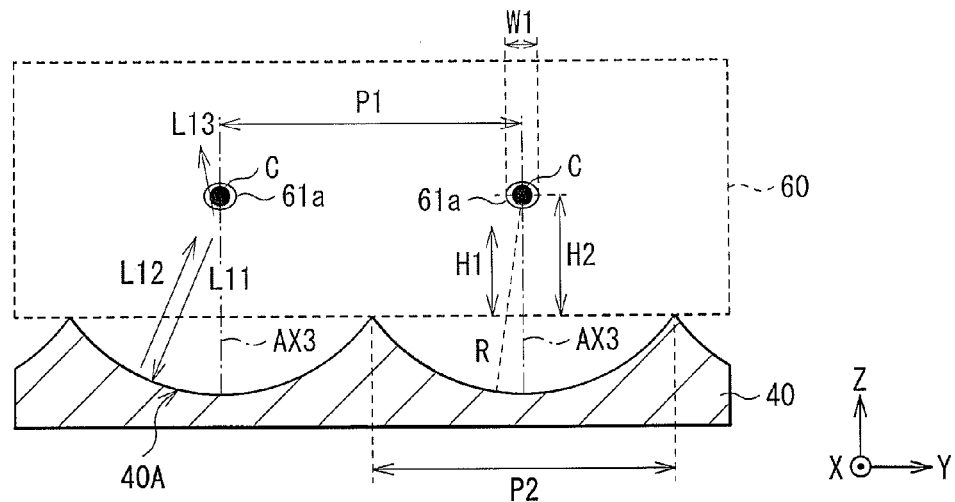
FIG. 45 is a cross-sectional view illustrating another Modification of the configuration of each of the light source and the reflector in FIG. 38.

For example, as illustrated in FIG. 44, when a light component is assumed to exist, the light component being parallel to the plane perpendicular to the site (the light source 61a) generating the linear illumination light, the reflector 40 may have a concave-convex shape that allows reflected light to be concentrated on a focal point C on a segment AX3 or the neighborhood of the segment AX3 and directly above the light source 61a. In this case, the distance H2 is longer than the distance H1, and is preferably larger than H1 and equal to or less than (H1/n1+W1). For example, as illustrated in FIG. 45, when a light component is assumed to exist, the light component being parallel to the plane perpendicular to the site (the light source 61a) generating the linear illumination light, the reflector 40 may have a concave-convex shape that allows reflected light to be concentrated on a focal point C on a segment AX3 or the neighborhood of the segment AX3 and within the light source 61a. In this case, the distance H2 is roughly equal to the distance H1.

The reflector 40 has a reflecting surface 40A as part of an inner surface of a cylinder having a central axis running through the focal point C. The reflecting surface 40A preferably has a maximum depth at the position opposed to each light source 61a.

When positions of the focal point C in FIGS. 43, 44, and 45 are compared with one another, the position shown in FIG. 45 (a position within the light source 61a) is most preferable. Here, the position of the focal point C most preferably satisfies H2=H1/n1. A pitch P2 of a three-dimensional shape of the reflecting surface 40A of the reflector 40 is most preferably equal or substantially equal to a pitch P1 between the light sources 61 (the sites generating the linear illumination light). Furthermore, in this case, a portion, which corresponds to the part of the inner surface of the cylinder, of the reflecting surface 40A most preferably has a radius of $(H2^2+(P1/2)^2)^{1/2}$. In the case of such a configuration, light reflected by the reflecting surface 40A travels toward the focal point C, and recursively arrives at the light source 61. In the present embodiment, front luminance distribution and angular luminance distribution of reflected light generated by the reflector 40 are similar to those in the case of the reflector 40 in the first embodiment.

Functions and effects of the illumination device 2 of the present embodiment are now described.

In the illumination device 2 of the present embodiment, during three-dimensional display, the light sources 61a of the light source 60 emit light while the light sources 61b emit no light. Light emitted from each light source 61a is directly ejected in the front direction, and light reflected by the reflector 40 is also ejected in the front direction. Consequently, linear illumination light is output in the front direction.

In the illumination device 2 of the present embodiment, during two-dimensional display, all the light sources 61 of the light source 60 emit light. Light emitted from each light source 61 is directly ejected in the front direction, and light reflected by the reflector 40 is also ejected in the front direction. Consequently, planar illumination light is output in the front direction.

In the present embodiment, no parallax barrier is necessary for three-dimensional display. Even if a parallax barrier is provided on a light emission side of the illumination device 2, part of the plurality of light sources 61, which correspond to light-transmissive regions of the parallax barrier, are selectively allowed to emit light, making it possible to extremely reduce a proportion of light that is output from the light source 60 and absorbed by the parallax barrier. Moreover, in the present embodiment, no cylindrical lens is necessary for three-dimensional display; hence, disadvantageous aberration due to the cylindrical lens does not occur.

In the present embodiment, linear illumination light is reflected by the reflector 40, and thus reflected light L12 to be focused is generated. This allows front intensity distribution and angular intensity distribution of the reflected light L12 to be similar to front intensity distribution and angular intensity distribution of the light L13, as part of linear illumination light, emitted to a side opposite to the reflector 40 side. As a result, it is possible to reduce a proportion of the reflected light L13 emitted from the top of the reflector through a region different from the light source 61 during three-dimensional display compared with a case where the top of the reflector is configured of a flat surface (see FIG. 22) or is configured of a paraboloid generating parallel light (see FIG. 20). Furthermore, it is possible to reduce a proportion of the reflected light L13 emitted in an angular direction unnecessary for three-dimensional display. As a result, in the case where such an illumination device 2 is used as the backlight of the display unit for three-dimensional display, it is possible to suppress formation of a double image in three-dimensional display. Consequently, display quality is improved in three-dimensional display.

4. MODIFICATION OF SECOND EMBODIMENT

In the second embodiment, in the case where the light sources 61 generate dot illumination light, the reflector 40 may have a reflecting surface 40A as part of a spherical surface. Here, the reflector 40 preferably has a maximum depth at the position opposed to each light source 61. In the case where the reflector 40 has such a reflecting surface 40A, and in the case where the illumination device 2 is used as the backlight of the display unit for three-dimensional display, it is also possible to suppress formation of a double image in three-dimensional display. Consequently, display quality is improved in three-dimensional display.

5. THIRD EMBODIMENT

Figure 46:
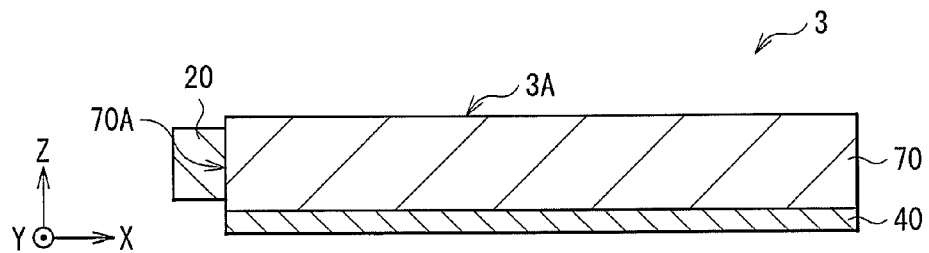
FIG. 46 is a cross-sectional view illustrating an exemplary configuration of an illumination device according to a third embodiment of the present technology.

FIG. 46 illustrates a sectional configuration of an illumination device 3 according to a third embodiment. The illumination device 3 is applicable as a backlight of a display unit, and, for example, as illustrated in FIG. 46, includes a light guide plate 70, a light source 20 disposed on a side face of the light guide plate 70, and a reflector 40 disposed behind the light guide plate 70. The light guide plate 70 and the light source 2 correspond to a specific but not limitative example of "illumination optical system".

The light guide plate 70 guides light from the light source 20 disposed on a side face of the light guide plate 10 to a top side of the light guide plate 70 (for example, to a light emission surface 3A of the illumination device 3 (see FIG. 46)). For example, the light guide plate 70 has a shape corresponding to an irradiation object (for example, a display panel 210 described later) disposed on the top of the light guide plate 70, for example, a rectangular solid shape enclosed by the top, the bottom, and the side faces. Hereinafter, among the side faces of the light guide plate 70A, a particular side face receiving light from the light source 20, is referred to as a light-incident surface 70A.

For example, the light guide plate 70 includes a scattering section that scatters light propagating within the light guide plate 70. For example, the scattering section includes a site containing filler, a portion having a scattering material printed thereon, or fine projections (convex portions). Hereinafter, the present embodiment is described assuming that the light guide plate 70 has a plurality of convex portions 71 being fine projections on its top as the scattering section. In the following description, the convex portion 71 may be read as scattering section.

Figure 47:
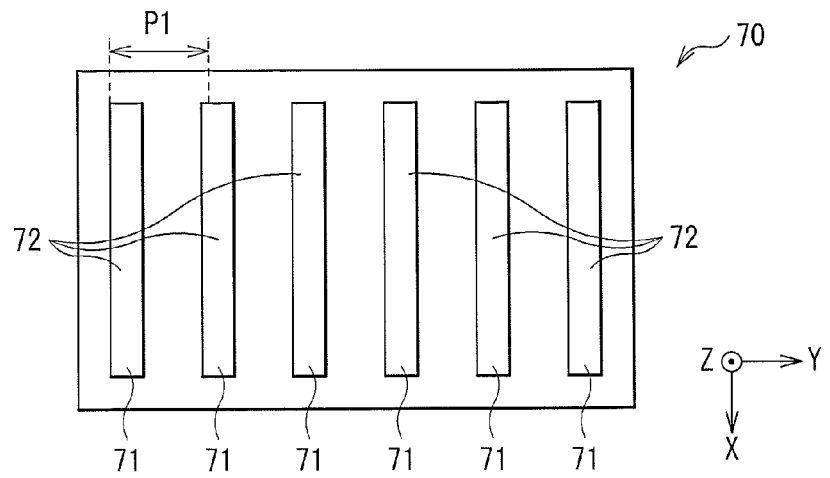
FIG. 47 is a top view illustrating an example of a light guide plate in FIG. 46.

For example, as illustrated in FIG. 47, the plurality of convex portions 71 each have a strip-like shape extending in one direction in a plane (for example, a direction parallel to the light-incident surface 70A). The convex portions 71 are used for generation of linear illumination light during three-dimensional display performed by the display unit. The plurality of convex portions 71 are arranged at a pitch P1 corresponding to a pixel pitch P3 (see FIG. 70) during three-dimensional display performed by the display unit (i.e. at a pitch equal or similar to the pixel pitch P3).

Figure 48:
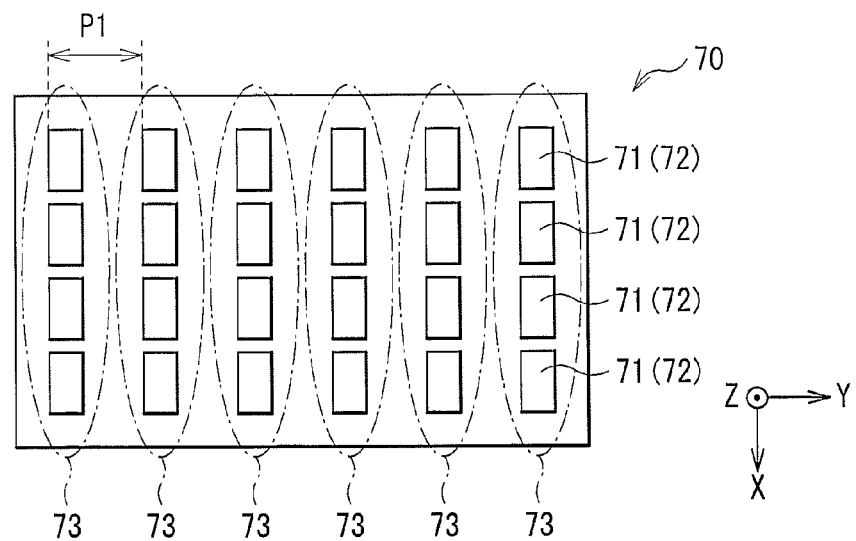
FIG. 48 is a top view illustrating another example of the light guide plate in FIG. 46.

Each convex portion 71 includes a material (for example, filler) or a structure (for example, a light scattering surface) that scatters light propagating within the light guide plate 70. As a result, the whole or part of the convex portion 71 is formed as a scattering region 72. For example, as illustrated in FIG. 47, each convex portion 71 is entirely formed as the scattering region 72 in a plane of the light guide plate 70. Here, each scattering region 72 has a strip-like shape. Although not shown, part of the convex portion 71 may be formed as the scattering region 72 in the plane of the light guide plate 70. In this case, each scattering region 72 may have a block shape, and the plurality of scattering regions 72 are arranged two-dimensionally in the plane of the light guide plate 70. For example, as illustrated in FIG. 48, each convex portion 71 may have a block shape, and the plurality of convex portions 71 may be arranged two-dimensionally. In such a case, when the plurality of convex portions 71 are considered as one linear light source 73, each linear light source 73 may be used as the convex portion 71 in FIG. 47. The plurality of linear light sources 73 are arranged at a pitch P1 corresponding to a pixel pitch P3 (see FIG. 70) during three-dimensional display performed by the display unit (i.e., at a pitch equal or similar to the pixel pitch P3).

In the present embodiment, the reflector 40 returns light from the light source 20 to a light guide plate 70 side. For example, the reflector 40 has functions of reflection, diffusion, and scattering of light. This allows light emitted from the light source 20 to be efficiently used, and helps to increase front luminance. The fine pattern surface of the reflector 40 is preferably a mirror surface. In such a case, light emitted from the light source 20 is allowed to be regularly reflected (mirror-reflected), and is thus allowed to be efficiently reflected to a focal point C (described later). Materials for the reflector 40 are similar to those described in the first embodiment.

Figure 49:
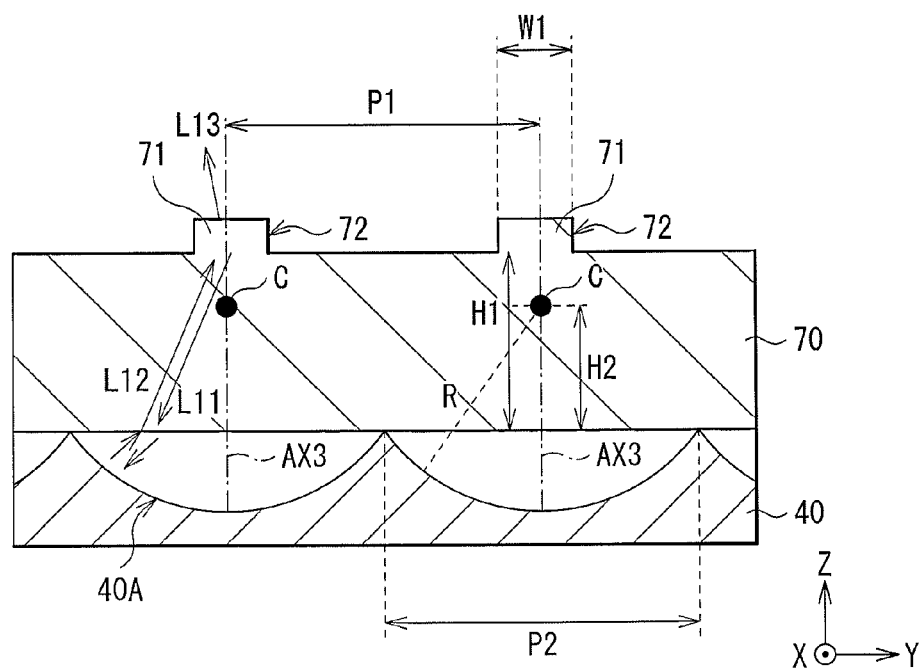
FIG. 49 is a cross-sectional view illustrating an exemplary configuration of each of the light guide plate and a reflector in FIG. 46.

For example, as illustrated in FIG. 49, the reflector 40 is disposed at a distance H1 from the scattering region 72, and has a reflecting surface 40A on a side close to the light guide plate 70. The reflecting surface 40A reflects part of light emitted from the light source 20 toward the top of the illumination device 3 (specifically, the light emission surface 3A).

When each scattering region 72 generates dot illumination light, and when the display unit performs three-dimensional display, the reflector 40 may reflect each piece of dot illumination light to generate linear reflected light to be focused. Moreover, when each scattering region 72 generates dot illumination light, and when the display unit performs two-dimensional display that allows different two-dimensional images to be viewed from two perspectives, the reflector 40 may reflect each piece of dot illumination light to generate linear reflected light to be focused.

The reflector 40 reflects light toward a segment or the neighborhood of the segment, the segment running through each of sites (the scattering regions 72) that generate linear illumination light, and being perpendicular to a plane containing the reflector 40. Specifically, when the linear illumination light is assumed to have a light component that is parallel to a plane perpendicular to the site (the scattering region 72) generating the linear illumination light, the reflector 40 has a concave-convex surface causing generation of reflected light to be focused on a segment or the neighborhood of the segment, the segment running through the site (the scattering region 72) that generates the linear illumination light and being parallel to the normal to the plane containing the reflector 40. Furthermore, when the linear illumination light is assumed to have a light component that intersects with the plane perpendicular to the site (the light source 61, the scattering regions 72) generating the linear illumination light, the reflector 40 has a concave-convex surface so as to reflect light from the linear illumination light to the site (the scattering regions 72) generating the linear illumination light or to the neighborhood of the site. When the reflecting surface 40A is configured to reflect generated light to a generation site of the light, such light reflection is represented by the following expressions, for example. In other words, the reflector 40 has a property of two-dimensionally recursive reflection.

Vector $V$ of light before reflection = $(Vx, Vy, Vz)$

Vector $V$ of light after reflection = $(Vx, -Vy, -Vz)$

The reflector 40 has a concave-convex shape that allows reflected light to be focused on a segment AX3 or the neighborhood of the segment AX3, the segment AX3 running through the site (the scattering region 72) generating the linear illumination light and being parallel to the normal to the plane containing the reflector 40. In other words, the reflector 40 has a recursive reflection property. For example, as illustrated in FIG. 49, the reflector 40 has a concave-convex shape that allows reflected light to be concentrated on a focal point C on the segment AX3 or the neighborhood of the segment AX3 and directly below the scattering region 72. Here, a distance H2 between the position of the focal point C and the top of the reflector 40 is shorter than the distance H1, and is preferably equal to or more than (H1/n1−W1) and less than H1. It is to be noted that n1 denotes the refractive index of a region between the top of the reflector 40 and the position of the focal point C, and corresponds to the refractive index of the light guide plate 70 in the present embodiment.

Figure 50:
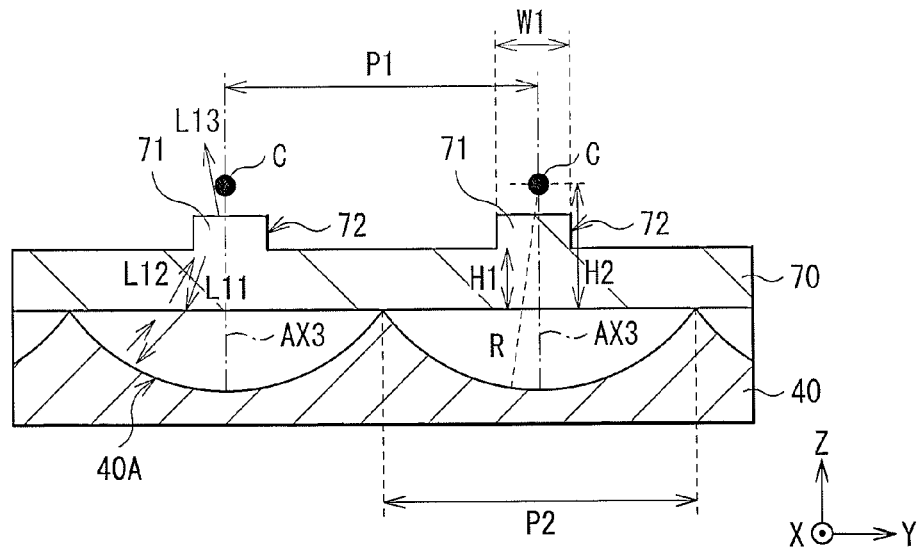
FIG. 50 is a cross-sectional view illustrating a first Modification of the configuration of each of the light guide plate and the reflector in FIG. 46.
Figure 51:
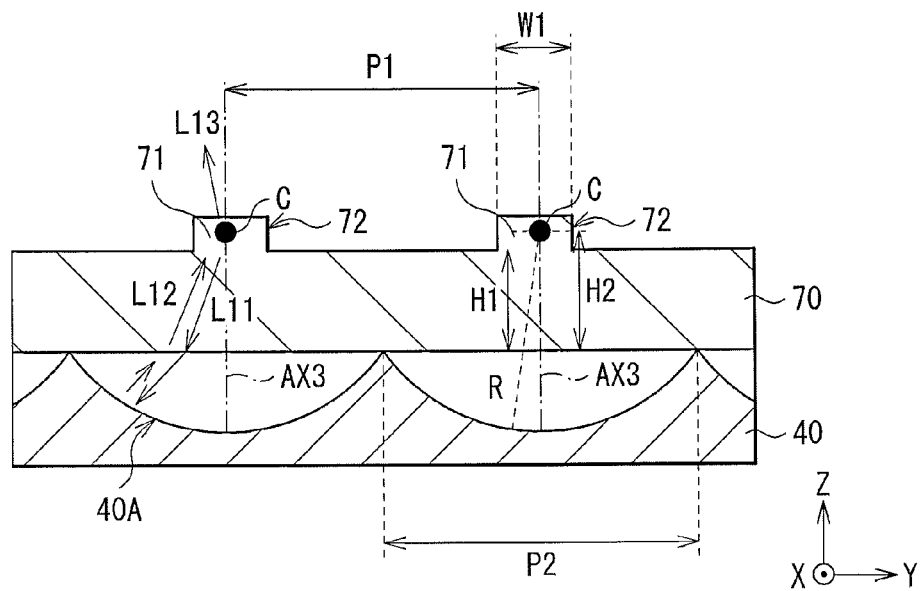
FIG. 51 is a cross-sectional view illustrating a second Modification of the configuration of each of the light guide plate and the reflector in FIG. 46.

For example, as illustrated in FIG. 50, when a light component is assumed to exist, the light component being parallel to the plane perpendicular to the site (the scattering region 72) generating the linear illumination light, the reflector 40 may have a concave-convex shape that allows reflected light to be concentrated on a focal point C on the segment AX3 or the neighborhood of the segment AX3 and directly above the scattering region 72. In this case, the distance H2 is longer than the distance H1, and is preferably larger than H1 and equal to or less than (H1/n1+W1). For example, as illustrated in FIG. 51, when a light component is assumed to exist, the light component being parallel to the plane perpendicular to the site (the scattering region 72) generating the linear illumination light, the reflector 40 may have a surface shape that allows reflected light to be concentrated on a focal point C on the segment AX3 or the neighborhood of the segment AX3 and within the scattering region 72. In this case, the distance H2 is roughly equal to the distance H1.

The reflector 40 has a reflecting surface 40A as part of an inner surface of a cylinder having a central axis running through the focal point C. The reflector 40 preferably has a maximum depth at the position opposed to each scattering region 72.

When positions of the focal point C in FIGS. 49, 50, and 51 are compared with one another, the position shown in FIG. 49 (a position directly below the scattering region 72) is most preferable. Here, the position of the focal point C most preferably satisfies H2=H1/n1. A pitch P2 of a three-dimensional shape of the reflecting surface 40A of the reflector 40 is most preferably equal or substantially equal to a pitch P1 between the scattering regions 72 in the light guide plate 70. Furthermore, in this case, a portion, which corresponds to the part of the inner surface of the cylinder, of the reflecting surface 40A most preferably has a radius of $(H2^2+(P1/2)^2)^{1/2}$. In the case of such a configuration, light reflected by the reflecting surface 40A travels toward the focal point C, and is refracted by the bottom of the light guide plate 70, and recursively arrives at the scattering region 72.

Figure 52:
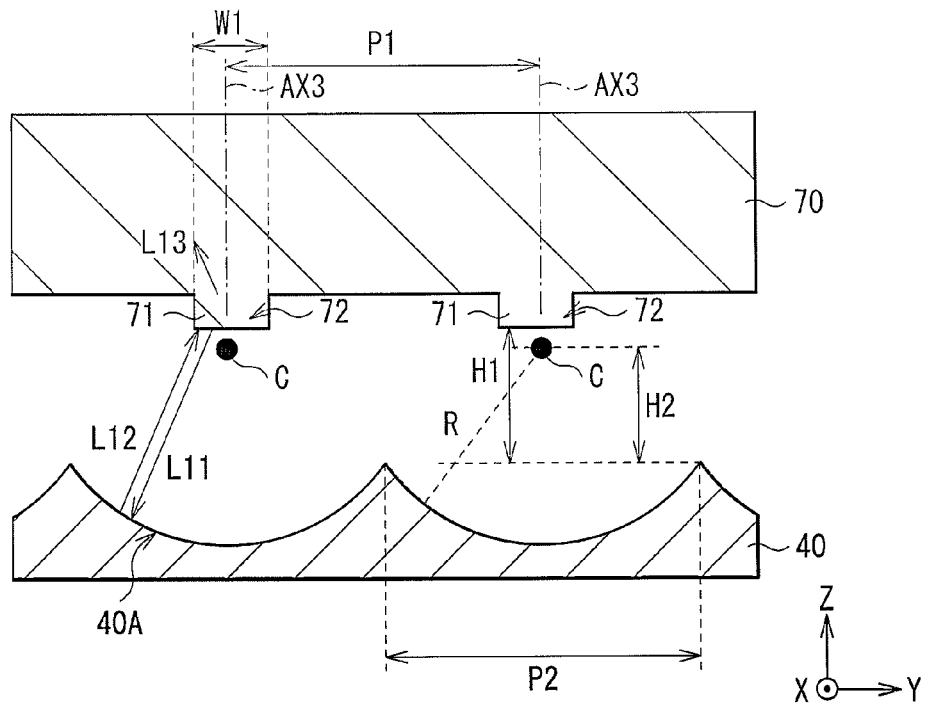
FIG. 52 is a cross-sectional view illustrating a third Modification of the configuration of each of the light guide plate and the reflector in FIG. 46.
Figure 53:
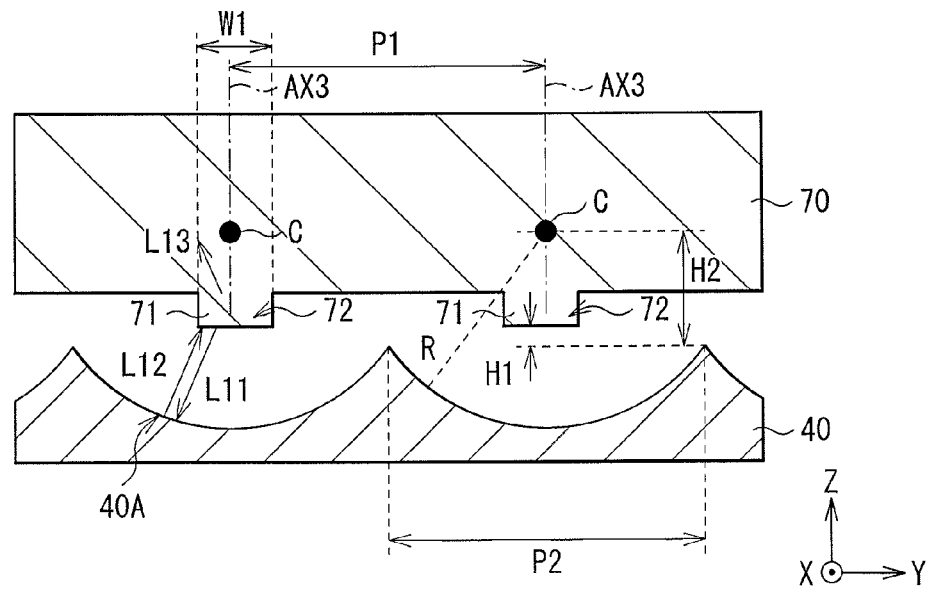
FIG. 53 is a cross-sectional view illustrating a fourth Modification of the configuration of each of the light guide plate and the reflector in FIG. 46.
Figure 54:
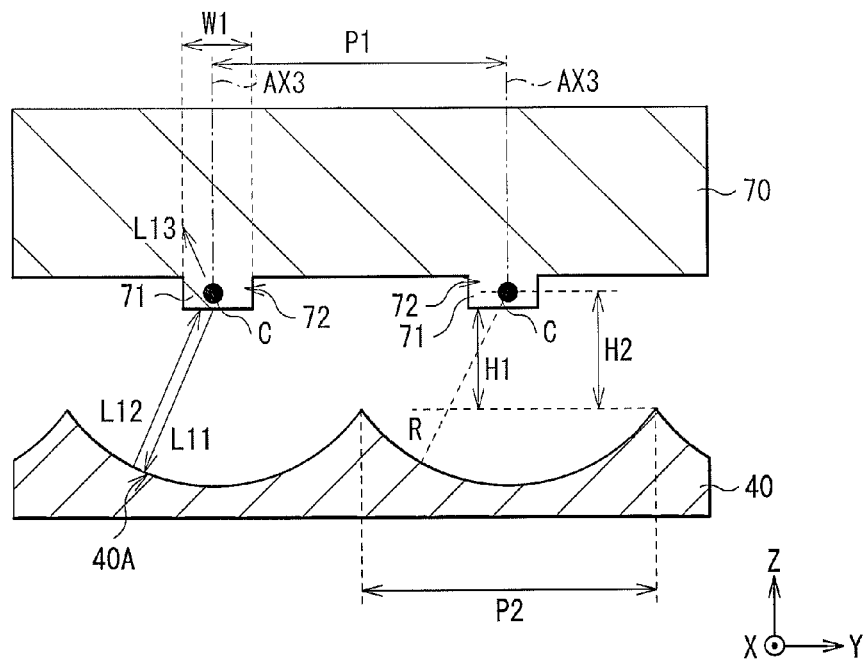
FIG. 54 is a cross-sectional view illustrating a fifth Modification of the configuration of each of the light guide plate and the reflector in FIG. 46.

For example, as illustrated in FIGS. 52, 53, and 54, each convex portion 71 may be provided on the bottom of the light guide plate 70. In the case of such a configuration, the focal point C is most preferably located at the position shown in FIG. 54 (a position within the scattering region 72). In the case where the focal point C is located at the position shown in FIG. 54, light reflected by the reflector 40 directly enters the scattering region 72 without being refracted at the bottom of the light guide plate 70, and thus design of the illumination device 3 is facilitated.

In the present embodiment, the reflector 40 may be bonded to the light guide plate 70. Possible types of bonding of the reflector 40 to the light guide plate 70 include whole-surface bonding, peripheral bonding (bonding over the annular portion other than the display region), and point bonding (bonding at points in the portion other than the display region). In the case of the whole-surface bonding of the reflector 40 to the light guide plate 70, the apex portions of the reflector 40 are possibly bonded to the light guide plate 70. In such a case, each of the apex portions of the reflector 40 may be formed as a slightly flat surface.

In the present embodiment, for example, although not shown, the reflector 40 may have a black 43 as illustrated in FIG. 24 on each of sites to be in contact with the light guide plate 70. For example, the black 43 may be a mixture of a black pigment with an adhesive agent for fixation of the reflector 40 to the back of the light guide plate 70.

In the present embodiment, linear illumination light is output from the scattering region 72 provided in each convex portion 71 of the light guide plate 70. Here, in the present embodiment, linear illumination light is reflected by the reflector 40, and thus reflected light L12 to be focused is generated. This allows front intensity distribution and angular intensity distribution of the reflected light L12 to be similar to front intensity distribution and angular intensity distribution of the light L13, as part of linear illumination light, emitted to a side opposite to the reflector 40 side. As a result, it is possible to reduce a proportion of the reflected light L13 emitted from the top of the reflector through a region different from the scattering region 72 during three-dimensional display compared with a case where the top of the reflector is configured of a flat surface (see FIG. 22) or is configured of a paraboloid generating parallel light (see FIG. 20). As a result, in the case where such an illumination device 3 is used as the backlight of the display unit for three-dimensional display, it is possible to suppress formation of a double image in three-dimensional display. Consequently, display quality is improved in three-dimensional display.

6. MODIFICATION OF THIRD EMBODIMENT

In the third embodiment, in the case where part of each convex portion 71 is formed as the scattering region 72, the reflector 40 may have a reflecting surface 40A as part of a spherical surface. Here, the reflector 40 preferably has a maximum depth at the position opposed to each scattering region 72. In the case where the reflector 40 has such a reflecting surface 40A, and in the case where the illumination device 3 is used as the backlight of the display unit for three-dimensional display, it is also possible to suppress formation of a double image in three-dimensional display. Consequently, display quality is improved in three-dimensional display.

7. MODIFICATIONS COMMON TO RESPECTIVE EMBODIMENTS

First Common Modification

Figure 55:
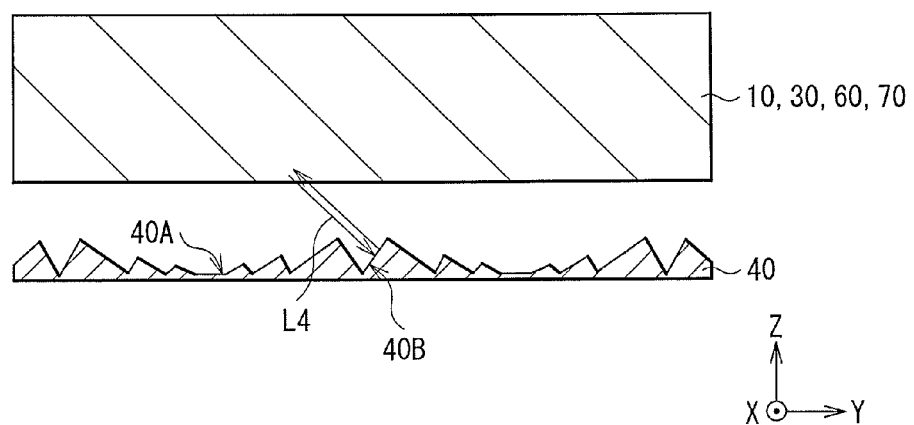
FIG. 55 is a cross-sectional view illustrating a first Modification of the configuration of the reflector in FIG. 1.

In the above-described respective embodiments and the Modifications thereof, for example, as illustrated in FIG. 55, the reflecting surface 40A may be formed as a Fresnel lens. In the case of such a configuration, light L4, which propagates to a region possibly causing stray light, is allowed to be reflected to a generation site of the light L4 (recursively reflected) using a surface 40B that is part of the reflecting surface 40A but is different from a surface on a circular arc side. Here, "light L4 propagating to a region possibly causing stray light" refers to particular light that is emitted from the scattering region 30B, the light source 61a, or the scattering region 72, and propagates to an adjacent circular-arc surface beyond a circular-arc surface just below the light (a region P2). In addition, the reflector 40 is allowed to be reduced in thickness.

Second Common Modification

Figure 56:
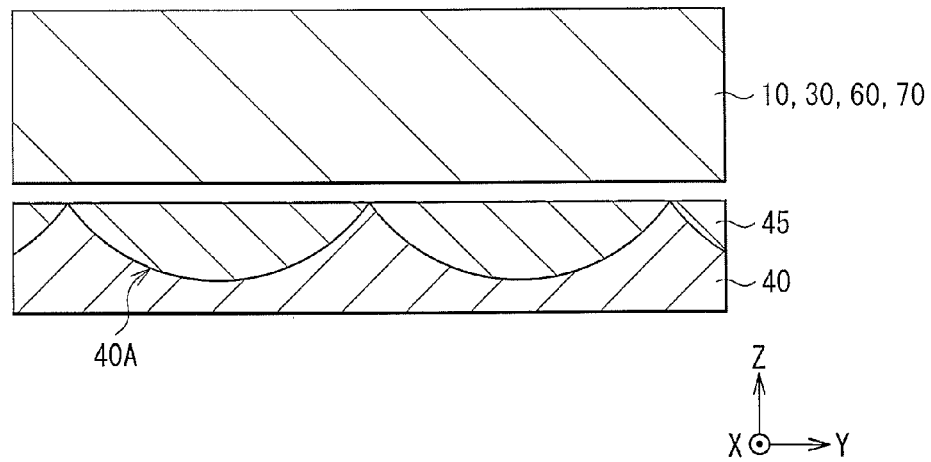
FIG. 56 is a cross-sectional view illustrating a second Modification of the configuration of the reflector in FIG. 1.

In the above-described respective embodiments and the Modifications thereof, for example, as illustrated in FIG. 56, the reflector 40 may have a filler layer 45 that planarizes the top of the reflector 40, and fills the reflecting surface 40A. In this case, a clearance (air) is necessary between the filler layer 45 and the light guide plate 10, the light modulation layer 30, the light source 60, or the light guide plate 70. In the case of such a configuration, an optical path of light L11 emitted from the scattering region 30B, the light source 61a, or the scattering region 72 is parallel to an optical path of light L12 reflected by the reflector 40. Hence, the position of the focal point C is most preferably within the scattering region 30B, the light source 61a, or the scattering region 72.

Third Common Modification

In the above-described respective embodiments and the Modifications thereof, the reflector 40 may reflect light emitted from a site (first site) generating the linear illumination light toward a site (second site) that generates the linear illumination light and is adjacent to the first site.

Figure 57:
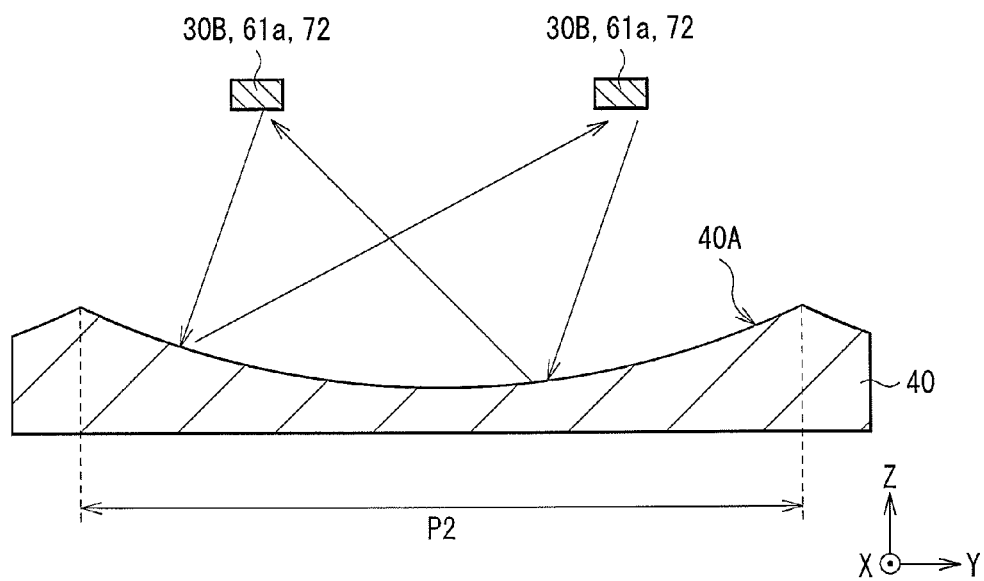
FIG. 57 is a cross-sectional view illustrating a third Modification of the configuration of the reflector in FIG. 1.

For example, as illustrated in FIG. 57, the reflector 40 has a curved surface, as the reflecting surface 40A, that reflects light emitted from a site located on a relatively left side in the drawing (a site generating the linear illumination light) toward a site on the right adjacent to the site emitting the light (the site generating the linear illumination light). Furthermore, for example, as illustrated in FIG. 57, the reflector 40 has a curved surface, as the reflecting surface 40A, that reflects light emitted from a site located on a relatively right side in the drawing (a site generating the linear illumination light) toward a site on the left adjacent to the site emitting the light (the site generating the linear illumination light).

Figure 58:
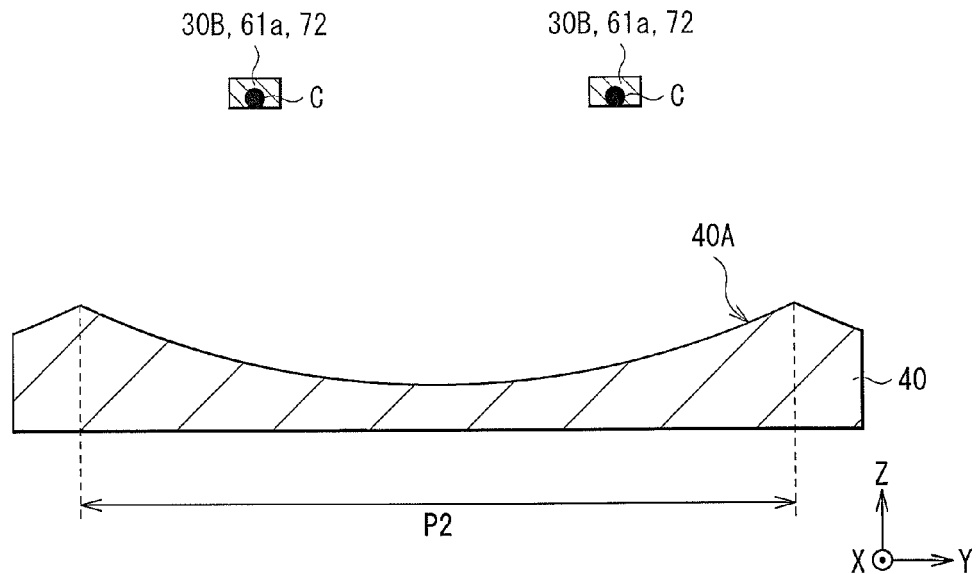
FIG. 58 is a cross-sectional view for explaining an exemplary focal point of the reflector of FIG. 57.
Figure 59:
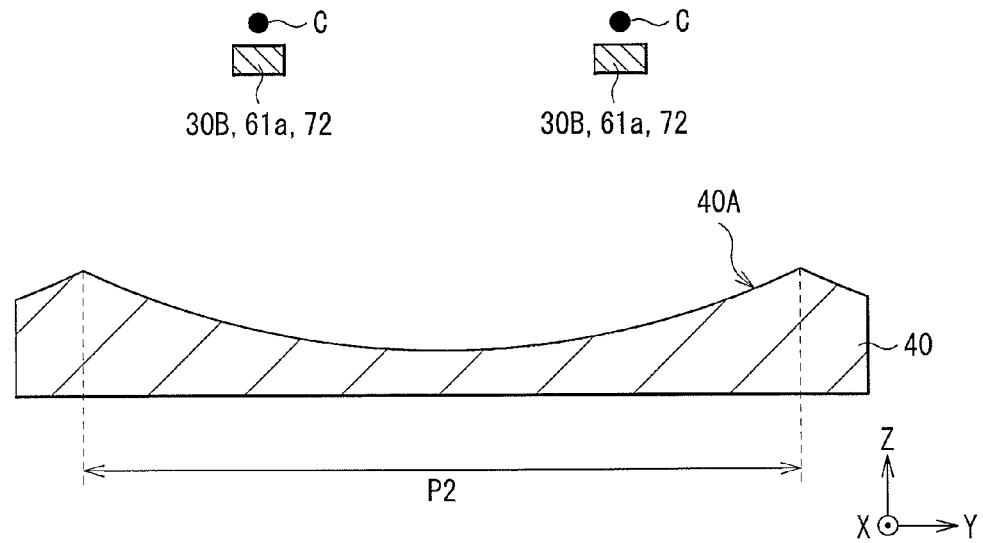
FIG. 59 is a cross-sectional view for explaining another exemplary focal point of the reflector of FIG. 57.
Figure 60:
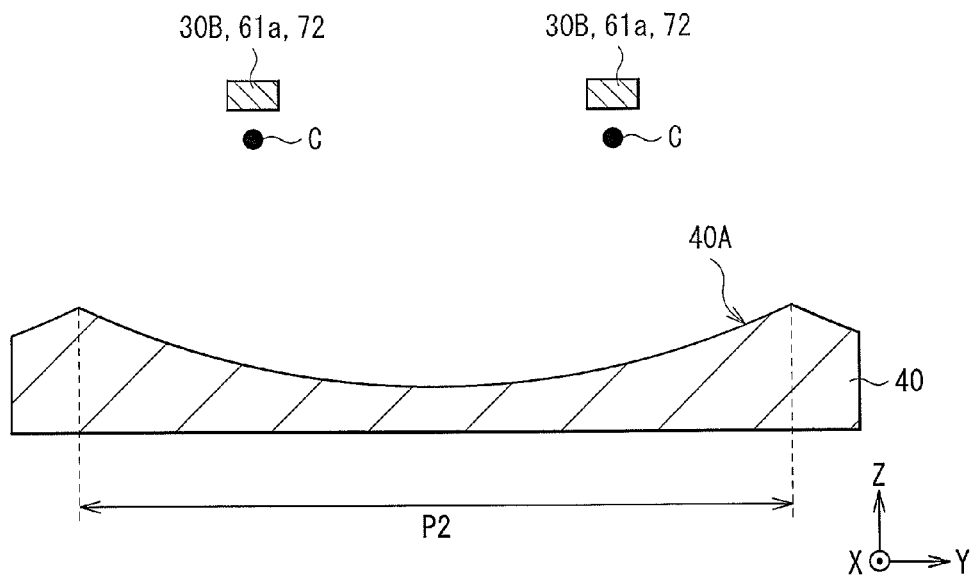
FIG. 60 is a cross-sectional view for explaining another exemplary focal point of the reflector of FIG. 57.

In the case where a boundary, at which a refractive index is varied, does not exist between the site generating the linear illumination light and the reflector 40, the reflecting surface 40A has a focal point C in the site generating the linear illumination light, for example, as illustrated in FIG. 58. On the other hand, in the case where the boundary at which a refractive index is varied, exists between the site generating the linear illumination light and the reflector 40, the reflecting surface 40A has a focal point C above or below the site generating the linear illumination light, for example, as illustrated in FIG. 59 or 60. In particular, in the case where the site generating the linear illumination light exists within a transparent substrate having a refractive index n1, the distance H2 between the position of the focal point C and the top of the reflector 40 preferably satisfies H1/n1−W1≤H2≤H1/n1+W1, and further preferably satisfies H2=H1/n1. It is to be noted that W1 denotes the width of the site (30B, 61a, or 72) generating the linear illumination light.

Figure 61:
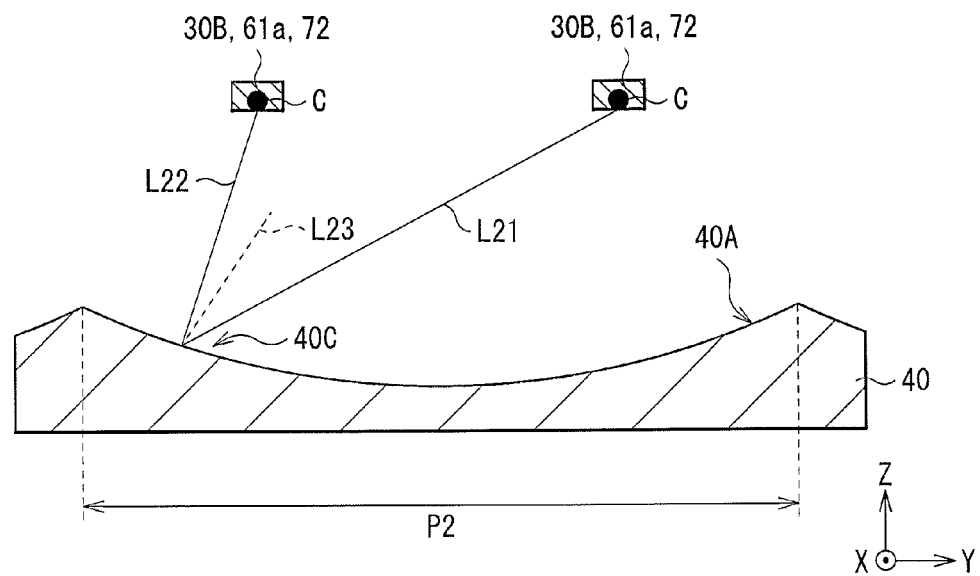
FIG. 61 is a cross-sectional view for explaining a function of the reflector of FIG. 57.
Figure 62:
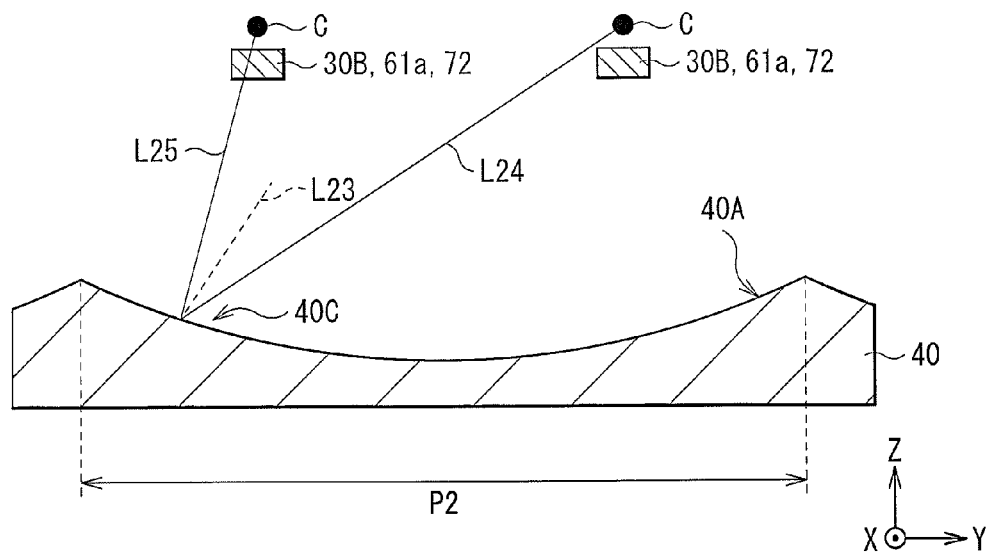
FIG. 62 is a cross-sectional view for explaining a function of the reflector of FIG. 58.
Figure 63:
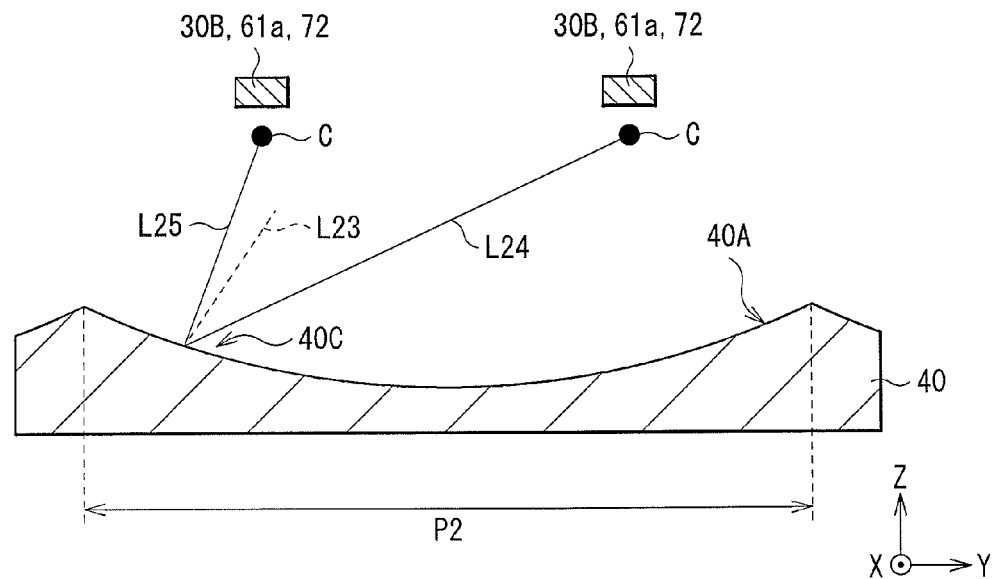
FIG. 63 is a cross-sectional view for explaining a function of the reflector of FIG. 59.

In the case where the boundary, at which a refractive index is varied, does not exist between the site generating the linear illumination light and the reflector 40, for example, as illustrated in FIG. 61, the reflecting surface 40A is a curved surface such that when an appropriate site 40C on the reflecting surface 40A is connected to two sites (30B, 61a, or 72) with straight lines L21 and L22, each of the two sites generating the linear illumination light and being opposed to the reflecting surface 40A, the normal L23 to the site 40C corresponds to a bisector of an angle formed by the straight lines L21 and L22. In the case where one boundary at which a refractive index is varied, exists between the site generating the linear illumination light and the reflector 40, for example, as illustrated in FIG. 62 or 63, the reflecting surface 40A is a curved surface such that when an appropriate site 40C on the reflecting surface 40A is connected to sites (focal points C in the drawing) above or below two sites (30B, 61a, or 72) with straight lines L24 and L25, each of the two sites generating the linear illumination light and being opposed to the reflecting surface 40A, the normal L23 to the site 40C corresponds to a bisector of an angle formed by the straight lines L24 and L25. In particular, in the case where the site generating the linear illumination light exists within a transparent substrate having a refractive index n1, the reflecting surface 40A is a curved surface such that when an appropriate site 40C on the reflecting surface 40A is connected to sites below two sites (30B, 61a, or 72) with straight lines L24 and L25, each of the two sites generating the linear illumination light and being opposed to the reflecting surface 40A (the distance H2 between the position of the focal point C and the top of the reflector 40 preferably satisfies H1/n1−W1≤H2≤H1/n1+W1, and further preferably satisfies H2=H1/n1), the normal L23 to the site 40C corresponds to a bisector of an angle formed by the straight lines L24 and L25. In the case where a refractive index varies to be high, low, and high in this order between the site generating the linear illumination light and the reflector 40, for example, as illustrated in FIG. 61, the reflecting surface 40A is a curved surface such that when an appropriate site 40C on the reflecting surface 40A is connected to two sites (30B, 61a, or 72) with straight lines L21 and L22, each of the two sites generating the linear illumination light and being opposed to the reflecting surface 40A, the normal L23 to the site 40C corresponds to a bisector of an angle formed by the straight lines L21 and L22. Such a case corresponds to a case where the site generating the linear illumination light exists within a transparent substrate, and the reflector 40 has the filler layer 45 that planarizes the top of the reflector 40, and fills the reflecting surface 40C, as described later.

The pitch P2 of the three-dimensional shape of the reflector 40 (the width of the reflecting surface 40A) is two times as large as the pitch P1 between the sites (30B, 61a, or 72) generating the linear illumination light. The reflecting surface 40A is a concave curved surface having the maximum depth at a position opposed to an intermediate region between two adjacent sites (30B, 61a, or 72).

In the present modification, as with the above-described respective embodiments, linear illumination light is reflected by the reflector 40, thereby reflected light to be focused is generated. This allows front intensity distribution and angular intensity distribution of the reflected light to be similar to front intensity distribution and angular intensity distribution of light, as part of linear illumination light, emitted to a side opposite to a reflector 40 side. As a result, it is possible to reduce a proportion of the reflected light emitted from the top of the reflector through a region different from the site generating the linear illumination light during three-dimensional display compared with a case where the top of the reflector is configured of a flat surface (see FIG. 22) or is configured of a paraboloid generating parallel light (see FIG. 20). As a result, in the case where such an illumination device is used as the backlight of the display unit for three-dimensional display, it is possible to suppress formation of a double image in three-dimensional display. Consequently, display quality is improved in three-dimensional display.

Figure 64:
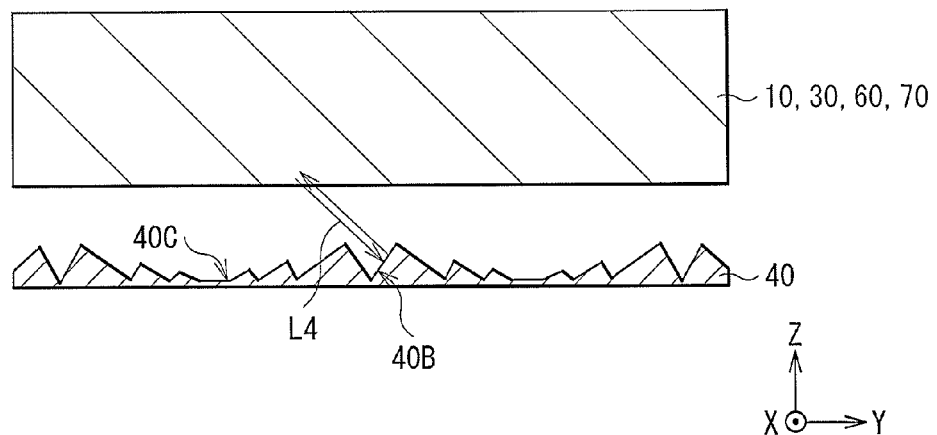
FIG. 64 is a cross-sectional view illustrating a fourth Modification of the configuration of the reflector in FIG. 1.
Figure 65:
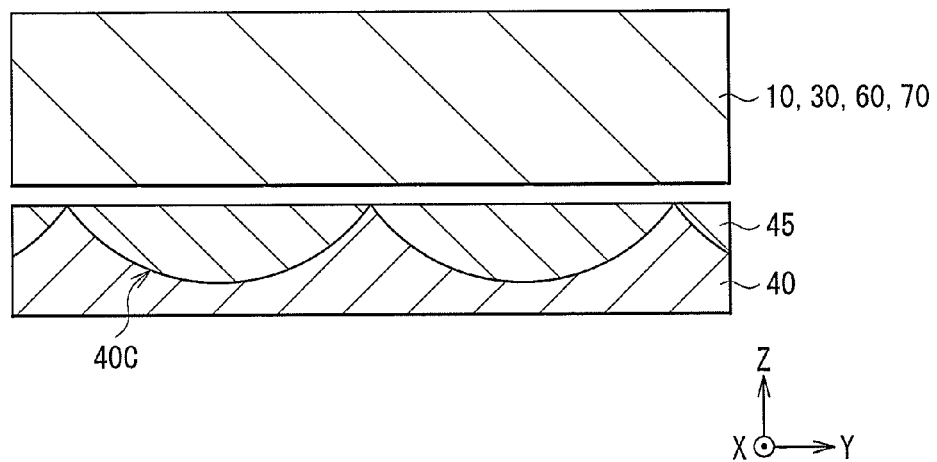
FIG. 65 is a cross-sectional view illustrating a fifth Modification of the configuration of the reflector in FIG. 1.

In the present modification, for example, as illustrated in FIG. 64, the reflector 40 may be formed as a Fresnel lens. In the case of such a configuration, the reflector 40 is allowed to be reduced in thickness. In the present modification, as illustrated in FIG. 65, the reflector 40 may have a filler layer 45 that planarizes the top of the reflector 40, and fills the reflecting surface 40C. In this case, a clearance (air) is necessary between the filler layer 45 and the light guide plate 10, the light modulation layer 30, the light source 60, or the light guide plate 70. In the case of such a configuration, an optical path of light emitted from the scattering region 30B, the light source 61a, or the scattering region 72 is parallel to an optical path of light reflected by the reflector 40. Hence, the position of the focal point C is most preferably within the scattering region 30B, the light source 61a, or the scattering region 72.

8. FOURTH EMBODIMENT

Description is now made on a transmitter-receiver system for television broadcast signals including any one of the illumination devices 1, 2, and 3 according to the above-described respective embodiments and the Modifications thereof.

Figure 66:
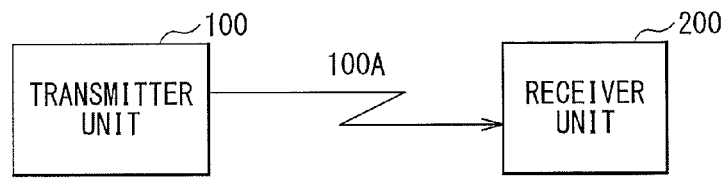
FIG. 66 is a diagram illustrating an exemplary transmitter-receiver system for television broadcast signals according to a fourth embodiment of the present technology.

FIG. 66 is a block diagram illustrating an exemplary configuration of a transmitter-receiver system for television broadcast signals 100A according to a fourth embodiment. For example, the transmitter-receiver system includes a transmitter unit 100 that transmits television broadcast signals through a wired line (such as cable TV) or a wireless line (such as terrestrial digital waves and satellite waves), and a receiver unit 200 that receives television broadcast signals from the transmitter unit 100 through the wired line or the wireless line. The receiver unit 200 corresponds to a specific but not limitative example of "display unit".

The television broadcast signals 100A contains image data for two-dimensional display (planar display) or three-dimensional display (stereoscopic display). The image data for two-dimensional display refers to two-dimensional image data without perspective information. The image data for three-dimensional display refers to two-dimensional image data with perspective information, and includes a plurality of two-dimensional image data with perspectives different from one another. Examples of the transmitter unit 100 include a television broadcast signal transmitter installed in a broadcasting station or a server on the Internet.

[Functional Block of Receiver Unit 200]

Figure 67:
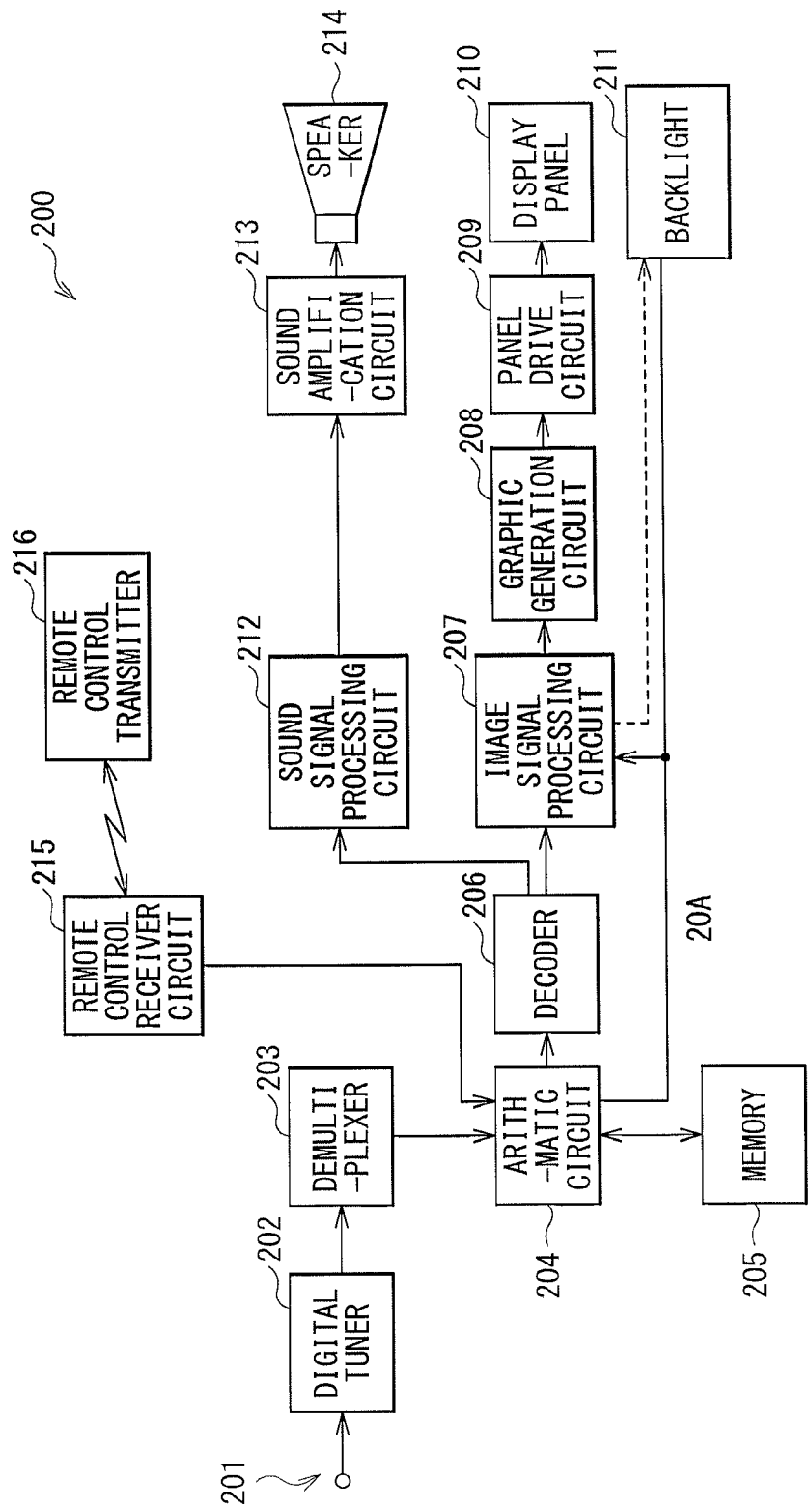
FIG. 67 is a diagram illustrating an exemplary functional block of a receiver unit in FIG. 66.

FIG. 67 is a block diagram illustrating an exemplary configuration of the receiver unit 200. For example, the receiver unit 200 is a television connectable to the above-described wired or wireless line. For example, the receiver unit 200 includes an antenna terminal 201, a digital tuner 202, a demultiplexer 203, an arithmetic circuit 204, and a memory 205. Furthermore, for example, the receiver unit 200 includes a decoder 206, an image signal processing circuit 207, a graphic generation circuit 208, a panel drive circuit 209, a display panel 210, a backlight 211, a sound signal processing circuit 212, a sound amplification circuit 213, and a speaker 214. Furthermore, for example, the receiver unit 200 includes a remote control receiver circuit 215 and a remote control transmitter 216.

The backlight 211 corresponds to any one of the illumination devices 1, 2, and 3 according to the above-described respective embodiments and the Modifications thereof. The display panel 210 corresponds to a specific but not limitative example of "display panel", and the backlight 211 corresponds to a specific but not limitative example of "illumination device".

The antenna terminal 201 is a terminal receiving television broadcast signals received by a reception antenna (not shown). For example, the digital tuner 202 processes the television broadcast signals received by the antenna terminal 201 to output a predetermined transport stream corresponding to a channel selected by a user. For example, the demultiplexer 203 extracts partial TS (transport stream) corresponding to the channel selected by a user based on the transport stream output by the digital tuner 202.

The arithmetic circuit 204 controls operation of each of sections of the receiver unit 200. For example, the arithmetic circuit 204 stores the partial TS extracted by the demultiplexer 203 in the memory 205, or sends the partial TS read from the memory 205 to the decoder 206. For example, the arithmetic circuit 204 sends a control signal 204A designating two-dimensional display or three-dimensional display to the image signal processing circuit 207 and the backlight 211. For example, the arithmetic circuit 204 sets the control signal 204A based on setting information stored in the memory 205, predetermined information contained in the partial TS, or setting information sent from the remote control receiver circuit 215.

For example, the memory 205 performs storage of setting information for the receiver unit 200 and data management. For example, the memory 205 is capable of holding the partial TS extracted by the demultiplexer 203 and setting information for a display method, etc.

For example, the decoder 206 acquires image data through performing decode processing on an image PES (Packetized Elementary Stream) packet contained in the partial TS extracted by the demultiplexer 203. In addition, for example, the decoder 206 acquires sound data through performing decode processing on a sound PES packet contained in the partial TS extracted by the demultiplexer 203. The image data refers to image data for two-dimensional display or image data for three-dimensional display.

For example, the image signal processing circuit 207 and the graphic generation circuit 208 perform multiple image processing, superposition processing of graphic data, and the like, on the image data acquired by the decoder 206 as necessary.

In the case where a signal designating three-dimensional display is sent as the control signal 204A from the arithmetic circuit 204, and when the image data sent from the decoder 206 is image data for three-dimensional display, for example, the image signal processing circuit 207 creates one piece of two-dimensional image data using a plurality of pieces of two-dimensional image data with perspectives different from one another contained in the image data for three-dimensional display sent from the decoder 206, and selects the created two-dimensional image data as image data to be output to the graphic generation circuit 208. For example, in the case where the image data for three-dimensional display contains two pieces of two-dimensional image data with perspectives different from each other, the image signal processing circuit 207 performs processing of alternately arranging the two two-dimensional image data in a horizontal direction for each of rows to create one piece of image data including the two pieces of two-dimensional image data alternately arranged in the horizontal direction for each row. Similarly, for example, in the case where the image data for three-dimensional display contains four pieces of two-dimensional image data with perspectives different from one another, the image signal processing circuit 207 performs processing of periodically arranging the four pieces of two-dimensional image data in a horizontal direction for each of rows to create one piece of image data including the four piece of two-dimensional image data periodically arranged in the horizontal direction for each row.

In the case where a signal designating two-dimensional display is sent as the control signal 204A from the arithmetic circuit 204, and when the image data sent from the decoder 206 is image data for three-dimensional display, for example, the image signal processing circuit 207 selects one of a plurality of pieces of two-dimensional image data with perspectives different from one another contained in the image data for three-dimensional display sent from the decoder 206 as image data to be output to the graphic generation circuit 208. In the case where a signal designating two-dimensional display is sent as the control signal 204A from the arithmetic circuit 204, and when the image data sent from the decoder 206 is image data for two-dimensional display, for example, the image signal processing circuit 207 selects the image data for two-dimensional display sent from the decoder 206 as image data to be output to the graphic generation circuit 208.

For example, the graphic generation circuit 208 produces a UI (User Interface) screen to be used for screen display. For example, the panel drive circuit 209 drives the display panel 210 based on image data output from the graphic generation circuit 208.

The configuration of the display panel 210 is described in detail later. For example, the sound signal processing circuit 212 performs processing such as D/A conversion on sound data acquired by the decoder 206. For example, the sound amplification circuit 213 amplifies a sound signal output from the sound signal processing circuit 212 and supplies the amplified sound signal to the speaker 214.

For example, the remote control receiver circuit 215 receives a remote control signal transmitted from the remote control transmitter 216 and supplies the remote control signal to the arithmetic circuit 204. For example, the arithmetic circuit 204 controls each of the sections of the receiver unit 200 based on the remote control signal.

(Sectional Configuration of Receiver Unit 200)

Figure 68:
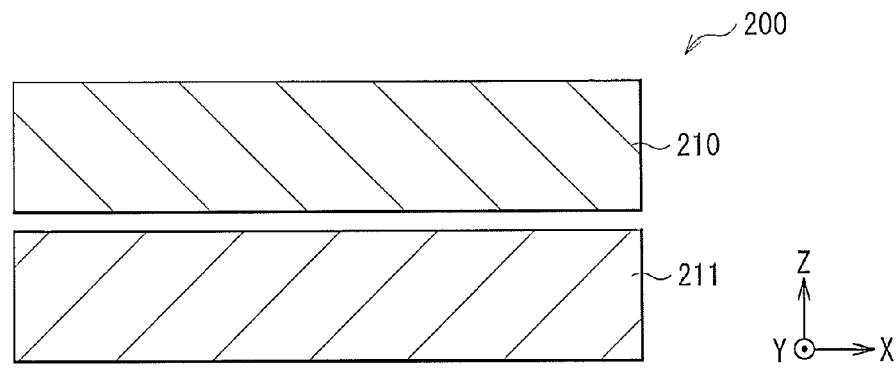
FIG. 68 is a cross-sectional view illustrating an exemplary configuration of a display section of the receiver unit in FIG. 66.

FIG. 68 illustrates an exemplary sectional configuration of a display section of the receiver unit 200. It is to be noted that FIG. 68 is a schematic illustration, which therefore does not necessarily show actual dimensions and shapes. The receiver unit 200 includes the display panel 210 and the backlight 211 disposed behind the display panel 210.

The display panel 210 includes a plurality of pixels arranged two-dimensionally, and displays an image through driving of individual pixels or particular pixels. For example, the display panel 210 is a transmissive liquid crystal display (LCD) panel in which individual pixels or particular pixels are driven based on image signals, and has a structure where a liquid crystal layer is sandwiched by a pair of transparent substrates. For example, although not shown, the display panel 210 includes a polarizing plate, a transparent substrate, a pixel electrode, an alignment film, a liquid crystal layer, an alignment film, a common electrode, a color filter, a transparent substrate, and a polarizing plate in order of closeness to the backlight 211. In the display panel 210, a stacked boty including the transparent substrate, the pixel electrode, the alignment film, the liquid crystal layer, the alignment film, the common electrode, the color filter, and the transparent substrate corresponds to a liquid crystal panel 210A in FIG. 69. The polarizing plate on a side close to the backlight 211 corresponds to a polarizing plate 210B in FIG. 69, and the polarizing plate on a side opposite to the side close to the backlight 211 corresponds to a polarizing plate 210C in FIG. 69.

The transparent substrates each include a substrate transparent to visible light, for example, a sheet glass substrate. Although not shown, an active drive circuit, which includes TFT (Thin Film Transistor) and wirings electrically connected to the pixel electrode, is provided on the transparent substrate on the side close to the backlight 211. Each of the pixel electrode and the common electrode includes indium tin oxide (ITO), for example. The pixel electrode includes a plurality of electrodes that are arranged two-dimensionally on the transparent substrate and serve as electrodes for individual pixels. On the other hand, the common electrode is provided over the entire area on the color filter, and serves as a common electrode opposed to the individual pixel electrodes. The alignment films each include a polymer material such as, for example, polyimide, and are each used to perform alignment treatment on liquid crystal.

For example, the liquid crystal layer includes liquid crystal of a VA (Vertical Alignment) mode, a TN (Twisted Nematic) mode, or a STN (Super Twisted Nematic) mode, and has a function of varying a direction of a polarizing axis of light emitted from the backlight 211 for each of the pixels in response to a voltage applied from a drive circuit (not shown). The arrangement of the liquid crystal is varied in a multistep manner, and thus a direction of a transmission axis for each pixel is adjusted in a multistep manner. The color filter includes color filters that are arranged in correspondence to the arrangement of the pixel electrodes, for color separation of light transmitted by the liquid crystal layer into three primary colors of red (R), green (G), and blue (B) or four colors of R, G. B, and white (W), for example.

Each of the polarizing plates is a type of optical shutters, and exclusively transmits light (polarized light) in a certain oscillation direction. Each of the polarizing plates may be an absorption-type polarizing device that absorbs light (polarized light) in an oscillation direction other than the transmission axis direction. From the viewpoint of increase in luminance, however, the polarizing plate is preferably a reflection-type polarizing device that reflects light to a side close to the backlight 211. The two polarizing plates are disposed such that their respective polarizing axes differ by 90 degrees from each other. Thus, the polarizing plate allows light from the backlight 211 to pass therethrough via the liquid crystal layer or blocks the light from the backlight 211.

Figure 69:
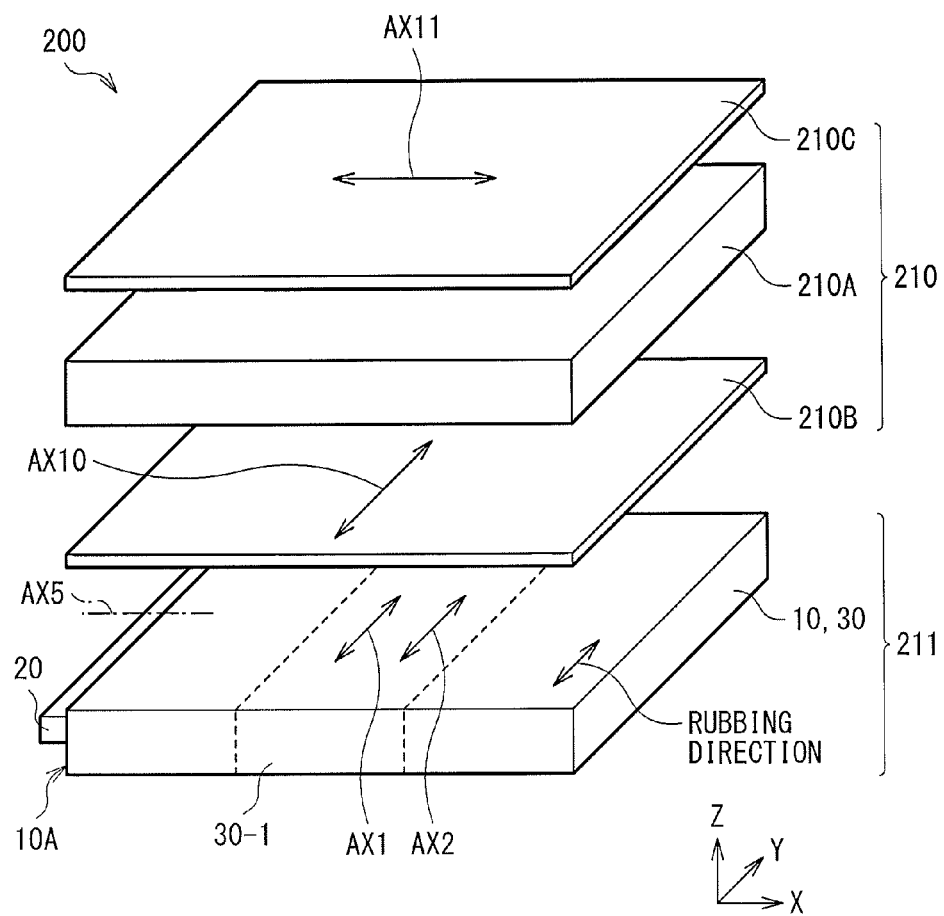
FIG. 69 is a perspective view illustrating an exemplary relationship between a rubbing direction and a transmission axis of a polarizing plate in the receiver unit in FIG. 66.

In the present embodiment, while no voltage is applied, the optical axis AX1 of the bulk 34A and the optical axis AX2 of the fine particle 34B mainly have optical axis components in the same direction that is preferably a rubbing direction of the alignment film 33 or 35, for example, as illustrated in FIG. 69. Furthermore, while no voltage is applied, it is preferable that each of the optical axes AX1 and AX2 mainly has an optical axis component in a direction parallel to the transmission axis AX10 of the polarizing plate 210B on a side close to the backlight 211, for example, as illustrated in FIG. 69. For example, as illustrated in FIG. 69, the transmission axis AX10 is preferably in the rubbing direction of the alignment film 33 or 35.

While no voltage is applied, each of the optical axes AX1 and AX2 is preferably in a direction intersecting with or orthogonal (or almost orthogonal) to the normal AX5 to the light-incident surface 10A, for example, as illustrated in FIG. 69. Furthermore, while no voltage is applied, each of the optical axes AX1 and AX2 is preferably parallel or almost parallel to the transparent substrate 31, for example, as illustrated in FIGS. 2 and 69. Specifically, while no voltage is applied, it is preferable that each of the optical axes AX1 and AX2 is roughly in a Y axis direction in FIG. 69. The reason for this is described in the section of anisotropic scattering in the first embodiment.

As described above, while voltage is applied, the optical axis AX1 is preferably in a direction equal or roughly equal to the direction of the optical axis AX1 during no voltage application. While voltage is applied, the optical axis AX1 mainly has an optical axis component in the direction parallel to the transmission axis AX10 of the polarizing plate 210B, and is preferably in the direction parallel to the transmission axis AX10, for example, as illustrated in FIG. 69. While voltage is applied, the optical axis AX1 is in a direction intersecting with or orthogonal (or almost orthogonal) to the optical axis AX5 of the light source 20, and is preferably parallel or almost parallel to the transparent substrate 31.

On the other hand, while voltage is applied, the optical axis AX2 is preferably displaced in a predetermined direction by the effect of an electric field formed by a voltage applied to both the lower electrode 32 and the upper electrode 36. While voltage is applied, for example, as illustrated in FIGS. 2 and 69, it is preferable that the optical axis AX2 intersects with or is orthogonal (or almost orthogonal) to the transparent substrate 31. Specifically, the optical axis AX2 is preferably displaced to a direction in which an angle formed by the optical axis AX2 and the normal to the transparent substrate 31 is small, by a voltage applied to both the lower electrode 32 and the upper electrode 36. Here, it is preferable that the optical axis AX2 intersects with or is orthogonal (or almost orthogonal) to the optical axis AX1, and intersects with or is orthogonal (or almost orthogonal) to the transparent substrate 31.

Functions and effects of the receiver unit 200 of the present embodiment are now described.

In the receiver unit 200 of the present embodiment, any one of the illumination devices 1, 2, and 3 according to the above-described respective embodiments and the Modifications thereof is used as the backlight 211. Consequently, during three-dimensional display, a plurality of pieces of linear illumination light are output in the front direction from a predetermined region in the light emission surface of the backlight 211. As a result, each piece of linear illumination light output in the front direction enters the back of the display panel 210.

Figure 70:
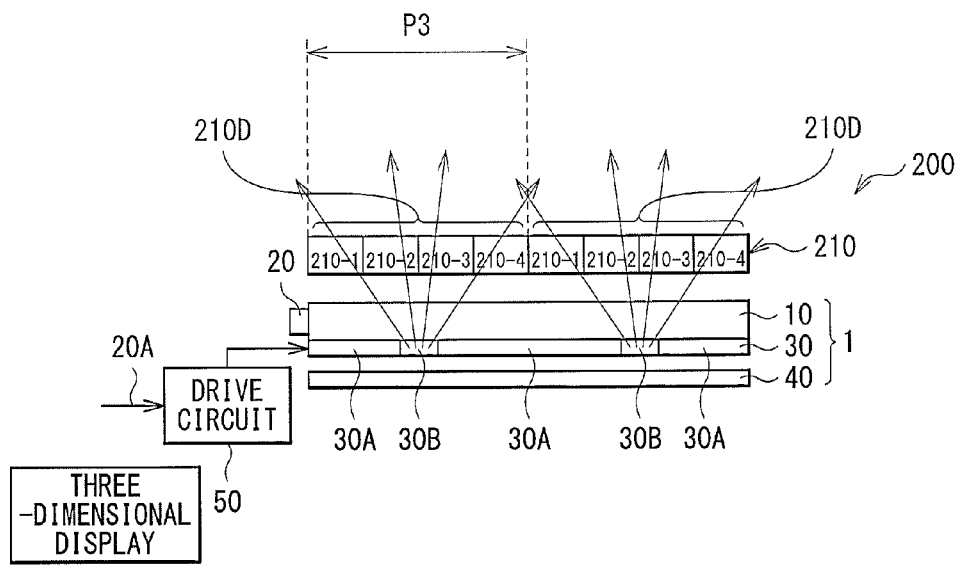
FIG. 70 is a schematic view for explaining three-dimensional display by the display section in FIG. 68.

In the case where the image signal processing circuit 207 generates two-dimensional image data for three-dimensional display such that each pixel row includes pixels 210D for three dimensional display in pixel arrangement corresponding to each piece of the linear illumination light, each piece of the linear illumination light enters, at substantially the same angle, sub-pixels located at common positions in the respective pixels 210D for three dimensional display (for example, 210-1, 210-2, 210-3, or 210-4 in FIG. 70), for example, as illustrated in FIG. 70. As a result, each of the sub-pixels located at common positions in the respective pixels 210D for three dimensional display outputs image light modulated by such a sub-pixel at a predetermined angle. At this time, a viewer views images having different parallaxes with his/her right and left eyes; hence, the viewer recognizes that a three-dimensional image (stereoscopic image) is displayed on the display panel 210. Although FIG. 70 exemplifies a case where the illumination device 1 is used as the backlight 211, it is obvious that another illumination device 2 or 3 may be used as the backlight 211.

In the receiver unit 200 in the present embodiment, during two-dimensional display, light is emitted from the entire light emission surface of the backlight 211, and planar illumination light is output in the front direction. Consequently, the planar illumination light output in the front direction enters the back of the display panel 210.

Figure 71:
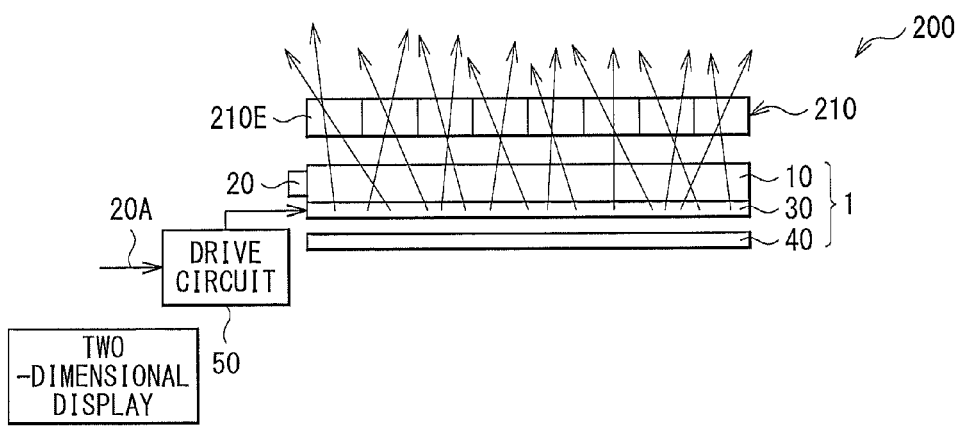
FIG. 71 is a schematic view for explaining two-dimensional display by the display section in FIG. 68.

In the case where the image signal processing circuit 207 generates two-dimensional image data for two-dimensional display for each of pixels 210E, planar illumination light enters the pixel 210B at various angles, and image light modulated by the pixel 210B is output, for example, as illustrated in FIG. 71. At this time, a viewer views the same image with his/her two eyes; hence, the viewer recognizes that a two-dimensional image (planar image) is displayed on the display panel 210. Although FIG. 71 exemplifies a case where the illumination device 1 is used as the backlight 211, it is obvious that another illumination device 2 or 3 may be used as the backlight 211.

In the backlight 211 in the present embodiment, linear illumination light is reflected by the reflector 40, and thus reflected light L12 to be focused is generated. This allows front intensity distribution and angular intensity distribution of the reflected light L12 to be similar to front intensity distribution and angular intensity distribution of light L13, as part of linear illumination light, emitted to a side opposite to a reflector 40 side. As a result, it is possible to reduce a proportion of the reflected light L13 emitted from the top of the reflector through a region different from the site generating the linear illumination light during three-dimensional display compared with a case where the top of the reflector is configured of a flat surface (see FIG. 22) or is configured of a paraboloid generating parallel light (see FIG. 20). Furthermore, it is possible to reduce a proportion of the reflected light L13 emitted in an angular direction unnecessary for three-dimensional display. As a result, in the case where such an illumination device 1, 2, or 3 is used as the backlight 211 of the receiver unit 200, it is possible to suppress formation of a double image in three-dimensional display. Consequently, display quality is improved in three-dimensional display.

8. EXAMPLES

Description is now made on Examples of the backlight 211 according to any one of the above-described embodiments and the Modifications thereof.

Figure 72:
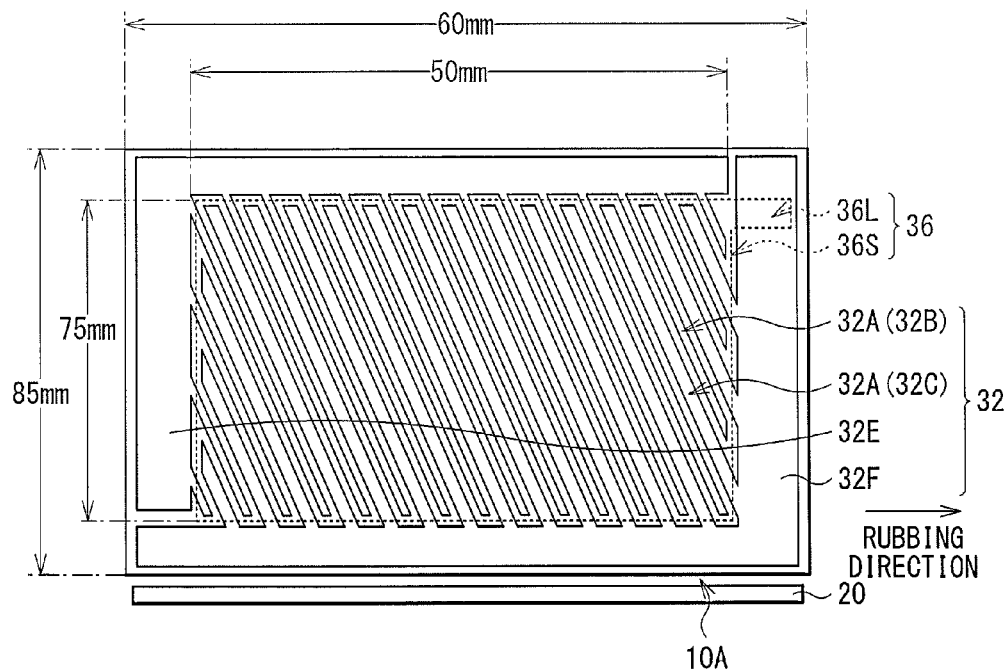
FIG. 72 is a top view illustrating an exemplary electrode configuration of an illumination device according to an Example.
Figure 73:
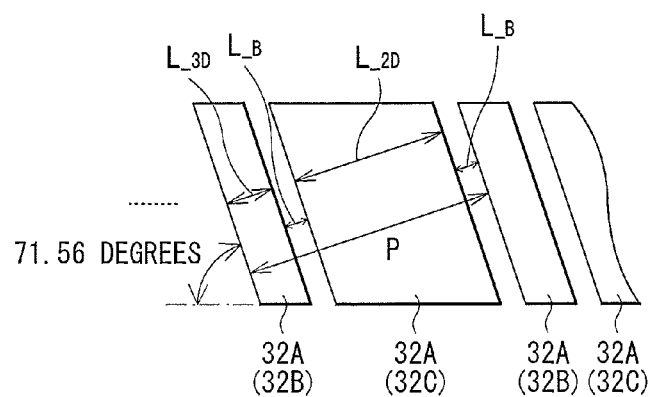
FIG. 73 is a top view illustrating the exemplary electrode configuration of FIG. 72 in an enlarged manner.

FIG. 72 illustrates an exemplary layout of the lower electrode 32 and the upper electrode 36 of the backlight 211 according to the present Examples. FIG. 73 illustrates part of the lower electrode 32 in FIG. 72 in an enlarged manner. In the present Examples, the lower electrode 32 includes an arrangement of a plurality of sets of partial electrode groups, each set including one partial electrode 32B and three partial electrodes 32C. Furthermore, the lower electrode 32 includes a wiring 32E connected to each partial electrode 32B and a wiring 32F connected to each partial electrode 32C in a region outside the display region.

An ITO film was formed on a substrate having a size of 60 mm wide, 85 mm long, and 0.7 mm thick, and was patterned into the lower electrode 32. Here, the lower electrode 32 was configured of one partial electrode 32B used for three-dimensional display and two-dimensional display, and three partial electrodes 32C used for only two-dimensional display, and each of the partial electrodes 32B and 32C was inclined in a direction intersecting with the light-incident surface 10A at 71.56 degrees. The maximum width (L_3D) of each partial electrode 32B was 45 μm, while the maximum width (L_2D) of each partial electrode 32C was 165 μm. The width (L_B) of a clearance between the partial electrode 32B and the partial electrode 32C was 15 μm, and a pitch (P) of the partial electrodes 32B was 240 μm. The partial electrodes 32B and 32C were arranged in an area of 50 mm wide and 75 mm long.

An ITO film was formed on a substrate having a size of 60 mm wide, 85 mm long, and 0.7 mm thick, and was patterned into the upper electrode 36. Here, the upper electrode 36 was configured of a planer electrode 36S having a size of 50 mm wide and 75 mm long, and a wiring 36L led from the planer electrode 36S.

An alignment film was applied onto the surface of each of the lower electrode 32 and the upper electrode 36, and each alignment film was rubbed in a predetermined direction (see FIG. 69). Subsequently, spacers each having a size of 4 μm were dispersed on the surface of the alignment film on the lower electrode 32, and an annular pattern was drawn with a sealing agent on the surface of the alignment film on the upper electrode 36. Subsequently, the lower electrode 32 was bonded to the upper electrode 36 such that the planner electrode 36S was disposed in a region opposed to the partial electrodes 32B and 32C, and the wiring 36S was located in a region that is opposed to the wiring 32E or 32F and was as far as possible from the light source 20. Subsequently, PDLC was vacuum-injected into a clearance between the lower electrode 32 and the upper electrode 36 to complete the display panel. Subsequently, seven LED light sources were disposed at an interval of 7 mm on one end face having a length of 60 mm of the substrate, and a black plate was disposed on the back of the display panel to complete the illumination device. A glass substrate having a refractive index of 1.515 was used as the transparent substrate 41.

The reflector 40 having the configuration illustrated in FIG. 16 was used, the dimensions of which were as follows: H1=700 µm, H2=387 to 567 µm (n=1.515, and H2=H1/n at H2=462 µm), a distance (radius R) between the focal point C and the reflecting surface 40A=368 to 555 µm, P1=P2=240 µm, and W1=45 µm. Table 1 shows values of R and H2 in Examples 1 to 7. In a comparative example 1 in Table 1, a barrier layer was used in place of PDLC, and the surface of the reflector was formed to be flat (mirror-reflective). In a comparative example 2 in Table 1, PDLC was used as with the Examples 1 to 7, and the surface of the reflector was formed to be flat and light-absorbable. In a comparative example 3 in Table 1, PDLC was used as with the Examples 1 to 7, and the surface of the reflector was formed to be flat (mirror-reflective).

TABLE 1

| | PDLC or barrier layer | Reflector 40 | Result 1 Luminance (a.u.) | Result 2 Contrast ratio |
|---|---|---|---|---|
| Comparative example 1 | Barrier layer | Flat surface, mirror-reflective | 0.6 | 33 |
| Comparative example 2 | PDLC | Flat surface, light-absorbable | 1 (normalized) | 24.1 |
| Comparative example 3 | PDLC | Flat surface, mirror-reflective | 1.4 | 3.9 |
| Example 1 | PDLC | R = 567 µm, H2 = 555 µm | 2.0 | 8.4 |
| Example 2 | PDLC | R = 522 µm, H2 = 508 µm | 2.1 | 16.8 |
| Example 3 | PDLC | R = 500 µm, H2 = 485 µm | 2.0 | 16.5 |
| Example 4 | PDLC | R = 477 µm, H2 = 462 µm | 1.9 | 15.9 |
| Example 5 | PDLC | R = 454 µm, H2 = 439 µm | 1.8 | 15.7 |
| Example 6 | PDLC | R = 432 µm, H2 = 415 µm | 1.8 | 16.2 |
| Example 7 | PDLC | R = 387 µm, H2 = 368 µm | 1.6 | 10.1 |

When this illumination device performed three-dimensional display, the partial electrodes 32B were driven by pulses of 100 V at 60 Hz, and the partial electrodes 32C and the upper electrode 36 were connected to GND. In addition, a display panel was disposed on the illumination device as necessary to perform evaluation of a display unit. The Examples are each described in detail below.

Table 1 teaches that any of the Examples 1 to 7 shows higher luminance than that in any of the comparative examples 1, 2, and 3, and shows higher contrast ratio than that in the comparative example 3. Table 1 further teaches that the contrast ratios are substantially equal to one another in the Examples 2 to 6, showing that even if R or H2 is varied within the above-described range, the contrast ratio is not significantly varied. Consequently, it is known that when the radius R is within a range of 477 µm±W1 (45 µm), and when H2 is within a range of 462 µm±W1 (45 µm), the resultant contrast ratio is substantially equal to that in the Example 4. Here, H2=462 µmn=H1/n, and the radius R=477 µm=$((H1/n)^2+(P1/2)^2)^{1/2}$ are given.

It is possible to achieve at least the following configurations from the above-described example embodiments of the technology.

(1) An illumination device, including,
an illumination optical system configured to generate linear illumination light including a plurality of pieces of linear or dot illumination light arranged two-dimensionally, and
a reflector reflecting the linear illumination light, the reflector being configured to reflect the linear illumination light onto a plane or the neighborhood of the plane, the plane running through each of sites that generate the linear illumination light and being perpendicular to a plane containing the reflector.

(2) The illumination device according to (1), wherein
when the linear illumination light is assumed to have a light component that is parallel to a plane perpendicular to the site generating the linear illumination light, the reflector generates reflected light to be focused on a segment or the neighborhood of the segment, the segment running through the site generating the linear illumination light and being parallel to the normal to the plane containing the reflector.

(3) The illumination device according to (1) or (2), wherein
the reflector has a surface shape allowing the reflected light to be focused directly below the site generating the linear illumination light.

(4) The illumination device according to any one of (1) to (3), wherein
the reflector has a surface shape allowing the reflected light to be focused on a position satisfying the following expression, $$H1/n1 - W1 \leq H2 \leq H1/n1 + W1,$$

where H1 is a distance between a plane containing a plurality of apexes provided on the top of the reflector and the site generating the linear illumination light.
H2 is a distance between the plane containing the plurality of apexes provided on the top of the reflector and a position of the focal point,
n1 is a refractive index of a region between the plane containing the plurality of apexes provided on the top of the reflector and the position of the focal point, and
W1 is width of the site generating the linear illumination light.

(5) The illumination device according to any one of (1) to (3), wherein
the reflector has a surface shape allowing the reflected light to be focused on a position satisfying the following expression, $$H2 = H1/n1,$$

where H1 is a distance between a plane containing a plurality of apexes provided on the top of the reflector and the site generating the linear illumination light,
H2 is a distance between the plane containing the plurality of apexes provided on the top of the reflector and a position of the focal point, and
n1 is a refractive index of a region between the plane containing the plurality of apexes provided on the top of the reflector and the position of the focal point.

(6) The illumination device according to any one of (1) to (5), wherein
the reflector includes a reflecting surface as part of an inner surface of a cylinder at a position opposed to the site generating the linear illumination light.

(7) The illumination device according to any one of (1) to (6), wherein
a pitch of a three-dimensional shape of the reflecting surface is equal to a pitch between the sites generating the linear illumination light.

(8) The illumination device according to any one of (1) to (7), wherein a portion of the reflecting surface, the portion corresponding to part of an inner surface of a cylinder, has a radius r satisfying the following expression, $$r=(H2^2+(P1/2)^2)^{1/2},$$

where H2 is a distance between the plane containing the plurality of apexes provided on the top of the reflector and a position of the focal point, and P1 is a pitch between the sites generating the linear illumination light.

(9) The illumination device according to any one of (1) to (7), wherein the reflector has a surface shape allowing the reflected light to be focused on a position satisfying the following expression (1), and includes a reflecting surface as part of an inner surface of a cylinder at a position opposed to the site generating the linear illumination light, a pitch of a three-dimensional shape of the reflecting surface is equal to a pitch between the sites generating the linear illumination light, and a portion of the reflecting surface, the portion corresponding to the part of the inner surface of the cylinder, has a radius r satisfying the following expression (2), $$H2=H1/n1 \quad (1),$$

$$r=(H2^2+(P1/2)^2)^{1/2} \quad (2),$$

where H1 is a distance between a plane containing a plurality of apexes provided on the top of the reflector and the site generating the linear illumination light.

H2 is a distance between the plane containing the plurality of apexes provided on the top of the reflector and a position of the focal point, n1 is a refractive index of a region between the plane containing the plurality of apexes provided on the top of the reflector and the position of the focal point, and P1 is a pitch between the sites generating the linear illumination light.

(10) The illumination device according to any one of (1) to (6), wherein the reflector has a regular concave-convex shape having a pitch two times as large as the width of the site generating the linear illumination light.

(11) The illumination device according to any one of (1) to (6), wherein the reflective surface reflects light emitted from a first site generating the linear illumination light to a second site generating the linear illumination light and being adjacent to the first site.

(12) The illumination device according to any one of (1) to (11), wherein the reflecting surface is a mirror surface.

(13) The illumination device according to any one of (1) to (12), wherein the illumination optical system includes a light guide plate and a light source disposed on a side face of the light guide plate, and the reflector is bonded to the light guide plate.

(14) The illumination device according to any one of (1) to (13), wherein the illumination optical system includes a first transparent substrate and a second transparent substrate disposed oppositely to each other with the sites generating the linear illumination light therebetween, an electrode provided on a surface of one or both of the first transparent substrate and the second transparent substrate, a light source configured to apply light to an end face of the first transparent substrate, a light modulation layer that is provided in a clearance between the first transparent substrate and the second transparent substrate, and is configured to exhibit a scattering or transparent property to light from the light source depending on magnitude of an electric field, and a drive section configured to drive the electrode, the light modulation layer exhibits the transparent property to light from the light source in the case of a relatively low electric field, while exhibiting the scattering property to light from the light source in the case of a relatively high electric field, and the drive section drives the electrode to allow the light modulation layer to have a plurality of first regions each exhibiting the scattering property to allow the linear illumination light to be emitted from each of the first regions.

(15) The illumination device according to (14), wherein the drive section drives the electrode to allow the entire light modulation layer to have the first region to allow planar illumination light to be emitted from the entire light modulation layer.

(16) A display unit, including, a display panel including a plurality of pixels to be driven based on image signals, and an illumination device configured to illuminate the display panel, wherein the illumination device includes an illumination optical system configured to generate linear illumination light including a plurality of pieces of linear or dot illumination light arranged two-dimensionally, and a reflector reflecting the linear illumination light, the reflector being configured to reflect the linear illumination light onto a plane or the neighborhood of the plane, the plane running through each of sites that generate the linear illumination light and being perpendicular to a plane containing the reflector.

(17) The display unit according to (16), wherein the illumination device includes a first transparent substrate and a second transparent substrate disposed oppositely to each other with the sites generating the linear illumination light therebetween, an electrode provided on a surface of one or both of the first transparent substrate and the second transparent substrate, a light source configured to apply light to an end face of the first transparent substrate, a light modulation layer that is provided in a clearance between the first transparent substrate and the second transparent substrate, and is configured to exhibit a scattering or transparent property to light from the light source depending on magnitude of an electric field, and a drive section configured to drive the electrode based on image signals, the light modulation layer exhibits a transparent property to light from the light source in the case of a relatively low electric field, while exhibiting a scattering property to light from the light source in the case of a relatively high electric field, and the drive section drives the electrode into a three-dimensional display mode to allow the light modulation layer to have a plurality of first regions exhibiting the scattering property to allow the linear illumination light to be emitted from each of the first regions.

(18) The display unit according to (16) or (17), wherein
the display unit further includes a pair of polarizing plates opposed to each other with the display panel therebetween,
the light modulation layer includes a first optically anisotropic region having relatively high responsivity to an electric field, and a second optically anisotropic region having relatively low responsivity to an electric field,
when the light modulation layer exhibits the transparent property, each of the first region and the second region mainly has an optical axis component in a direction parallel to a transmission axis of the polarizing plate on a side close to the illumination device between the pair of the polarizing plates, and
when the light modulation layer exhibits the scattering property, the second region mainly has an optical axis component in the direction parallel to the transmission axis of the polarizing plate on the side close to the illumination device between the pair of the polarizing plates, and the first region has an optical axis in a direction that intersects with or is orthogonal to the optical axis of the second region, and intersects with or is orthogonal to the first transparent substrate.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An illumination device, comprising:
an illumination optical system configured to generate linear illumination light including a plurality of pieces of linear or dot illumination light arranged two-dimensionally; and
a reflector reflecting the linear illumination light, the reflector being configured to reflect the linear illumination light and focus the reflected linear illumination light onto a plane running through a site from among a plurality of sites of the illumination optical system, wherein the site generates the linear illumination light and is perpendicular to a plane containing the reflector.

2. The illumination device according to claim 1, wherein when the linear illumination light has a light component that is parallel to a plane perpendicular to the site generating the linear illumination light, the reflector generates reflected linear illumination light to be focused on a segment running through the site generating the linear illumination light and being parallel to the normal to the plane containing the reflector.

3. The illumination device according to claim 2, wherein the reflector has a surface shape allowing the reflected linear illumination light to be focused directly below the site generating the linear illumination light.

4. The illumination device according to claim 2, wherein the reflector has a surface shape allowing the reflected linear illumination light to be focused on a position satisfying the following expression, $H1/n1 - W1 \leq H2 \leq H1/n1 + W1$, where H1 is a distance between a plane containing a plurality of apexes provided on the top of the reflector and the site generating the linear illumination light,
H2 is a distance between the plane containing the plurality of apexes provided on the top of the reflector and a position of a focal point,
n1 is a refractive index of a region between the plane containing the plurality of apexes provided on the top of the reflector and the position of the focal point, and
W1 is a width of the site generating the linear illumination light.

5. The illumination device according to claim 2, wherein the reflector has a surface shape allowing the reflected linear illumination light to be focused on a position satisfying the following expression, $H2 = H1/n1$, where H1 is a distance between a plane containing a plurality of apexes provided on the top of the reflector and the site generating the linear illumination light,
H2 is a distance between the plane containing the plurality of apexes provided on the top of the reflector and a position of a focal point, and
n1 is a refractive index of a region between the plane containing the plurality of apexes provided on the top of the reflector and the position of the focal point.

6. The illumination device according to claim 2, wherein the reflector includes a reflecting surface as part of an inner surface of a cylinder at a position opposed to the site generating the linear illumination light.

7. The illumination device according to claim 6, wherein a pitch of a three-dimensional shape of the reflecting surface is equal to a pitch between the plurality of sites generating the linear illumination light.

8. The illumination device according to claim 2, wherein a portion of a reflecting surface of the reflector, the portion corresponding to part of an inner surface of a cylinder, has a radius r satisfying the following expression, $r = (H2^2 + (P1/2)^2)^{1/2}$, where H2 is a distance between a plane containing a plurality of apexes provided on the top of the reflector and a position of a focal point, and
P1 is a pitch between the plurality of sites generating the linear illumination light.

9. The illumination device according to claim 2, wherein the reflector has a surface shape allowing the reflected linear illumination light to be focused on a position satisfying the following expression (1), and includes a reflecting surface as part of an inner surface of a cylinder at a position opposed to the site generating the linear illumination light,
a pitch of a three-dimensional shape of the reflecting surface is equal to a pitch between the plurality of sites generating the linear illumination light, and
a portion of the reflecting surface, the portion corresponding to the part of the inner surface of the cylinder, has a radius r satisfying the following expression (2), $$H2 = H1/n1 \qquad (1),$$

$$r = H2^2 + (P1/2)^2)^{1/2} \qquad (2),$$

where H1 is a distance between a plane containing a plurality of apexes provided on the top of the reflector and the site generating the linear illumination light,
H2 is a distance between the plane containing the plurality of apexes provided on the top of the reflector and a position of a focal point,
n1 is a refractive index of a region between the plane containing the plurality of apexes provided on the top of the reflector and the position of the focal point, and
P1 is a pitch between the plurality of sites generating the linear illumination light.

10. The illumination device according to claim 2, wherein the reflector has a regular concave-convex shape having a pitch two times as large as a width of the site generating the linear illumination light.

11. The illumination device according to claim 2, wherein the reflector reflects light emitted from a first site generating the linear illumination light to a second site generating the linear illumination light and being adjacent to the first site.

12. The illumination device according to claim 2, wherein a reflecting surface of the reflector is a mirror surface.

13. The illumination device according to claim 1, wherein the illumination optical system includes a light guide plate and a light source disposed on a side face of the light guide plate, and
the reflector is bonded to the light guide plate.

14. The illumination device according to claim 1, wherein the illumination optical system includes:
a first transparent substrate and a second transparent substrate disposed oppositely to each other with the plurality of sites generating the linear illumination light therebetween,
an electrode provided on a surface of one or both of the first transparent substrate and the second transparent substrate,
a light source configured to apply light to an end face of the first transparent substrate,
a light modulation layer that is provided in a clearance between the first transparent substrate and the second transparent substrate, and is configured to exhibit a scattering property or a transparent property to light from the light source depending on magnitude of an electric field, and
a drive section configured to drive the electrode,
the light modulation layer exhibits the transparent property to light from the light source in the case of a lower electric field, while exhibiting the scattering property to light from the light source in the case of a higher electric field, and
the drive section drives the electrode to allow the light modulation layer to have a plurality of first regions each exhibiting the scattering property to allow the linear illumination light to be emitted from each of the first regions.

15. The illumination device according to claim 14,
wherein the drive section drives the electrode to allow the entire light modulation layer to have the first region to allow planar illumination light to be emitted from the entire light modulation layer.

16. A display unit, comprising:
a display panel including a plurality of pixels to be driven based on image signals; and
an illumination device configured to illuminate the display panel,
wherein the illumination device includes:
an illumination optical system configured to generate linear illumination light including a plurality of pieces of linear or dot illumination light arranged two-dimensionally, and
a reflector reflecting the linear illumination light, the reflector being configured to reflect the linear illumination light and focus the reflected linear illumination light onto a plane running through a site from among a plurality of sites of the illumination optical system, wherein the site generates the linear illumination light and is perpendicular to a plane containing the reflector.

17. The display unit according to claim 16, wherein the illumination device includes:
a first transparent substrate and a second transparent substrate disposed oppositely to each other with the plurality of sites generating the linear illumination light therebetween,
an electrode provided on a surface of one or both of the first transparent substrate and the second transparent substrate,
a light source configured to apply light to an end face of the first transparent substrate,
a light modulation layer that is provided in a clearance between the first transparent substrate and the second transparent substrate, and is configured to exhibit a scattering property or a transparent property to light from the light source depending on magnitude of an electric field, and
a drive section configured to drive the electrode based on Image signals,
the light modulation layer exhibits a transparent property to light from the light source in the case of a lower electric field, while exhibiting a scattering property to light from the light source in the case of a higher electric field, and
the drive section drives the electrode into a three-dimensional display mode to allow the light modulation layer to have a plurality of first regions exhibiting the scattering property to allow the linear illumination light to be emitted from each of the first regions.

18. The display unit according to claim 17, wherein the display unit further includes:
a pair of polarizing plates opposed to each other with the display panel therebetween,
the light modulation layer includes a first optically anisotropic region having higher responsivity to an electric field, and a second optically anisotropic region having lower responsivity to an electric field,
when the light modulation layer exhibits the transparent property, each of the first optically anisotropic region and the second optically anisotropic region mainly has an optical axis component in a direction parallel to a transmission axis of one of the pair of polarizing plates on a side close to the illumination device between the pair of the polarizing plates, and
when the light modulation layer exhibits the scattering property, the second optically anisotropic region mainly has an optical axis component in the direction parallel to the transmission axis of the one of the pair of polarizing plates on the side close to the illumination device between the pair of the polarizing plates, and the first optically anisotropic region has an optical axis in a direction that intersects with or is orthogonal to the optical axis of the second optically anisotropic region, and intersects with or is orthogonal to the first transparent substrate.

19. An illumination device, comprising:
an illumination optical system configured to generate linear illumination light including a plurality of pieces of linear or dot illumination light arranged two-dimensionally; and
a reflector reflecting the linear illumination light, the reflector being configured to reflect the linear illumination light and focus the reflected linear illumination light onto a plane running through a site from among a plurality of sites of the illumination optical system, wherein the site generates the linear illumination light and is perpendicular to a plane containing the reflector, wherein the reflector has a surface shape allowing the reflected light to be focused on a position satisfying one of the following expressions, $$H1/n1 - W1 \leq H2 \leq H1/n1 + W1, \tag{1}$$

or $$H2 = H1/n1, \tag{2}$$

where H1 is a distance between a plane containing a plurality of apexes provided on the top of the reflector and the site generating the linear illumination light, H2 is a distance between the plane containing the plurality of apexes provided on the top of the reflector and a position of the focal point, n1 is a refractive index of a region between the plane containing the plurality of apexes provided on the top of the reflector and the position of the focal point, and W1 is a width of the site generating the linear illumination light.

* * * * *